US010114958B2

(12) United States Patent
Sell

(10) Patent No.: US 10,114,958 B2
(45) Date of Patent: Oct. 30, 2018

(54) PROTECTED REGIONS

(71) Applicant: Microsoft Technology Licensing, LLC, Redmond, WA (US)

(72) Inventor: John V Sell, Los Altos, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 163 days.

(21) Appl. No.: 15/132,065

(22) Filed: Apr. 18, 2016

(65) Prior Publication Data

US 2016/0371496 A1    Dec. 22, 2016

Related U.S. Application Data

(60) Provisional application No. 62/180,324, filed on Jun. 16, 2015, provisional application No. 62/233,160, filed on Sep. 25, 2015.

(51) Int. Cl.
*G06F 21/00* (2013.01)
*G06F 21/60* (2013.01)
(Continued)

(52) U.S. Cl.
CPC ........ *G06F 21/604* (2013.01); *G06F 9/45558* (2013.01); *G06F 12/14* (2013.01);
(Continued)

(58) Field of Classification Search
CPC ........ G06F 21/14; G06F 21/52; G06F 21/566; G06F 21/604; G06F 12/14;
(Continued)

(56) References Cited

U.S. PATENT DOCUMENTS 5,845,331 A     12/1998 Carter et al.
6,715,085 B2 *  3/2004 Foster ................... G06F 21/575
                                                        713/152

(Continued)

FOREIGN PATENT DOCUMENTS

WO    2014033606 A2    3/2014

OTHER PUBLICATIONS

"International Search Report and Written Opinion Issued in PCT Application No. PCT/US2016/032948", dated Jul. 15, 2016, 13 Pages.

(Continued)

*Primary Examiner* — Hosuk Song
(74) *Attorney, Agent, or Firm* — Alleman Hall Creasman & Tuttle LLP

(57) ABSTRACT

A data processing machine is configured to include one or more buried memory zones that are not intelligibly accessible to user software and to operating system software or hypervisor software within the data processing machine. At least one of hardware and firmware are configured to intelligibly access at least one of the buried memory zones so as to store therein, metadata defining one or more extents of a respective one or more protected regions (PR's) that are constituted in other memory areas of the data processing machine. The stored metadata defines constraints for the corresponding PR's including at least one of corresponding operational constraints and/or operational requirements that respectively constrain the operations performed by or on the data of the PR's.

20 Claims, 12 Drawing Sheets

(51) Int. Cl.
*G06F 12/14* (2006.01)
*G06F 21/52* (2013.01)
*G06F 9/455* (2018.01)
*G06F 21/56* (2013.01)

(52) U.S. Cl.
CPC ............ *G06F 21/52* (2013.01); *G06F 21/566* (2013.01); *G06F 2009/45583* (2013.01); *G06F 2009/45587* (2013.01); *G06F 2221/034* (2013.01)

(58) Field of Classification Search
CPC . G06F 2009/45583; G06F 2009/45587; G06F 2221/034
USPC .................. 726/17, 26–30; 713/187–188
See application file for complete search history.

(56) References Cited

U.S. PATENT DOCUMENTS

| | | | |
|---|---|---|---|
| 7,509,441 | B1 | 3/2009 | Merry et al. |
| 8,156,565 | B2 | 4/2012 | MacDonald et al. |
| 8,397,306 | B1* | 3/2013 | Tormasov ............... G06F 21/00 713/164 |
| 8,438,652 | B2* | 5/2013 | Weinstein ............... G06F 21/78 726/27 |
| 8,522,044 | B2* | 8/2013 | McKeen ................. G06F 21/52 711/163 |
| 8,631,248 | B2 | 1/2014 | Cowan et al. |
| 8,881,301 | B2* | 11/2014 | Crouch .......... G01R 31/318558 713/193 |
| 8,959,577 | B2* | 2/2015 | Epstein ................ G06F 21/604 713/189 |
| 8,972,746 | B2 | 3/2015 | Johnson et al. |
| 9,058,494 | B2 | 6/2015 | Xing |
| 2008/0077749 | A1 | 3/2008 | Cohen |
| 2008/0235436 | A1 | 9/2008 | Zimmer et al. |
| 2008/0276051 | A1 | 11/2008 | Renno |
| 2010/0042824 | A1 | 2/2010 | Lee et al. |
| 2010/0281273 | A1 | 11/2010 | Lee et al. |
| 2013/0061058 | A1 | 3/2013 | Boivie et al. |
| 2013/0159726 | A1 | 6/2013 | McKeen et al. |
| 2014/0189261 | A1 | 7/2014 | Hildesheim et al. |
| 2014/0337983 | A1 | 11/2014 | Kang et al. |
| 2014/0372719 | A1 | 12/2014 | Lange et al. |
| 2015/0089502 | A1 | 3/2015 | Horovitz et al. |
| 2015/0095661 | A1 | 4/2015 | Sell et al. |

OTHER PUBLICATIONS

Response filed Aug. 26, 2016 to International Search Report and Written Opinion dated Jul. 15, 2016 in PCT Application No. PCT/US2016/032948, 15 pages.

"International Preliminary Report on Patentability Issued in PCT Application No. PCT/US2016/032948", dated Aug. 14, 2017, 9 pages.

Nagarakatte, et al., "Watchdog: Hardware for Safe and Secure Manual Memory Management and Full Memory Safety", In Proceedings of 39th Annual International Symposium on Computer Architecture, Jun. 9, 2012, pp. 189-200.

Dewan, et al., "A Hypervisor-based System for Protecting Software Runtime Memory and Persistent Storage", In Proceedings of Spring Simulation Multiconference, Apr. 14, 2008, pp. 828-835.

Tuck, et al., "Hardware and Binary Modification Support for Code Pointer Protection from Buffer Overflow", In Proceedings of 37th International Symposium on Microarchitecture, Dec. 4, 2004, 12 pages.

Ozdoganoglu, et al., "SmashGuard: A Hardware Solution to Prevent Security Attacks on the Function Return Address", In Journal of IEEE Transactions on Computers, vol. 55, Issue 10, Oct. 2006, pp. 1271-1285.

Bare, J. Christopher, "Attestation and Trusted Computing", Published on: Mar. 2006 Available at: https://courses.cs.washington.edu/courses/csep590/06wi/finalprojects/bare.pdf.

Park, et al., "An Efficient Pointer Protection Scheme to Defend Buffer Overflow Attacks", In Proceedings of Conference/Workshop on Applied Parallel Computing, Jun. 20, 2004, 5 pages.

"Intel® Software Guard Extensions Programming Reference", Published on: Oct. 2014 Available at: https://software.intel.com/sites/default/files/managed/48/88/329298-002.pdf.

"Intel® Architecture Instruction Set Extensions Programming Reference", Published on: Oct. 2014 Available at: https://software.intel.com/sites/default/files/managed/0d/53/319433-022.pdf.

Nagarakatte, et al., "WatchdogLite: Hardware-Accelerated Compiler-Based Pointer Checking", In Proceedings of Annual IEEE/ACM International Symposium on Code Generation and Optimization, Feb. 15, 2014, pp. 175-184.

Intel Corporation, Intel Software Guard Extensions (Intel SGX), Jun. 2015, 238 pages.

"Second Written Opinion Issued in PCT Application No. PCT/US2016/032948", dated Mar. 21, 2017, 6 Pages.

\* cited by examiner

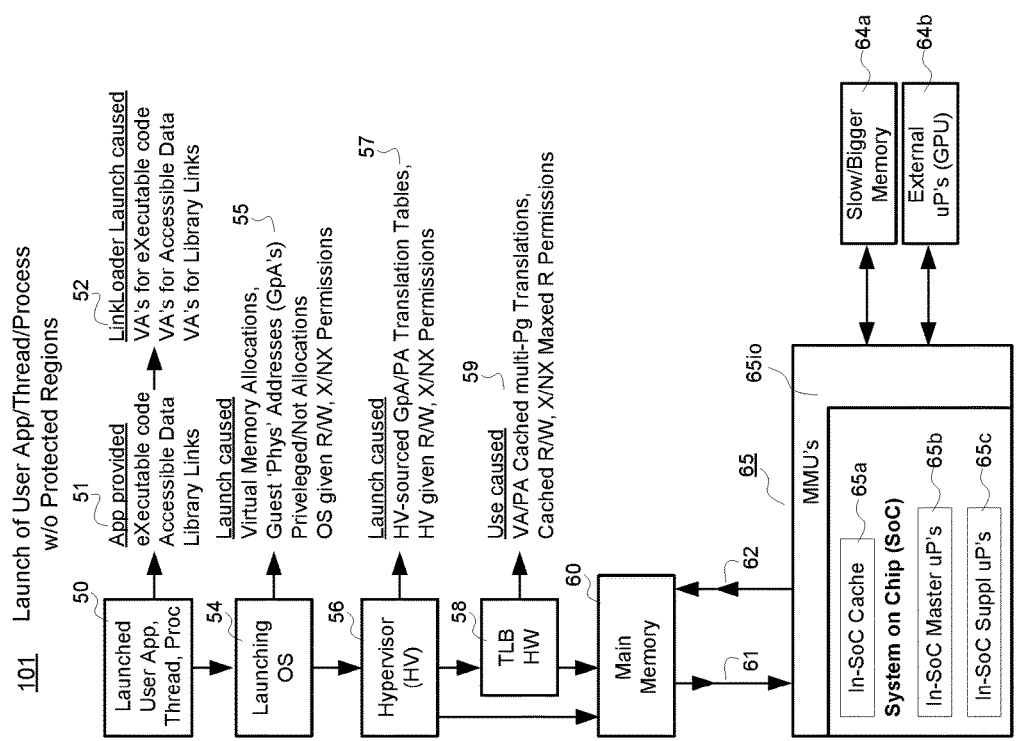

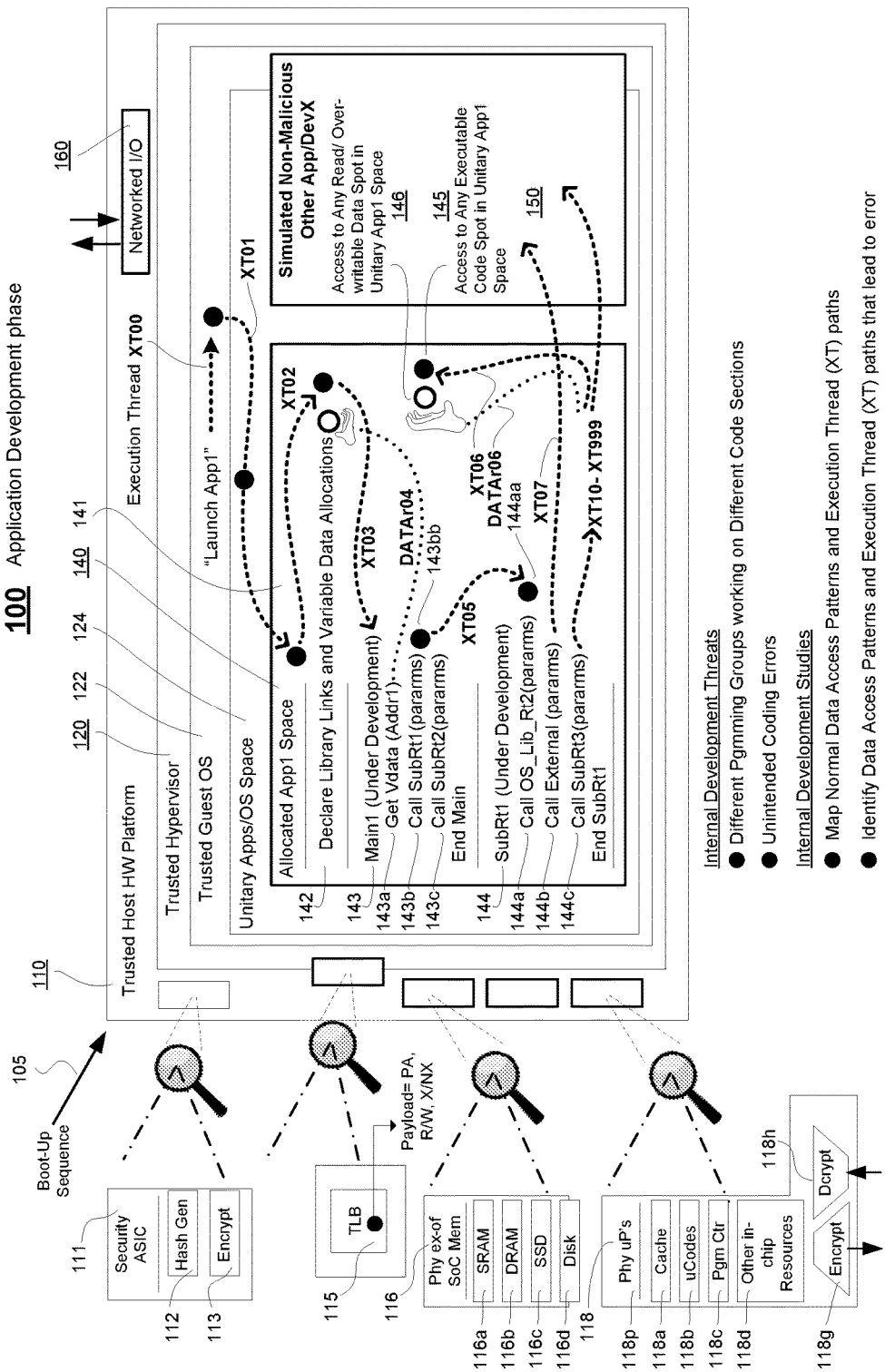

180

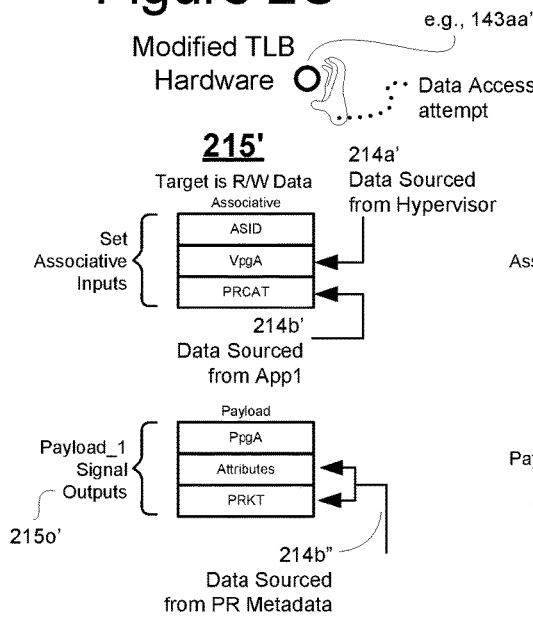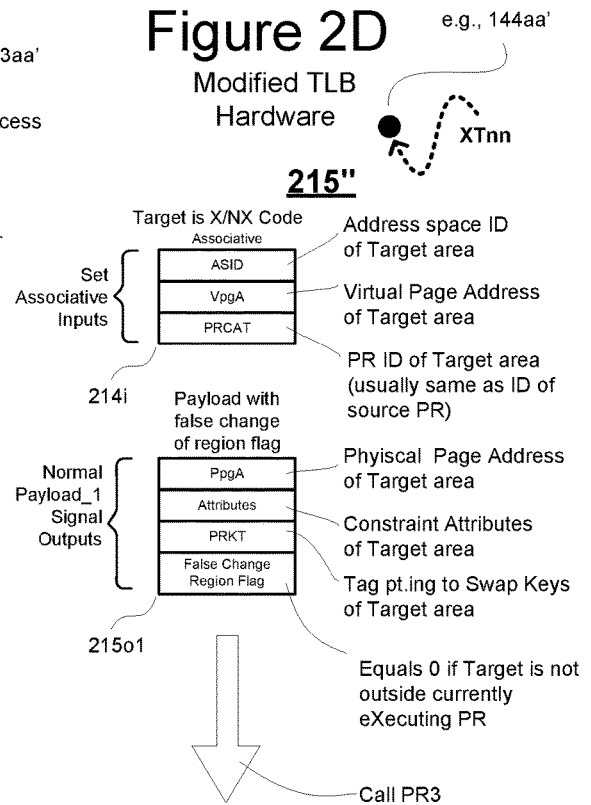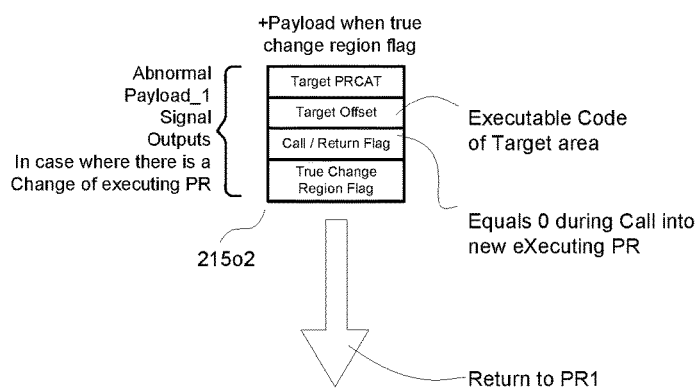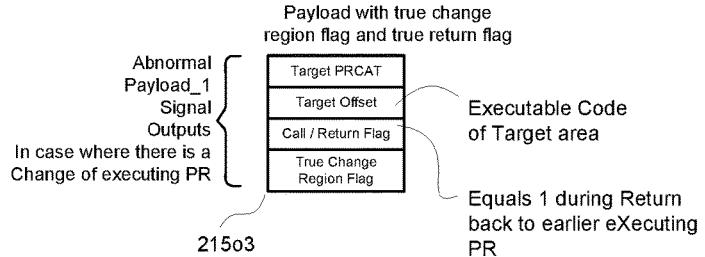

Figure 2E
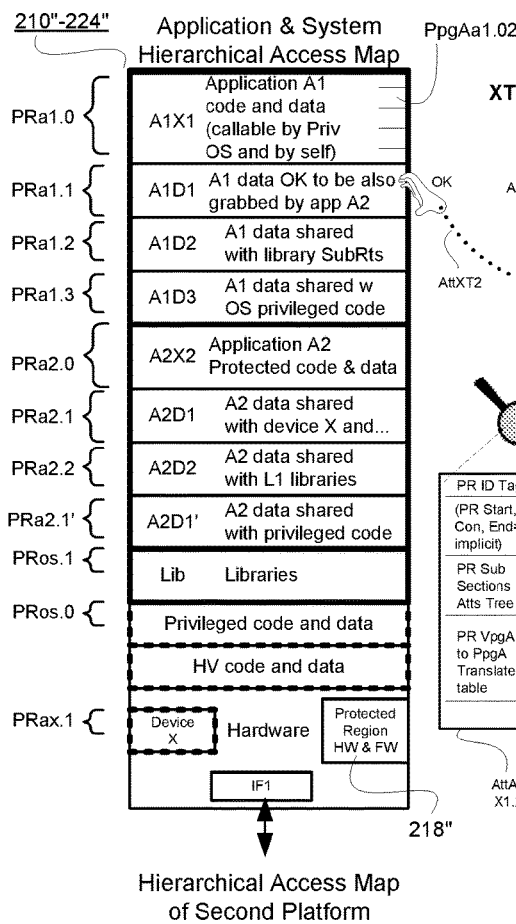
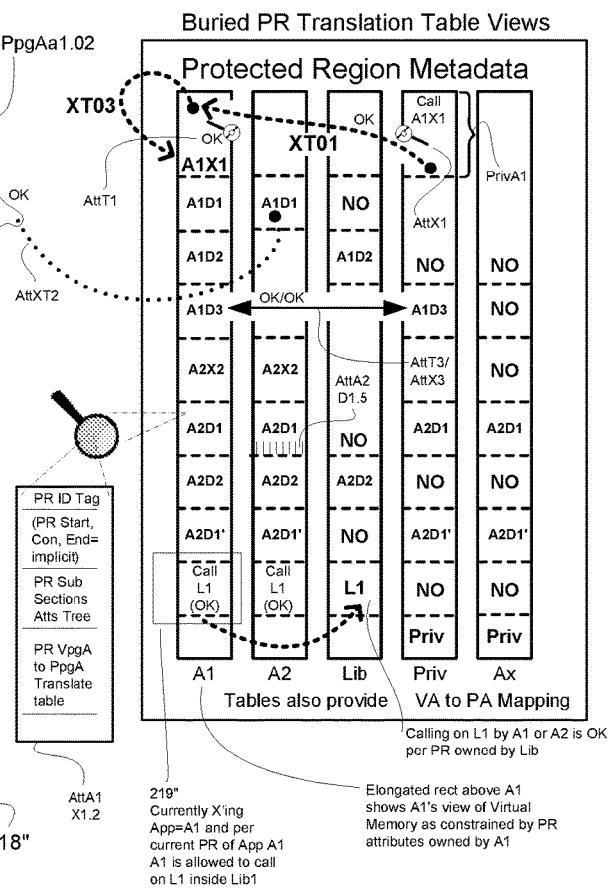
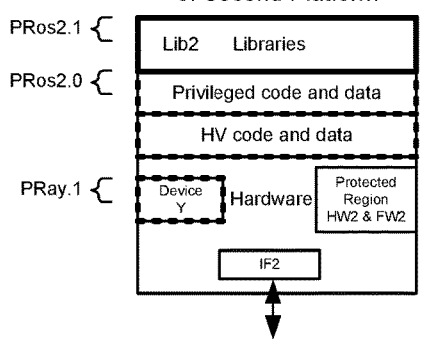

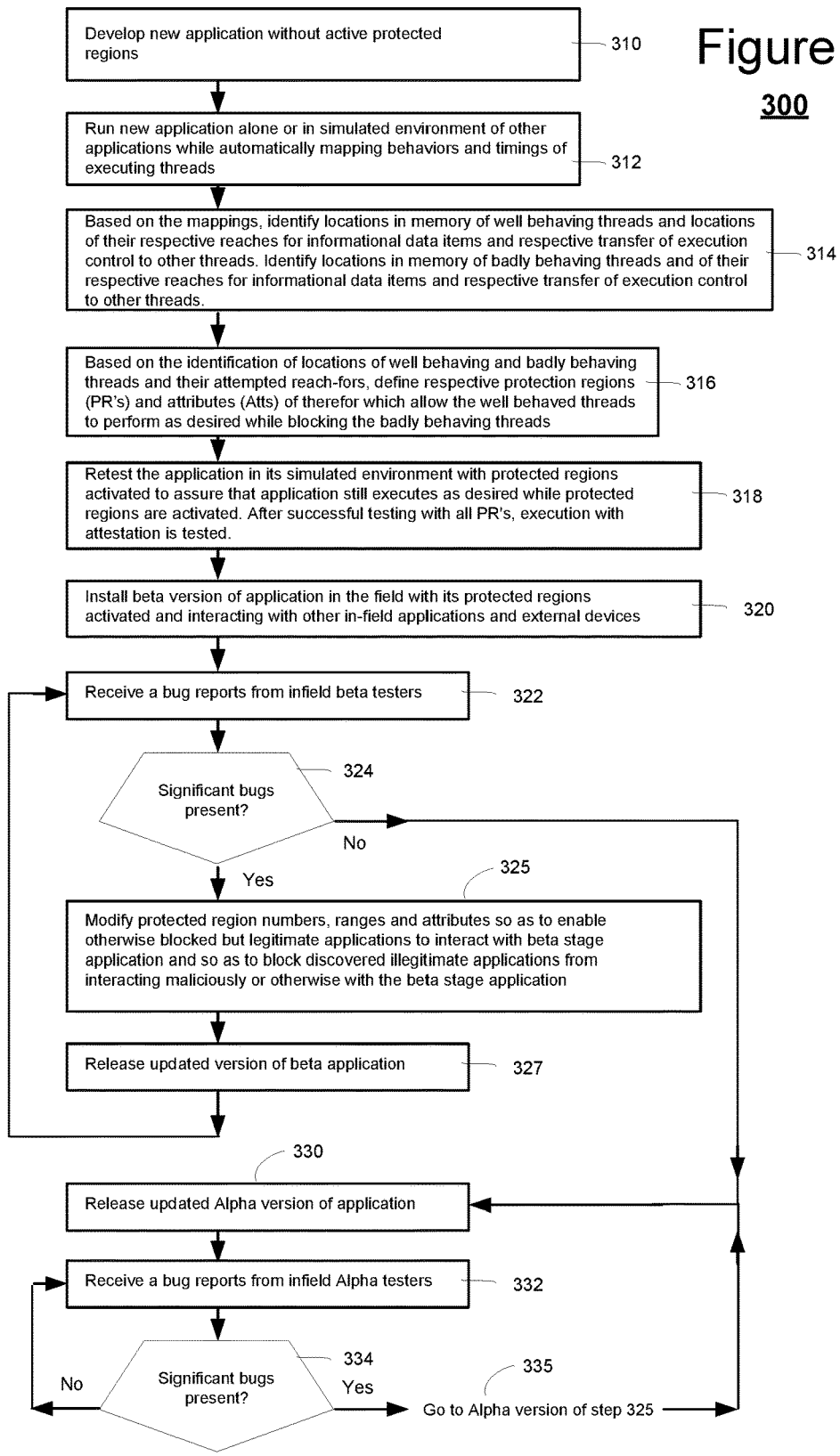

400

500

600

PROTECTED REGIONS

PRIORITY CLAIM

This application claims priority to U.S. Provisional Patent Application No. 62/180,324, filed Jun. 16, 2015, which is incorporated herein by reference. This application also claims priority to U.S. Provisional Patent Application No. 62/233,160 filed Sep. 25, 2015, which is incorporated herein by reference.

BACKGROUND

Code securitization and code validation/verification for digital computer systems is becoming increasingly important due to numerous avenues available for malicious attack or inadvertent error in complex data processing systems. Examples of malicious attack include those based on infection by software viruses, worms, and Trojan horses as well as those based on loophole exploitations. Attacks can also come directly from unscrupulous but authorized users of a computer system. Attacks may attempt to modify executable program code or to modify critical informational data items or inject new unauthorized program code or to gain access to key pieces of informational data that are preferably kept proprietary. Inadvertent mistakes during code development may produce similar faults and failures. Measures for preventing such faults and failures are accordingly becoming increasingly important.

SUMMARY

In accordance with one nonlimiting aspect of the present disclosure, at least one of hardware and firmware whose operations are inaccessible to (buried away from and thus not hackable by) executing user software, executing operating system software, master processors, supplemental processors and/or external processors is used to enforce code securitization and code validation/verification based on application-established constraints and requirements for application-owned, protected regions (PR's).

In accordance with one embodiment, application virtual memory space (as established using allocated portions of physical system memory where the latter includes a main memory and other system accessible data storage) is subdivided into one or more protected regions (PR's). These PR's are regions having detailed access defining attributes assigned to them whereby restrictions are imposed as to which one or more (if any at all) execution threads (XT's) can execute code present within the respective PR's and/or which one or more (if any at all) execution threads (XT's) can access informational data present within the respective PR's for purposes of reading or overwriting the informational data. The access defining attributes are enforced by a hardware-based, region protecting mechanism (hereafter also PR enforcer) whose internal operations are inaccessible to (buried away from and thus not hackable by) processes external to the PR enforcer. In other words, code executing privileges and read/write reach-and-grab privileges are restricted (constrained) by the hardware-based, region protecting mechanism (PR enforcer). The PR-based constraints are separate from privilege constraints provided by the operating system (OS). Accordingly, there are at least two separate access grant/deny mechanisms (access-restricting mechanisms) in place, one of them using user software-inaccessible hardware/firmware enforcement by the PR enforcer of application-provided constraints and requirements (e.g., at least on a per PR application-established basis) and the other using the OS-imposed constraints. As will be seen below, a successful compromise of such a multi-pronged access restriction system has to simultaneously defeat a plurality of separate privilege grant/deny restricting mechanisms (that of the OS and that of the PR enforcer) that are automatically repeatedly checked on. Such simultaneous compromise of both mechanisms is believed to be much harder to achieve than getting through found loopholes one at a time of just one security mechanism. The hardware/firmware based secondary security mechanism (the PR enforcer) can enforce a larger and richer set of restrictions than just generic read/write/execute restrictions. For example, it can restrict access to in-PR informational data items and/or in-PR executable code on the basis of where the access request is coming from (e.g., address of requesting code) and/or on the basis of what subsection of the PR it is reaching for.

In accordance with one aspect of the present disclosure, a plurality of automatically repeated access-restricting tests are performed by the buried hardware/firmware mechanism (the PR enforcer) whose internal operations cannot be interfered with by the OS, or by the Hypervisor or by other applications or by any processors having access to system memory. In one embodiment, the specifics of the multiple access-restricting tests performed by the PR enforcer are exclusively defined by (exclusively sourced from) the PR-owning application (at least initially at application launch time) and stored in one or more buried metadata memory zones that are not intelligibly accessible to the OS, to the Hypervisor, to other applications besides the PR-owning application and further not intelligibly accessible to master and external/supplemental processors (at least because the contents of the buried metadata memory zones remain encrypted when stored outside of on-chip cache and access to the decrypted metadata is available only for use by the PR enforcer). At the same time, the contents of the one or more buried metadata memory zones are testable to assure integrity of the data stored therein before that data is used by the PR enforcer. In one of automatically repeated access-restricting tests, the PR enforcer confirms substantial sameness of (e.g., more specifically, adherence to the most restrictive union of) access restriction settings obtained from at least two different sources (e.g., one source being the OS/Hypervisor complex pathway and the other source being a currently used PR buried metadata accessing pathway) to confirm substantial sameness of (or more specifically in one embodiment, to confirm adherence to the most restrictive union of restrictions relating to) used virtual addresses and used physical addresses as provided in virtual to physical address translations provided by two different translating mechanisms (e.g., one provided by a Hypervisor and the other by buried metadata sourced from a currently used PR). Moreover, initial set up of protected regions (PR's) at application launch time can be confirmed by remote attestation. It is believed that one or more of these automatically repeatedly performed access-restricting test operations can make it much more difficult to compromise the workings of a PR-endowed application operating within a PR-enforcing operating system and a PR-enforcing firmware/hardware platform complex.

In accordance with one aspect of the present disclosure, security measures are loaded (sourced) from the PR-owning application at least initially at application launch time, stored in the buried metadata memory zone(s) (the one or more that are not intelligibly accessible to the OS, to the Hypervisor or to other applications or to external processors and yet are testable for integrity). After integrity is verified, the security measures (Protected Region attributes) are enforced by the buried hardware/firmware mechanism (the PR enforcer) whose internal operations are also not accessible to (interfere-able by) the OS, the Hypervisor or other applications or master or supplemental/external processors. In one embodiment, however, the sourcing application can cause dynamic changes to the security measures specified by its owned PR's (or subsections thereof) at times of the owner application's choosing. In particular the PR-owning application can limit the time windows within which data inside its respectively owned PR's can be accessed even by authorized other applications (or by OS library functions or by external processors). Thus security compromising access to the executable code and/or informational data items of protected regions (PR's) can be made extremely difficult since hackers do not know when (e.g., under what conditions) and how the PR-owning application will change the security measures of its owned PR's and when or how the application will force a re-validation of its current security measures (e.g., current PR attributes). Thus exposure of the executable code and/or informational data items inside protected regions (PR's) can be minimized by surprise reconfiguration of the PR attributes. Alternatively or additionally, the PR-owning application may choose to re-purpose part of the virtual memory space allocated to it by among other things, reconfiguring the PR attributes of that part including converting the corresponding virtual memory space into a nonprotected region (a NPR).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 1A and 1B are schematic diagrams provided for side-by-side comparison with one another for explaining how a data processing system can be modified to implement one or more protected region (PR) aspects of the present disclosure.

FIG. 1C is a schematic diagram depicting an initial development phase for an application program being configured to execute in a virtualized machine environment provided by a Hypervisor (HV) that provides a unitary memory space for storing executable code and informational data items of one or more applications and of a guest operating system (OS) under and with which the applications run.

FIG. 2C is a schematic diagram depicting operations of a modified TLB during attempted R/W grabs at informational data items in protected regions.

FIG. 2D is a schematic diagram depicting operations of a modified TLB during attempted call and returns on executable code inside and outside a currently executing protected region.

FIG. 2E is a conceptual illustration of a Protected Regions hierarchy of physical and virtual memory spaces configured according to an embodiment of the present disclosure.

FIG. 3 is a flow chart depicting development and field deployment of a protected regions endowed application program.

DETAILED DESCRIPTION

Figure 1B:
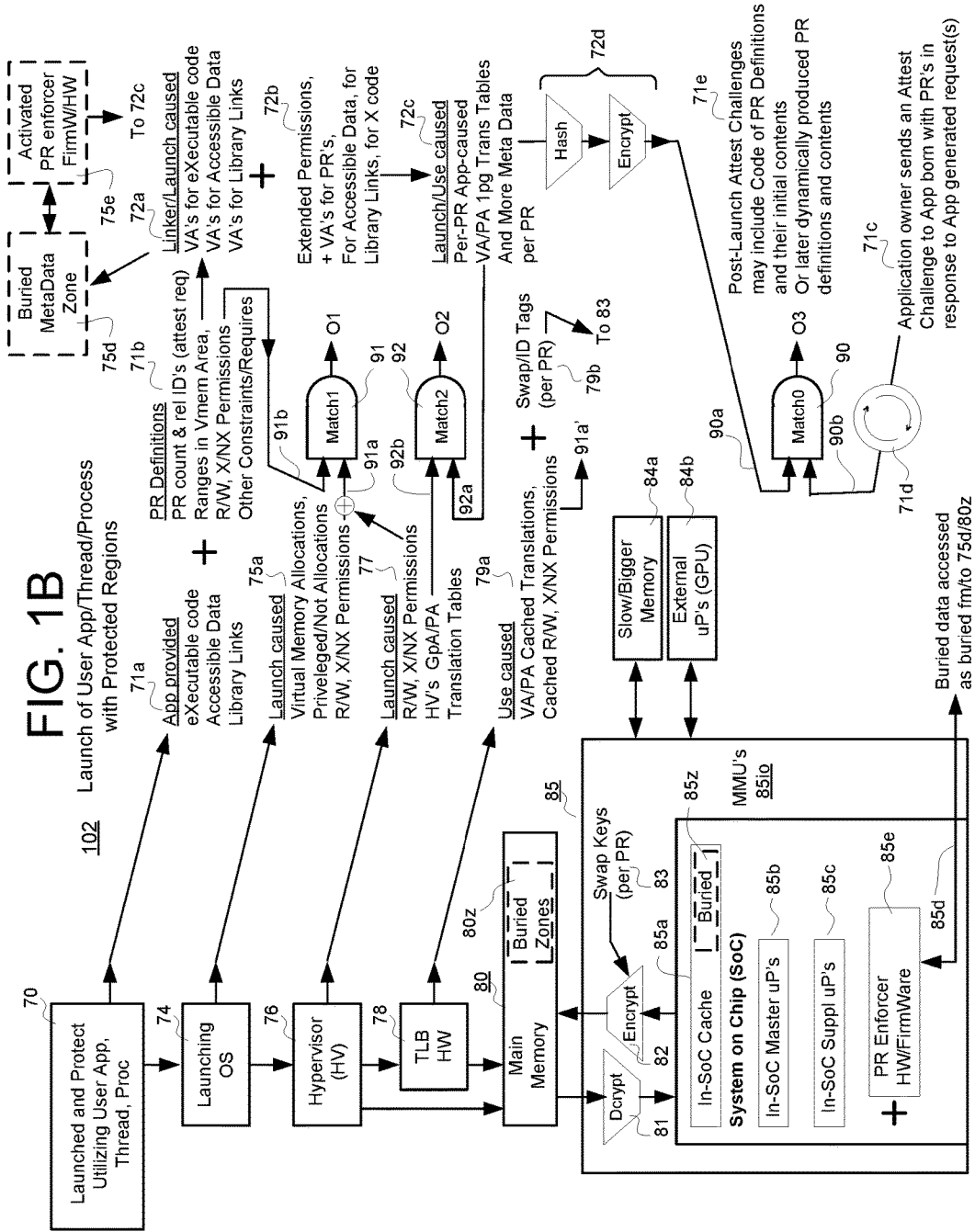

Various embodiments of the here disclosed technology rely on hardware and/or firmware support for code securitization and/or code validation/verification in computer or other data processing systems that might otherwise be more vulnerable to numerous kinds of malicious attacks and inadvertent design and development errors (faults). In particular, in one embodiment, a 'buried' set of application-supplied/specified behavioral constraints and/or requirements that is accessible only to specially privileged firmware is used to validate results produced by one or more of an operating system (OS), a Hypervisor (HV) and one or more space-sharing other applications. The OS, HV and the other applications cannot at random times alter the 'buried' set of application sourced—and/or—specified constraints/requirements or alter the internal operations of the specially privileged firmware/hardware protected regions enforcer (the PR enforcer). The latter operations include an automatically repeated set of access-match tests. As a result of the access-match tests, malfunctioning and/or malicious portions of the OS, HV and/or other applications (e.g., software viruses) cannot easily bypass the PR-enforced constraints/requirements.

It is to be understood that as used herein, the terms "hardware," "firmware" and "software" do not refer to abstractions but rather to physically real phenomenon which consume physical space and when in operational use, consume physical energy such as in the form of at least one of electrons and photons moving about to thereby define corresponding and physically real signals. Use of the term "virtual" does not detract from the physicality of the underlying phenomenon (e.g., useful machine, process, manufacture or improvement thereof) that provides the overlying virtualization. Examples of hardware include Boolean logic circuits, counters, registers, memory units that are configured to provide input/output data transformations or to store retrievable data and sequential state machines. Examples of firmware include physical signals stored in a control memory of a sequential state machine and configured to control operations of that machine. Examples of software include physical signals stored in a main memory of a data processing machine and configured to control operations of that data processing machine. Claims appended hereto which use terms such as "software", "firmware", "virtual" and the like do not preclude others from thinking about, speaking about or similarly non-usefully using abstract ideas, laws of nature or naturally occurring phenomenon. When in an active (e.g., an executing) operational mode, a "software" entity, be it an application program/thread/process, a virtual machine, an operating system (OS), a hypervisor or the alike is understood to constitute an ongoing physical process being carried out in one or more real physical machines where the machine(s) entropically consume(s) electrical power and/or other forms of real energy per unit time as a consequence of said physical ongoing processes being carried out therewithin. When in a static (e.g., non-executing) mode, an instantiated "software" entity or the alike is understood to be embodied as a substantially unique and functionally operative pattern of transformed physical matter preserved in a more than elusively transitory manner in one or more physical memory devices so that it can functionally and cooperatively interact with a software and/or firmware instructable machine as opposed to being merely descriptive and nonfunctional matter, where the one or more physical memory devices include, but not limited to, memory devices which utilize at least one of electrostatic effects, magnetic effects, phase change effects, optical effects or various combinations of these or other detectable forms of physical distinction to represent stored data. Storage media (or "storage" for short) does not mean signal transmission media per se.

Moreover, as used herein, the terms, "signaling", "transmitting", "informing" "indicating", "logical linking", and the like do not mean purely nonphysical and abstract events but rather physical and not elusively transitory events where the former physical events are ones whose existence can be verified by modern scientific techniques. Claims appended hereto that use the aforementioned terms, "signaling", "transmitting", "informing", "indicating", "logical linking", and the like or their equivalents do not preclude others from thinking about, speaking about or similarly using in a non-useful way abstract ideas, laws of nature or naturally occurring phenomenon.

Those skilled in the art may appreciate that the ordered sequence of terms: hardware, firmware and software indicate; based on historical development of those terms, progressively easier-to-modify sets of physically real phenomenon with hardware being ostensibly more difficult to modify (e.g., by use, historically, of a soldering iron) and with software being ostensibly easier to modify (e.g., by use, historically, of a punched hole computer cards), where firmware is ostensibly entrenched in the middle of the spectrum. With that said however, it may be appreciated that in modern complex data processing systems, the spectrum of hard to easy modification may at times be inverted depending on context, with software being the most difficult to modify without error due to its modern day complexity and hardware being easier to modify if exposed (e.g., if not securely encased in a packaging such as that used for hermetically sealing in one or more monolithically integrated circuits, —a.k.a. chips).

Referring to FIG. 1A, shown is a hierarchical schematic diagram depicting a process 101 of loading, linking and launching user application software 50 where the launched application does not establish protected regions (PR's) for itself and where the launch supporting hardware, firmware and software (e.g., the launching operating system or OS 54) does not necessarily include mechanisms for enforcing restrictions that might otherwise be provided by application-established PR's. (The here mentioned, application-establishment of application-owned protected regions will be described in more details below, starting with the example of FIG. 1B.)

As used herein the term 'application' or 'application software' is to be understood as having a connotation similar to that of a software 'process' and/or a software 'thread' as executed for example within a virtualized machine environment, the latter implying that physical hardware resources are shared on a time multiplexing and context swapping basis so that it appears as if many applications, processes, threads or similarly named programmed executional sequences are operating at a same time, perhaps while being run on different virtual machines and/or while using a high speed physical memory space (e.g., SRAM, cache) of limited size on a time shared basis. The term application, application program or user application will be used herein to represent programmed executional sequences having relatively low execution and data access privileges from the point of view of the application supervising OS. The operating system (OS) and some of its predefined library processes are understood to have higher execution and data access privileges from the point of view of the OS. It is to be understood that yet higher execution and data access privileges may be accorded to so-called, Hypervisor software (HV 56 in FIG. 1A) and to data processor controlling microcode (latter not directly shown in FIG. 1A, see 118*b* of FIG. 10) of in-SoC data processing units 65*b* (where SoC stands for system on a chip and where a hermetically packaged one such unit is schematically depicted at 65 in FIG. 1A). It is also to be understood that various parts of the operating system (OS) such as its library routines (to which the loaded and linked application operatively links) can be considered as applications, processes or threads executing under supervision of other parts of the OS. Some OS routines may have higher R/W, X/NX access privileges than others.

Referring still to FIG. 1A, a first application loading, linking and launching operation 101 is depicted wherein the operation 101 does not use the protected regions (PR's) aspects of the present disclosure. It is assumed for sake of simplicity that there is just a single user-sourced and loadable (e.g., pre-compiled) application file 50 that is loaded into system main memory 60, linked to declared library routines and launched under supervision of a predefined and virtualized operating system (OS) 54. The virtualized machine environment is enabled by use of a software Hypervisor (HV) as indicated by block 56. After being loaded and linked to declared library services, the depicted application 50 provides certain pieces of executable code, certain pieces of software-accessible informational data items and certain resolved library links that are usable when the application is launched (its execution is started). These application sourced and execution enabling items are denoted as 51 in FIG. 1A. In the illustrated example, all operations of the application 50, operating system (OS) 54 and Hypervisor (HV) 56 are exclusively executed by at least one of so-called, master processor units 65*b*. These processor units 65*b* are referred to master because they are the ones exclusively responsible for directly executing instructions sourced from the application (App) 50, operating system (OS) 54 and Hypervisor (HV) 56. Other, supplemental processor units (e.g., 65*c*, 64*b*) may be present where these supplemental processor units are not responsible for directly executing instructions sourced from the App 50, OS 54 and/or HV 56.

During launching and/or execution of the installed application 50 in the virtualized machine environment (56/54), the production of certain data processing signals is caused to occur on behalf of the launched application 50. This production 52 includes the defining and storing of virtual addresses (VA's) for addressing the executable code pieces of the application, the defining and storing of virtual addresses (VA's) for addressing the accessible data pieces of the application and the defining and storing of virtual addresses (VA's) for addressing requested library services to which the application 50 is linked. These application launch caused events are denoted as 52 in FIG. 1A and are shown for the sake of later comparison to counterpart, launch caused events denoted as 71a, 71b in FIG. 1B.

Launching of the application 50 also causes the overlying operating system 54 to perform certain operations including, allocating static and dynamic areas of virtual memory for use by the launched application 50, designating one or more of the allocated areas as being privileged or not (from the OS's point of view), and attaching access permissions to the allocated areas, for example in the form of read and write permissions (data load and store permissions, also denoted as R/W permissions) and executable versus non-executable permissions (X/NX). The launching OS 54 is coupled to a Hypervisor 56 where the latter is constituted as privileged software that creates guest OS address to physical address (GpA/PA) translation tables. The creation of these hypervisor-sourced translation tables (GpA/PA) is denoted at 57. To be more precise, the OS 54 is responsible for generating one or more higher up hierarchical translations known as virtual address (VA) to guest 'physical' address (GpA) translation tables. GpA's are not truly physical addresses but appear to be so from the OS's point of view. The Hypervisor 56 is responsible for generating deeper stages (hierarchically lower down) translation tables known as guest 'physical' address (GpA) to real physical address translation tables. When the real physical address (PA) of a given virtual address (VA) is to be determined, a process known as walking the VA/GpA/PA hierarchical tables may be executed. However, this VA/GpA/PA tables walking operation may consume a relatively large amount of time and/or consume a significant amount of system resources. The OS application launch caused events are denoted as 55 in FIG. 1A and are shown for the sake of later comparison to counterpart, OS launch caused events denoted as 75a in FIG. 1B.

In order to speed up translation of virtual addresses (VA's) into physical ones (PA's), a hardware mechanism known as a translation lookaside buffer (TLB) 58 is provided. More frequently needed ones of translations that have already been once determined by the VA/GpA/PA tables walking operation are cached as direct VA/PA address translations in the TLB 58 together with corresponding R/W and X/NX permissions provided by the OS 54 and/or by the Hypervisor 56. In one embodiment, it is the maximally restrictive ones of the union of the OS and Hypervisor R/W and X/NX permissions (R/W, X/NX Maxed R Permissions) that are cached in the TLB. If an immediately needed VA/PA translation is not found to already be cached in the TLB then part of the hardware/firmware under supervision of the hypervisor 56 is called upon to perform the walk-through and search through multi-level VA/GpA/PA translation tables (56,57) looking for the combinations that provides the needed VA/PA translation. The hardware/firmware under supervision of the hypervisor 56 also typically moves data on as needed basis between the on-chip cache 65a and off-chip other memory (e.g., 60 and/or 64a). In one embodiment, the output PA's are each the address of a 4 Kbyte page of memory rather than one for a specifically needed item of code or informational data and an offset is added to the physical page address (PpgA) to access the desired item of code or data. The output of the TLB hardware 58 is known as a TLB payload 59. Physical addresses and corresponding read/write signals generated in response to either the output of the TLB 58 or that of the hypervisor 56 are supplied either to a high-speed memory cache (e.g., SRAM) 65a disposed within a monolithically integrated circuit packaging 65 housing a so-called system on a chip (SoC) or to an off-chip main memory 60, where the latter main memory is normally implemented as DRAM (Dynamic Random Access Memory) but may also include SRAM (Static Random Access Memory) and nonvolatile flash memory. It is up to the OS 54 and/or the Hypervisor 56 to determine which parts of physical memory constitute main memory and which constitute auxiliary (e.g., bigger slower) memory. Data stored within the SoC package 65 is typically stored in non-encrypted form (plaintext form). Data stored off-chip such as in main memory 60 and in slower memory 64a such as off-chip disk memory (e.g., magnetic or SSD) may be stored in encrypted form. Some of the off-chip data may be stored in non-encrypted form (plaintext form) depending on user determined trade offs between security and speed. Appropriate decryption and re-encryption hardware mechanisms (not explicitly shown in FIG. 1A, but understood to be within an MMU's shell 65io) may be used for converting stored data from encrypted form to plaintext form on an as needed basis. Code and data that are frequently used for current operations are swapped (via pathway 61) into the in-chip cache 65a under supervision of the Hypervisor 58. Typically, as mentioned, it is system hardware and/or firmware that is called upon to perform the actual data swapping while under supervision of the Hypervisor 58. Code and data that are no longer frequently needed for current operations are swapped out (via pathway 62) of the in-chip cache 65a and stored in slower off-chip memory space (e.g., 60, 64a). The hypervisor 56 and/or its supervised data-swapping hardware/firmware resources automatically take care of the bookkeeping regarding which chunk of data (e.g., 4 Kbyte page) is stored in cache 65a or main memory 60 or in a slower/bigger form 64a of memory such as magnetic disk or solid state disk (SSD). One or both of the Hypervisor (HV) and the operating system (OS) may automatically take care of the bookkeeping regarding which chunks of on-disk data are stored as encrypted data and which are stored as plaintext data.

In addition to its on-board cache memory 65a, the SoC package 65 houses one or more "master" data processing units, such as microprocessor cores which are here collectively denoted as Master uP's 65b. Directly executable codes of the Hypervisor 56, of the operating system 54 and of the launched user application 50 are executed by at least one of the "master" data processing units. The SoC package 65 may also house one or more "supplemental" data processing units 65c which can provide specialized, callable services but which do not directly execute the executable codes of the Hypervisor 56, of the operating system 54 and of the launched user application 50. An example of a supplemental data processing unit within block 65c may be an on-chip Graphics Processing Unit (GPU—not shown). Inclusion of such an on-chip GPU does not preclude provision of off-chip GPU's as well (e.g., among external processors 64b). Although not shown in FIG. 1A, it is to be understood that SoC package 65 may include special memory units used for storing microcodes that are being currently used by the in-chip data processing units (uP's) 65b, 65c when executing respective op code instructions (opcodes). The one or more special memory units are not directly accessible by executing user software (e.g., application 50) or even by the platform hosted operating system 54. As those skilled in the art will appreciate, compiled user software (e.g., application 50) typically causes op-codes and/or opcode-targeted data to be supplied to the in-SoC Master uP's 65b and then the Master uP's utilize the microcode that is accessible to them to operate on register data and/or main memory data. In one embodiment, uP used registers are each 64 bits wide. In one embodiment, only a lower 48 of those bits are used for physical addressing while the upper 16 may be used for other functions. In one embodiment, the registers of the in-SoC Master uP's 65b include a program counter, an accumulator, a top of stack pointer, a base address providing register, and offset providing register and so on. Typically, in a virtualized machine environment, the user application 50 will not try to directly access the base hardware registers (e.g., physical program counter, physical top of stack pointer, etc.) although they could (except for a few registers reserved for access only by the Hypervisor 56). Instead they will more typically use virtualized machine resources provided on a time multiplexed basis by the Hypervisor 56. The OS 54 and/or the Hypervisor 56 may directly or indirectly access the base hardware registers (e.g., physical program counter, physical top of stack pointer, etc.) when performing context swaps.

In addition to the illustrated in-SoC data processing units (uP's) 65b and 65c, the application hosting platform (not directly shown) may include one or more, "external" specialty or general purpose data processing units 64b that are external of the SoC packaging 65 (as partly mentioned above) and provide supplemental general purpose data processing functions and/or specialty functions such as video or other graphic data processing (e.g., GPU's), audio data processing, high speed parallel math processing (SIMD's) such as 3D vector processing, memory management processing (MMU's) that supplements and/or duplicates memory management processing provided by the SoC I/O shell 65io; and so forth. The external data processing units 64b may be operatively coupled to the main memory 60 and/or to the slower/bigger memory units 64a and may be commanded by instructions sent to them from the Master uP's 65b at the request of one or more of the operating system 54 and application program 50. Since the external data processing units 64b are outside the protective packaging of block 65, data sent to those off-chip resources may be in encrypted form while being conveyed between chips. The requests for supplemental or specialized services may include those for performing various data load and data store operations for predetermined areas in the corresponding memory units 60 and/or 64a and/or for causing the external data processing units 64b to carry out various ones of their provided services. As will be seen below, in accordance with one aspect of the present disclosure, external data processing devices such as the specialty data processing units 64b and even the SoC internal but supplemental uP's 65c may be treated in one context as if they were merely memory accessing application programs, processes, threads or the like.

While FIG. 1A depicts in schematic form what happens during launch of an application 50 that does not establish for itself one or more protected regions (PR's), FIG. 1B depicts in schematic form what happens for a protection-requesting/utilizing application 70 that does cause one or more protected regions (PR's) to be established for that application and/or its threads and processes when it is installed, linked and initially launched. More specifically, the PR(s)-utilizing application 70 (which, more specifically, is initially provided as a pre-compiled application file—see 190 of FIG. 2A) not only provides its own executable code, initial accessible data and requested library links; as denoted by 71a but it also provides (either directly or by way of incorporation by reference) its own definitions 71b for initial and application-owned protected regions (PR's). (In one embodiment, rather than being static and fixed upon application installation, protected regions (PR's) and/or their constraints and/or contained executable codes and value data may be dynamically changed after the application is launched—see briefly 183.5 of FIG. 2A.) The application-provided initial PR definitions 71b include protected region identifications (e.g., a count of the number of PR's to be initially established and logical ID's for those PR's) and protected region range definitions (indicating one way or another what is considered to be inside or not inside each respectively identified PR; e.g., PR1, PR2, etc. —see briefly FIG. 2B). The application-provided initial PR definitions 71b further include respective R/W and X/NX permission attributes for the respective application-defined PR's where these respective R/W and X/NX permission attributes are separate and independent from OS provided R/W and X/NX permissions. Additionally, the application-provided initial PR definitions 71b may define yet other constraints (e.g., who is or is not allowed to access the PR or a PR subsection) or requirements to be enforced (e.g., when or under what conditions is executable code within the PR or subsection executable and/or when or under what conditions are informational data items within the PR or subsection are grab-able?) for each respective PR and/or other attributes for each application-defined PR. Various ones of such PR attributes 71b need not be globally enforced for the whole of the protected region (PR) but instead can be localized for different subsections inside the PR (see briefly 183.6 of FIG. 2A). In one embodiment, each PR may be subdivided into subsections as small as 4 Kbytes each where each subsection can have its own attributes that are partially or wholly unique from those of other subsections of the PR or are partially inherited from other subsections of the PR. For example, an upper half of read-only data within a given protected region (e.g., PR3 of FIG. 2B) may be readable by all outside applications while a lower half may be readable only by a defined subset of other applications and/or by specific executable threads (XT's) within specific other PR's (e.g., see for conceptual purposes, executable thread XT05 of FIG. 2B).

Of importance, the PR definitions 71b are 'owned' by the initially installed application 70 whose allocated memory space will be subdivided to include the protected regions (PR's) and only that application 70 can change or destroy them (or more specifically, ask the PR enforcer to change or destroy them). In other words, the PR definitions 71b are exclusively created (and/or defined) by the application 70 during its launch and optionally modified exclusively by the application 70 (e.g., by way of its allowed requests to the PR enforcer) during its runtime. In one embodiment, when the PR enforcer receives a request to create a new protected region (PR) or modify its attributes, the PR enforcer first verifies that the request originated as a result of an operation of a system master processor and from inside the virtual memory space of the PR-owning application (this includes cases where the application forwards its request by way of the OS) and not from some other application or due to operation of an external or supplemental processor. Thus application-internal PR's are created by, modified by and exclusively owned by the PR establishing application. By way of a more concrete example, the PR definitions 71*b* of FIG. 1B can be included within the initially installed application file (70—see 190.1 of FIG. 2A) or link loaded into memory as a library file at the behest of the PR-owning application 70 during the initial loading and linking of that PR-owning application 70 (see briefly 183.6 of FIG. 2A). After virtual addresses (VA's) are generated by the Hypervisor 76 for the protected regions (PR's) (and one-stage VA/PA translation tables are generated for them), the initially included PR definitions 71*b* are copied (although not necessarily copied in bit-for-bit sameness, it is the underlying information that is transferred as, or optionally transformed into PR enforcer executable format) into a 'buried' memory space or zone 75*d* of system memory by the PR enforcer. As used herein the term "system memory" refers to physical memory and includes a physical main memory as well as other data storage that for the most part can be addressed and read from and/or written to at least by a system master processor (and optionally by supplemental other processors). However, in accordance with the present disclosure a relatively small part (e.g., less than 10%) of the "system memory can be set aside as 'buried' metadata space (represented by dashed box 75*d* and also referred to as a 'buried' metadata zone 75*d*) where the system master processor (and supplemental other processors) cannot directly write intelligibly into that 'buried' metadata space or intelligibly read from it although it can cause the integrity of the metadata buried in that 'buried' metadata space to be verified. Only the PR enforcer can intelligibly read the metadata stored in a 'buried' metadata zone (e.g., 75*d*, 85*z*, 80*z*) so that it can enforce the PR attributes contained therein and only the PR enforcer can intelligibly overwrite the metadata stored in a 'buried' metadata zone.

More specifically, in one embodiment, data in the 'buried' metadata zone 75*d* can only be intelligibly read by (and optionally intelligibly modified by) a further 'buried' set of PR enforcing hardware/firmware mechanisms 75*e* (also referred to herein as the PR enforcer 75*e* and represented by a respective dashed box 75*e*) as shall be detailed below. Thus, none of a guest operating system (OS—e.g., 74), system Hypervisor (HV—e.g., 76), external supplemental processors (e.g., 84*b*), internal supplemental uP's (e.g., 85*c*) can intelligibly read the data stored in the 'buried' metadata zone 75*d* or directly cause it to be intelligibly changed (such that data integrity is preserved and passes integrity testing) without concurrent permission being given by the application that owns that metadata (a.k.a. the PR-owning application). None of external other user applications, threads, or processes (e.g., 250 of FIG. 2B) can intelligibly read the data stored in the 'buried' metadata zone 75*d*. Even the application (e.g., 70) which caused instantiation of the buried metadata (in buried zone 75*d*) can not intelligibly read the data stored in the 'buried' metadata zone 75*d*. However, the PR-owning application 70 can cause that buried metadata to be changed or destroyed by use of special PR-attribute changing opcodes provided in the microcodes holding section (e.g., 218*e* of FIG. 2B) of the master uP's 85*b* and usable only by the PR-owning application to request that the PR enforcer perform these operations. In other words, the 'buried' metadata zone 75*d* can be caused to be dynamically written into or destroyed at the behest of the PR-owning application 70 (with the cooperation of the PR enforcer 75*e*) as shall also be detailed below—see for example 183.5 of FIG. 2A).

The data storage space which has the buried metadata of zone 75*d* (represented by dashed box 75*d*) stored therein is not located where dashed box 75*d* is drawn. Rather, that data storage space may be designated to be located in an OS or Hypervisor identified storage unit and the so-designated buried metadata zone 75*d* may be allocated into special address spaces having access attributes of being a buried zone, for example the ones denoted as buried zone 80*z* within the main memory 80 and buried zone 85*z* within the on-chip cache 85*a*. Additionally or alternatively, parts of the buried meta data may be located in other data storage units whose respective storing areas for that buried metadata are given the access attributes of the buried zone such that intelligible access to those various buried zones 80*z*, 85*c* and/or others (not shown) is constrained by hardware and not overideable by software. More specifically, in one embodiment, only an in-SoC hardware/firmware mechanism referred to here as the PR enforcer 85*e* can intelligibly read the data in the on-chip buried metadata zone 85*z* for the purpose of enforcing constraints and/or requirements defined by data in the buried metadata zone 75*d* and only the PR enforcer 85*e* can overwrite data or destroy data present within the on-chip buried metadata zone 85*z*. The data in the on-chip buried metadata zone 85*z* is swapped off-chip or back into-chip in ways similar to how other on-chip and off-chip data is swapped except that the special access constraints assigned to the designated buried metadata zone 75*d* are enforced. In one embodiment, only special PR-attribute changing opcodes provided within the microcodes holding section of the master uP's 85*b* can be used to command the PR enforcer 85*e* to overwrite data or destroy data present within the buried metadata zone 75*d* (which zone can physically occupy area 80*z* as well as 85*z*) and only if the call for those special opcodes comes from (e.g., originates from) the PR-owning application 70. On the other hand, the hypervisor 76 is still allowed to keep track, without being able to intelligibly read it, of what part of the buried metadata 75*d* is inside the buried section 85*z* of the cache 85 and what part is inside buried section 80*z* of the main memory 80 or elsewhere in physical memory.

Dashed box 75*d* is shown where it is in FIG. 1B to represent the buried metadata so that interaction between the buried metadata 75*d* and various aspects of application launch can be more easily depicted. Similarly, a dashed box 75*e* representing the activated PR enforcer 85*e* is shown where it is in FIG. 1B so that interaction between it and the buried metadata 75*d* and various aspects of application launch and execution can be more easily depicted. The actual PR enforcer 85*e* is securely encapsulated inside the SoC 85.

The initially included PR definitions 71*b* are not buried while they are stored in the initially loaded application file 70. (See also, 190.1 of FIG. 2A). However, they are structured so as to be remotely attestable to by the author or other provider of the initially installed application 70 after having been copied (meaning information transferred and optionally transformed into PR enforcer compatible format) into the buried metadata zone 75*d*. More specifically, in one embodiment, remote attestation is used to verify that the initial PR definitions 71*b* that are to be copied (e.g., whose information is to be transferred and optionally transformed) from the application data file (or from a link loaded file referenced by the application file) and then stored in the 'buried' metadata zone 75*d* are unchanged relative to what the author or other provider of the application defined as being part of the installed and initially launched application 70. Also the same remote attestation procedure can verify that contents of each initially defined PR (or of a specified subset of the PR's) are unchanged relative to what the author or other provider of the application defined as being part of the installed and initially launched application 70. This attestation can be carried out at a time specified by at least one of the owning application or the OS and used to verify that, immediately prior to activation of firmware-enforcement of the PR-defined constraints/-requirements, the initial setup of the application 70 has not been changed by way of malfunction and/or by malicious interference by an outside entity or by the OS 74 or by the Hypervisor 76 or by other applications sharing memory space with the launched application 70. In this way, it is assured that the correct set of protected region definitions and associated constraint-defining attributes are indeed stored in the 'buried' metadata zone 75d and the correct items of data are stored in the initially defined protected regions (PR's—see PR1, PR2, etc. of FIG. 2B).

The specifics of how attestation (and/or other forms of integrity verification) is caused to occur can vary. In one embodiment, a flag is flipped inside the 'buried' PR enforcing firmware 75e to indicate the attestation has been successfully attended to within a predefined period of time following application loading (and/or within a predetermined count of executed instructions) and irrespective of whether it was the OS 74 or the running application 70 that provoked an attestation challenge and a subsequent attestation completion. The 'buried' PR enforcing firmware 75e can block the application 70 from executing beyond a predetermined initial extent if the attestation completion flag is not flipped to true, for example within predetermined length of time following a launch request and/or after a predetermined number of instructions of the application have executed without a flip to true of the attestation completed flag. In one embodiment, and as shall be more readily understood later below, the initially installed and launched application 70 may subdivide itself into at least two protected regions (PR's—see for example 182, 183 of FIG. 2A) and one nonprotected region (NPR—see for example 181.4 of FIG. 2A), a first of the PR's having execution only permission (X=true, R=false/W=false) and the second PR having no permissions (X=false, R=false/W=false). One of the first operations that may be carried out (as an example, and as allowed by the extent delimiting function associated with the attestation completion flag) in the NPR portion is to instantiate an executable thread (XT) within the first PR (the one having execution only permission) where that thread provokes a remote attestation challenge at least against itself (—see for example 182.1 of FIG. 2A). If the challenge is successfully met, a second operation carried out within the first PR may be to dynamically reconfigure the PR definitions (71b) of the application 70 (—see for example 183.5 of FIG. 2A). In this way the initially installed application cannot be used for any other function than validating the integrity of its own contents when first loaded, linked and launched. If the attestation-based integrity challenge is not met, the application 70 is automatically halted and an exception flag is raised. It is within the contemplation of the present disclosure to alternatively or additionally use other integrity verifying techniques such as checksums, ECC (error detect and correct codes), hash verification and so forth to verify that the integrity of the initially installed PR definitions 71b have not been compromised.

In one embodiment, all enterings by executing threads (XT's) into a given PR and all accessings of informational data within the PR are prohibited until it has passed attestation. This prohibition is enforced by the PR enforcer firmware/hardware. In such an embodiment, a non-PR part of the application requests attestation, for example by having the OS send a request to an application-specified external source to issue the attestation challenge. In one embodiment, the watchdog time restrictions and/or number of executed instructions limits are not used. In one embodiment, if all the code of a given application is inside one or more in PRs, one of the PR attributes of all that code can be that it is not accessible until after it has passed attestation, where in this case the OS on its own initiative issues the attestation request. Other methods for verifying the integrity of PR attributes and/or the integrity of executable code and/or informational data inside a subset or all of the protected regions (PR's) may alternatively or additionally be used.

Figure 2A:
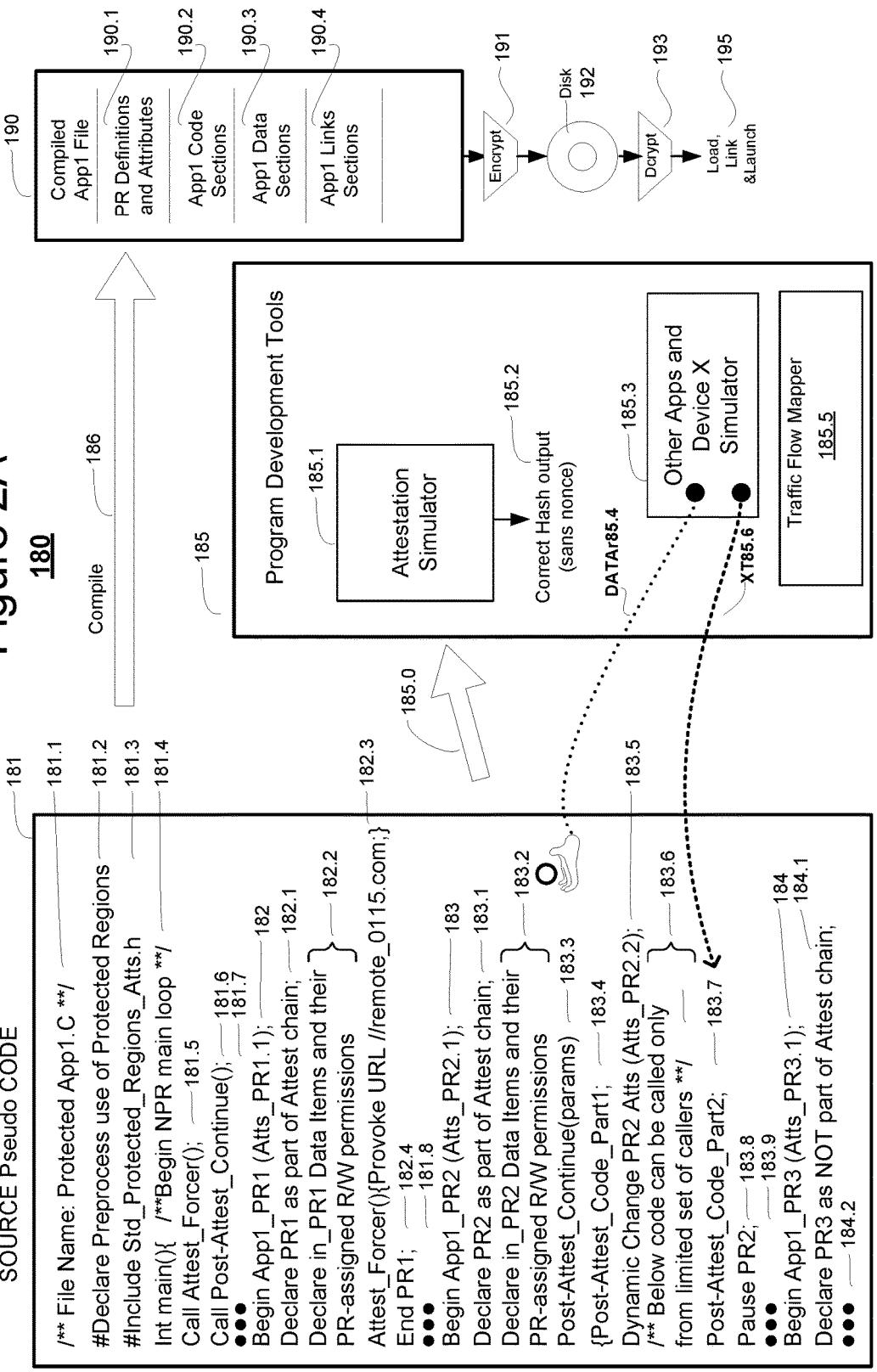
FIG. 2A is a schematic diagram depicting pseudocode declaration and instantiation of protected regions as well as generation of a PR's-endowed application file.

The application launching OS 74 of FIG. 1B generally performs substantially in the same way as does the launching OS 54 of FIG. 1A except that it should have awareness of the possibility that the launching application 70 is declaring itself as being one having protected regions (PR's) (—see for example 181.2 of FIG. 2A) and defining its owned protected regions (PR's) 71b (—see for example 182, 183, 184 of FIG. 2A). If the OS 74 detects that the launching application 70 is declaring itself as having protected regions (PR's) and is defining its owned protected regions, the OS 74 automatically specifies respective start-of-PR virtual addresses (VA's) for the declared protected regions (PR's) as indicated at 72b. The OS 74 also asks the Hypervisor 76 to generate physical addresses (hyper-PA's) for the declared protected regions (PR's). The OS 74 additionally generates one stage VA-to-PA translation tables for the declared protected regions as indicated at 72c. The OS 74 then commands the PR enforcer (for example by way of a special opcode) to transfer the information of the generated one stage VA-to-PA translation tables (with or without an optional conversion of information format) into the 'buried' metadata zone 75d together with other per-PR attributes data as shall be detailed by FIG. 4.

When the launching OS 74 (in cooperation with the Hypervisor) allocates virtual memory space for the launched application 70 it also generates OS-sourced R/W and X/NX general permissions as indicated at 75a. The Hypervisor 76 generates its own R/W and X/NX general permissions as indicated at 77. (By 'general permissions' it is meant here as to whether generally a read, write or execute will be permitted. On top of this, the PR attributes may define even more restrictive permissions directed to who (e.g., which app or app portion) may read, write or have one of its executable threads (XT's) snake into the PR and under what state or other conditions (e.g., at what times).) Ultimately these general permissions are merged by a restrictions merging function that in one embodiment, picks the most restrictive one of each respective pair of the read/write/execute general permissions ($R_{OS}/R_{HV}$, $W_{OS}/W_{HV}$ and $X_{OS}/X_{HV}$) and the formed unions of the most or more restrictive permissions are reproduced within the payload outputs 79a of the TLB hardware 78 during run time. It is within the contemplation of the present disclosure to use unions of general permissions other than the most restrictive ones depending on context.

In FIG. 1B, for the sake of avoiding a possibly confusing depiction of crossing lines in that figure, the merged OS and HV provided R/W and X/NX permissions are shown as being applied as first inputs 91a to an automatically repeated first match-of-access parameters confirmation test 91. This first match-of-access parameters confirmation test 91 is one of a plurality of such tests 90, 91, 92 that can be carried out in parallel by the PR enforcer 75e and in conjunction with use of the application-provided, protected regions definitions 71b. A second set of inputs 91b for the first match confirmation test 91, come from the R/W and X/NX permission definitions provided by the PR definitions data 71b, where the latter are buried in the 'buried' metadata space 75d and provided to the first match test 91 from the 'buried' location during runtime. This first match confirmation test 91 is automatically repeatedly carried out by the PR enforcing firmware 75e once the latter is activated by attestation and/or another appropriate integrity verification method. Thus the output results O1 of the first match confirmation test 91 cannot be faked by, or altered by OS or HV code because neither of the latter can look inside (read from) the 'buried' metadata space 75d to see what the correct input 91a should be. The first match confirmation test 91 is automatically and repeatedly run during application execution to verify that the R/W and X/NX permissions 91b of a currently in use, protected region (e.g., PR1, PR2, —see FIG. 2B) correspond with those 91a provided by the combination of the OS 74 and the Hypervisor 76 (where in one embodiment, and for speed's sake that combination is output in the payload 79a of the TLB 78 rather than being output by the restrictions merging function shown feeding input 91a). If there is a mismatch, and depending on context, the first match confirmation test 91 may automatically cause the PR-owning application 70 to shut down because the mismatch (e.g., a false output O1) indicates that at least one of the OS 74, the HV 76 and the launched application 70 has been compromised. In one embodiment, rather than loading the R/W and X/NX permissions 91a from the permissions merging function (shown as an encircled plus sign), the first set of inputs to match confirmation test 91 are obtained as signals 91a' from the payload output 79a of the TLB hardware 78 for speed's sake.

The context considerations which determine whether failure (e.g., O1=False) of the first match confirmation test 91 causes a shutdown or not of the corresponding application 70 can include consideration of the fact that a current operation is merely a data load step and not a data store (write) step and/or the fact that a current operation is not a code executing step. More specifically, if the current operation is merely a data load step and the PR constraints definition 71b provides code execution permission (X=true/NX=false) as well as data load and store permission (R=true/W=true) while the OS/HV merged, and thus more restrictive, permissions 91a (or the TLB sourced version of the restrictive permissions 91a') provide a read permission (R=true/W=false) then the mismatch can be ignored because the PR-sourced permissions are of wider (more empowering) latitude than the OS/HV-sourced permissions 91a (or alternatively than the TLB-sourced permissions 91a') where the latter tend to be more restrictive due to the restrictions merge function. On the other hand if the PR-provided constraints 91b are relatively narrow (e.g., R=true/W=false and X=false/NX=true) while the OS/HV-sourced and merged permissions are of greater latitude (e.g., R=true/W=true and X=true/NX=false) then that would be cause for worry and for automated shutdown of the application 70 because the latter mismatch (e.g., O1=False) indicates that the OS 74 and/or the hypervisor 76 has probably been compromised. Otherwise why would the merger function (the encircled plus of FIG. 1B) be outputting a less restrictive permission? Moreover, if the to-be confirmed operation is a data store operation or a code execute operation, then the compared permissions 91a/91b (or 91a'/91b) may need to be more closely aligned to one another because there is heightened risk that something has gone wrong.

Underlying the above explanations of different reactions to permissions mismatch (e.g., O1=False) depending on context is the idea that the PR-provided permissions 71b, as buried in the 'buried' metadata space 75d are more trusted than the later timed and OS/HV-provided or TLB-provided permissions 75/79a. The reason is because in one embodiment at least one of the OS 74 and the initially launching application 70 (—see for example 181.5 of FIG. 2A) automatically caused an attestation challenge to be sent for the application 70 before any significant portion of the application code was executed (for example as delimited by the extent of initial execution function associated with the attestation complete flag). In one embodiment the application-initiated provoking of the attestation challenge is placed as a subroutine inside of an executable-only first PR region (—see for example 182.2 of FIG. 2A) whose data cannot be read or overwritten by any other user software or the OS 74. The application-request for an attestation challenge is transmitted in encrypted form to a URL of a remote challenge-providing server known to the application. (In one embodiment, a plurality of dummy requests are sent together with the real request so that is difficult for those snooping on the communications channel to isolate the real request where all are encrypted.) In response, the remote challenge-providing server asks the OS 74 to run through a hardware hash generator and a hardware encryptor (see 212/213 of FIG. 2B) the application-provided PR definitions 71b and the contents of the application-defined initial PR regions (not shown, see PR1, PR2 of FIG. 2B) together with a one-time nonce code provided by the challenger. The has result is returned in encrypted form to the challenge-providing server. This allows the remote challenger to verify that the PR definitions 71b and the code and data contents of the initially defined PR regions have not been compromised prior to installation and launch. The launched application 70 (or the PR enforcing firmware 75e waits for return of a digitally signed certificate from the challenger, verifying that the challenged code is attested for, before the launched application 70 continues (—see for example 181.6 of FIG. 2A) with execution of the rest of its executable code (including executable code residing in one or more protected regions (PR's)—see for example 183.4 of FIG. 2A)).

As explained above, the launching and/or execution of the application 70 causes certain constraint defining attributes 72c to be stored (buried) in a specially privileged memory area (a metadata storing area 75d) that cannot be afterwards accessed by any of user software (e.g., 70), OS software 74 or even hypervisor software 76. Despite this, in one embodiment, a special opcode may be used to pass these buried constraint defining attributes 72c through a system hasher and then encryptor (see 212/213 of FIG. 2B) where the hashed encrypted signals (e.g., signals 90a of FIG. 1B) are sent to a remote attestation challenger for remote verification of their integrity. The execution of one or more of such attribute-verifying attestations is represented in FIG. 1B by match confirming test 90 (Match0) and by its output O3 (partially defined by text 71e) which upon successful completion causes the attestation complete flag to be flipped to true inside the PR enforcing firmware 75e. The execution of the combined but buried hash and encrypt process is represented in FIG. 1B by 72d. In provoking an attestation process, the application 70 may automatically asks for the challenge (—see for example 182.3 of FIG. 2A) and may wait for the external responder to automatically reply with a challenge signal 71c containing a one time nonce code. The hashed encrypted combination of the contents of the challenged area (e.g., PR1) and the one-time nonce code are returned to the challenger. If the correct code stream is sent, the challenger then returns a digitally signed certificate verifying that the challenge has been satisfactorily met. If not, the application 70 is automatically halted and an exception flag is raised. In one embodiment, if the attestation challenge is not passed and/or one of the permission match tests is not passed, the PR enforcer firmware/hardware automatically ensures the preservation of secrets, typically for example by destroying the decryption keys of the protected regions (PR's) or, if even greater security is desired, by also destroying parts or all of the data in the protected regions (PR's) that failed the attestation or match tests.

In FIG. 1B, signals-exchange icon 71d represents the provoking of the challenge and the handshaking output of the hashed encrypted signals 90a followed by the return of a verifying certificate. Input 90b represents the meaning of a successful handshake, namely, that the challenger determined that the sent hashed encrypted signals 90a were correct. Thus there is a match as represented by the true output O3 from the symbolized match confirming test 90 (Match0).

Such remote attestation (e.g., match confirming test 90) can consume a significant amount of time and therefore it is preferably not frequently run. However, at least at the time that the application is installed and initially launched, as well as at opportunistic times when the application will be waiting long times for external processes to complete (e.g., for a necessary data fetch from a slow external memory device to complete), the attestation challenge and response 71d can be automatically provoked to verify that current PR attributes and/or contents of one or more protected regions (PR's) are in accordance with what the remote challenger expects and have not been tampered with or otherwise compromised.

As implicitly indicated by text region 72a of FIG. 1B, after the application 70 has been launched and has established its application-owned protected regions (PR's) as buried within metadata storing area 75d and optionally has had those initial protected regions (PR's) validated by attestation test 90 and/or another appropriate method for verifying data integrity, the application will obtain from the launching OS 74 various virtual addresses (VA's) for its respective executable code sections, its accessible informational data sections and its requested library links. In accordance with one aspect of the present disclosure, the PR enforcing firmware 75e is at least partly buried (entrenched) within specially privileged memory portion 85e of the SoC 85 (for example in the form of added-on PR supporting microcodes) such that it cannot be read or altered by the OS 74 or the hypervisor 76 or other applications (not shown). This special PR enforcing firmware 85e (defined for example by added microcodes and/or added hardware and having functions invoked by the added-on new opcodes) automatically generates its own virtual address to physical address (VA/PA) direct translation tables (1 page tables) for certain areas within the application-owned protected regions (PR's). These firmware generated VA/PA translation tables are depicted in FIG. 1B as buried data signals 85d that are supplied in buried form to the metadata storing area 75d and then ultimately to a buried tests activating point 72c (for application to the buried hash and encrypt process 72d). In one embodiment, the physical addresses (PA's) 92a output by the firmware-generated VA/PA translation tables 72c are automatically repeatedly tested for matching against physical addresses (PA's) 92b output from the hypervisor produced VA/GpA/PA translation tables 77 (typically larger multi-level translation tables) or for matching against physical addresses (PA's) output as part of the payload from the hardware TLB 78. To distinguish between the two, physical addresses originated from the Hypervisor are also referred to herein as hyper-PA's while physical addresses originated from the buried metadata are also referred to as meta-PA's. The latter automatic match test is represented by the Match2 block 92 in FIG. 1B. A mismatch (O2=False) for this test 92 indicates that at least one of the launching OS 74 and the hypervisor 76 has probably been compromised because, if the virtual addresses (VA's) used by the OS 74 and/or hypervisor 76 do not match virtual addresses (VA's) specified by the per-PR translation tables 92a/72c of the currently in-use protected region (e.g., PR1, see FIG. 2B) then at least one of the OS 74, the HV 76 and the executing application 70 has probably been compromised. Therefore if the automatically repeated match confirmation test of Match2 block 92 indicates a mismatch (O2=False), the application 70 is automatically halted in response because at least one of the launching OS 74, hypervisor 76 and code within the currently in-use protected region (e.g., PR1, see FIG. 2) is no longer trustable. On the other hand, if the physical addresses (PA's) generated from the two separate sources (the VA/PA one stage translation pages buried in the metadata storing area 75d and the VA/PA payload data provided by the TLB), then the likelihood is high that none of the OS 74, the HV 76 and the executing application 70 has been compromised.

Still referring to FIG. 1B, the TLB hardware 78 of this PR enforcing embodiment 102 is modified to output different decryption/re-encryption swap key tags 79b based on an automatically obtained identification of the currently in-use protected region (e.g., PR1, see FIG. 2B) where each protected region may have its own unique set of swap keys (83) and corresponding tags 79b identifying those longer swap keys (83). In an alternate embodiment, certain protected regions (PR's) are grouped and each group is assigned its own unique set of swap keys (83) and corresponding tags 79b. In accordance with one aspect of the present disclosure, the contents of each protected region (PR) are kept encrypted except when swapped into the confines of the SoC 85, for example into the cache memory space 85a and then the per-PR or per-PR group swap keys (83) are used to decrypt the protected region's contents. In other words, a decryptor (e.g., hardware decryptor) 81 encapsulated in SoC package 85 is automatically used to decrypt PR-contained code and informational data items as the latter are swapped into the confines of the SoC 85, for example for storage in cache 85a and a re-encryptor (e.g., hardware re-encryptor) 82 also encapsulated in SoC package 85 is automatically used to re-encrypt PR-contained code and informational data items as the latter are swapped out of the confines of the SoC 85 and into more exposed resource space (e.g., into memory resources 80, 84a). Thus plaintext PR contents are not exposed outside the confines of the SoC 85 during runtime. If the per-PR or per-PR group swap keys (83) are destroyed (e.g., by a hardware mechanism that keeps them secured and inaccessible to any software, the outside-of-SoC-confines PR contents appear as mere gibberish. Thus one way of destroying per-PR content or per-PR group content when an application terminates (or fails attestation and/or permissions match) is to ask the hardware to destroy the corresponding swap keys. After that, a snooping code that studies de-allocated virtual memory spaces for left behind useful code will find only unintelligible gibberish in the areas where the PR content had been stored.

In one embodiment, the TLB output swap key tags 79*b* are automatically supplied as per-PR or per-PR group sets and used to reference longer corresponding swap keys that are accessible only to the hardware and are applied as inputs 83 of the cache decrypt (81) and re-encrypt (82) mechanisms disposed inside the in-SOC packaging (e.g., on chip) 85. Since different swap keys 83 may be used for the respective executable codes and informational data items of the different protected regions (PR's or groups thereof), the system is made more secure than for a case where no decrypt and re-encrypt function is used (see 61, 62 of FIG. 1A) or where a same single set of swap keys (not shown) is always used for translating between in-cache plaintext data and off-chip encrypted data for all data. In one embodiment, the portion of the TLB payload output depicted as 79*b* produces corresponding tags pointing to (e.g., indexing to) the corresponding set of swap keys, where the tags are referenced below as PR Key Tags (or PRKT's for short). In one embodiment, TLB output portion 79*b* on occasion also includes the identification tag for a next or target executable PR region (referenced below as a Target PRCAT). In one embodiment, for each protected region (PR) created in virtual memory, the PR-enforcing firmware automatically asks the hardware to generate a corresponding set of encrypt/decrypt swap keys, a corresponding and also relatively long PR identifying code (e.g., from one or more random number generators) and respective tags for these. The PR-enforcing firmware uses the given tags to reference the substantially longer swap keys and PR identifying code where the latter are accessible only to the hardware platform. In one embodiment, the PR-enforcing firmware can ask the hardware to destroy the long swap keys and PR identifying code when the application that owns these terminates.

In light of the above, it is seen that FIGS. 1A-1B provide a side-by-side introductory comparison between running without having protected regions (PR's) in force and running while they are enforced. However, that is not a complete picture. The use of the protected regions (PR's) concept can start with the writing of the source code (see FIG. 2A which is detailed below), and with the determination of what should and should not be fully or partially in each protected region (see FIG. 2B which is detailed below). This may be followed with the verification of protected region integrity at least at launch time (see FIG. 3A which is detailed below), and then with execution under protected region constraints and requirements (see FIG. 3B which is detailed below). As mentioned, when the protected regions (PR's) owning application (e.g., App1') is finished using one or more of its owned protected regions, it can command the PR enforcer 85*e* to relay to the platform hardware (e.g., 210' of FIG. 2B) a request to destroy the swap keys and/or the long code identifier of that protected region. The PR-owning application (e.g., App1') can also ask the PR enforcer 85*e* to destroy the associated metadata in the buried metadata storing area 75*d*/80*z* of the no-longer used protected region. In this way, snooping software is blocked from having access pathways to the executable code and/or informational data items of the being-destroyed protected region (e.g., PR2 of FIG. 2B). The virtual memory space freed by destruction of a given PR may be later re-allocated as a nonprotected region (NPR) of virtual memory space or as a different protected region (e.g., PRx of FIG. 2B).

With the above in mind, attention is now directed to FIG. 10. This figure is a schematic diagram depicting a development environment 100 in which protected regions (PR's) are not yet in force because they have not yet been defined (e.g., in terms of number of them to be allocated to each application, in terms of the extent/size of each of the PR's, in terms of the attributes of each PR, in terms of the PR ID and per-PR swap keys assigned to each PR and so forth). Instead, FIG. 10 depicts an application program 141 (a.k.a. App1) which ultimately may use PR's in a later portion of its development but where right now it is being developed and configured without reliance on PR's to execute (in accordance with predefined application specifications) within an allocated virtual memory space portion 140 (of a larger Unitary Apps/OS virtual memory space 124) that a guest OS 122 has allocated to that application (App1). During this early development phase 100, the under development application 141 is assumed to be placed within a trusted computing environment (e.g., trusted Host hardware platform 110, trusted Hypervisor 120 and trusted Guest OS 124). In other words, in this introductory example of FIG. 10, it is assumed that the under development application 141 is not subject to malicious external attacks including those from software viruses, worms, and Trojan horses as well as by external loophole exploitations. The hardware platform 110 on which development occurs is a trusted one loaded with a trusted host Hypervisor 120 and trusted Guest OS 122 running under that Hypervisor and where the software instructions of the OS, the Hypervisor and the application 141 are all executed by one or more master ones of the system uP's 118*p*. Although not shown, in some embodiments the Hypervisor 120 may allocate virtual memory space to a guest virtual machine (Guest VM) which for example is configured to execute a predetermined set of guest machine op codes such as Java™ byte op codes and application code may then run under supervision of the code of the Guest VM. Even when given substantially sanitized development environments such as 100 of FIG. 10, the under development application 141 is nonetheless subject to being corrupted by coding errors. Briefly, a code section developed by one set of programmers may erroneously call on a code section being developed by another set of programmers even though the overarching system design includes a prohibition against such a call. Such an erroneous call is possible because in the illustrated example 100 the memory space allocated by the guest OS 122 is a "unitary" virtual memory space 124 accessible substantially to all applications and OS routines and executable threads (XT's) thereof. (Of course some OS routines may be 'privileged' ones in the traditional sense of how an OS may limit access to some of its administrative routines only to similarly 'privileged' user applications—e.g., system administrator applications. However, in general most OS library routines are not so privileged because the intent is for even non-administrator applications to use those library routines.)

More specifically as shown in FIG. 10, the initial coding (source level coding) of the exemplary and under development program 141 is subdivided into a number of software sections including a pre-process declarations section 142, a main or top level program section 143 and one or more subsidiary program sections or subroutines 144. Different program-developing workers or groups thereof may be tasked with focusing on different parts of the under development program 141. Due to lack of communication or due to misunderstanding between programming groups (or due to misunderstanding of the overarching system design specification), one group may inadvertently insert code that snakes an execution thread thereof (e.g., thread XT06) into areas it should not snake into or that fetches informational data items (e.g., represented by the grabbed-at open circle at end of data R/W reach DATAr06) from areas it should not be reaching into with its data read/write pointers. Additionally, coding errors may lead to development of variable addressing values (e.g., pointers, indexes, tags; not explicitly shown, but note "Addr1" of source coded item 143*a*) that point to the wrong areas (e.g., 145, 146) in the unitary virtual address space 124 allocated to all launched applications and/or allocated to executing threads of the guest OS 122. Methods are disclosed herein for reducing the risk of such execution threading into (snaking into) improper execution code areas and/or of performing read/write accesses (data reach and grab e.g., DATAr06) with respect to data items that should not be read or modified by the accessing process.

Taken at a higher level of overview, FIG. 10 depicts part of a modern software development environment 100 for developing (coding, testing, modifying and re-testing) an application program 141 that is intended to execute in the field (outside the development laboratory) on a hardware platform based for example on a x86, ARM, or another such architecture and that provides one or more relatively sophisticated data processing units (e.g., CPU's, multi-cores, microcontrollers, GPU's, system-on-chip SoC units) as well as associated levels of memory (e.g., cache, SRAM, DRAM, Solid State Disk—SSD) and associated network communication capabilities (e.g., Ethernet, USB, Firewire, WiFi, etc.). Various trivial support structures such as power supplies, cables, connectors, wireless transceivers and so on may be present but are not shown in FIG. 10 to avoid unnecessary clutter as such are well understood by those skilled in the relevant arts.

A power-up or boot-up procedure will now be described from a system securitization point of view and still with reference to FIG. 10. Diagonal arrow symbol 105 indicates the preferred sequence of boot and activation. First the hardware platform 110 is started up in a self validating mode. This process may include execution of a basic system integrity check (BIOS) which validates the operability of onboard hardware resources such as physical memory units 116 (external-of SoC memory units) and physical data processing units such as 118*p* (e.g., internal within SoC processing units) and external ones (see 84*b* of FIG. 1B) as well as physical communication resources such as networking input/output units 160. Early in the self validating boot up (105) of the hardware platform 110, an onboard security processor 111 is activated to validate firmware (e.g., microcodes 118*b*, encrypt/decrypt functions 118*g*/118*h*) inside various hardware units of the platform including inside its data processing units 118 and its communication units 160. Included in this self validating process is the confirmation of software inside installed hypervisor software 120 of the platform 110 and confirmation of microcodes 118*b* provided for example inside the hermetically sealed packaging(s) of the on-board data processing units 118. The confirmed microcodes may alternatively or additionally be stored inside special, 'buried' memory space regions of system memory (e.g., 85*z*, 80*z* of FIG. 1B) where the 'buried' memory space regions are not ordinarily accessible to user software or even to the guest operating system (OS) 122 or to the Hypervisor 120. (As used here, system memory includes the system's main memory and other system accessible storage.) As those skilled in the art will appreciate, the hypervisor unit 120 is used for virtualizing one or more operations of the system. The security processor 111 uses a built in and software-inaccessible Hash generator 112 to form Hash sequences from code streams present inside the being-validated units (e. g., 114, 118, 160). These Hash sequences are automatically encrypted by an in-chip encryptor 113 and automatically transmitted to an external validation unit (not shown) that automatically returns digitally signed certificates validating (attesting to) the trustworthiness of the units tested by the security processor 111. One form of such trust confirmation is known as remote attestation. In the illustrated embodiment, the on-board data processing units 118*p* have their own encryption and decryption hardware and/or firmware 118*g*/118*h* for keeping secure any plaintext code held in the on-chip cache memory 118*a* or in the on-chip microcode storing area 118*b* and/or in other on-chip resources 118*d* where the thus-encapsulated (contained inside the chip) code is always re-encrypted (118*g*) before being swapped out to less encapsulated storage units 116. In one embodiment, the on-chip microcode 118*b* can control the allocation of privileges for accessing other in-chip data including that in the cache 118*a* and that in the other on-chip resources 118*d*.

For sake of completeness, a more detailed description is provided of some further components inside the discussed hardware platform units 114, 116 and 118. The physical data processing units 118*p*, which could be core processors of a multi-core system-on-a-chip (SoC) will typically each include one or more physical program counters such as 118*c* and other physical registers. Each time the Hypervisor 120 reallocates the physical data processing units 118 for use by different ones of virtualized actors (e.g., applications, processes, threads), the Hypervisor 120 will automatically first save the so-called physical and virtual processor contexts (e.g., program count and other register contents) of a control-relinquishing actor and install the pre-saved context of the control taking-over actor. Each of at least the master ones of the data processors 118*p* has direct access to a cache memory 118*a*, where as those skilled in the art will appreciate, the cache memory may be subdivided into portions of increasing capacity but decreasing speed such as L1, L2 and L3. The L3 level may be in common communication with all the processors 118. The cache memory 118*a* is also in operative communication with supplementary memory such off-chip static random access memory (SRAM) 116*a*, dynamic memory (DRAM) 116*b* and generally offboard disk memory 116*d* and solid state disk memory (SSD) 116*c*. As of those skilled in the art will appreciate, data is repeatedly swapped between the cache memory 118*a* and the other physical memory units 116 on an as-needed basis with or without encryption depending on tradeoffs between speed and security needs. A mostly hardware-implemented unit known as a translation lookaside buffer (TLB) 115 is used to cache frequently used translations between virtual addresses (VA's) and physical addresses (PA's). In one embodiment, the TLB 115 may use a set associative form of content addressable memory (CAM) for providing its translation services. In some embodiments, a service request to the TLB 115 (a set associative lookup request) causes the TLB 115 to output a payload signal containing a physical address (PA), a read or write permission (R/W) and an execute/don't execute permission (X/NX).

Continuing with the description of the self-securitizing boot up sequence 105, after the trustworthiness of the host hardware platform 110 and Hypervisor 120 have been validated, a guest operating system 122 is installed, validated in a similar manner (e.g., using code hashing and digital certification) and it is thereafter activated. In one embodiment (not shown) a guest virtual machine (VM) is installed in part of the virtual memory space to operate under the Hypervisor 120. In an alternate embodiment, the Hypervisor installs each guest VM in its own separate, isolated virtual space. The guest VM is validated and then VM compliant applications are installed to function within the domain of the guest virtual machine. In the latter case, the guest virtual machine (VM) may be considered as an application running under supervision of the Hypervisor 120 and within an allocated portion of the virtual memory space or alternatively with its own virtual memory space.

Finally (for the simpler case of Hypervisor 120 and guest OS 124), an application load, link and launch command signal ("Launch APP1") is passed into the trusted guest OS 122, causing the latter operating system to allocate an appropriately sized part (e.g., 140) of a unitary virtual memory space 124 into which code of the under development application 141 is loaded. As used here, the loaded application program 141 is understood to be in executable, virtual object code format such that it can be directly executed by the master uP's (inside 118*p*) with supervision by the guest OS 122 and in cooperation with the Hypervisor 120 and the supporting hardware platform 110. Depiction of the application program 141 in source code format within FIG. 10 is for the sake of simplified explanation.

Execution of the launched application 141 may be described in terms of execution threads (XT's) snaking their way through the allocated virtual memory space 140 using one or more corresponding, virtual program counters. The execution thread (XT) that launches the application program is denoted as XT01 and it executes inside the OS 122. The subject application (141, a.k.a. App1) is understood to be pre-compiled and linked to declared library routines or other library services and/or to parts of other, already-installed applications. A typical first section 142 in most application files includes so-called pre-process declarations for library and/or other links and declarations for variable data space allocations and data typing (which a link-loader part of the OS allocates and assigns types to). As part of the launch sequence, an executed initialization thread XT02 identifies virtual memory space that will be consumed by executable code (represented by solid black circles in FIG. 10) and virtual memory space that will be consumed either statically or dynamically by informational data items (represented by white filled circles in FIG. 10). A next execution thread XT03 initiates the main program section 143 of App1. Typically, the main program section 143 includes a closed loop of subroutine calls (e.g., 143*b*, 143*c*). However, for purpose of illustration, a first instruction 143*a* is depicted as a memory read operation ("Get Vdata (Addr1)") where the address parameter can be a variable pointer (typically an indirect pointer or offset plus index or tag). In the illustrated example, the pointer-based data access operation is depicted as a data reaching-to thread DATAr04 reaching to the white filled circle representing the memory location and contents of the pointed to data item(s). The icon of a grabbing hand is provided at the terminal end of the reaching-to thread DATAr04. While example 143*a* shows a data read operation (a data load operation), it could instead have been a data write operation (a data store operation).

The subsequent subroutine call 143*b* of FIG. 10 pushes at least a virtual return address onto a corresponding virtual stack (not shown) and passes execution control to another area 144*aa* in the unitary memory space 124 as depicted by execution thread XT05. The first called subroutine SubRt1 may optionally pass various ones of its input parameters (e.g., by pushing them onto the stack) for use by the control-taking over next area 144*aa* (executable target code area). One of the passed parameters can be the variable data fetched in step 143*a*. (Or it could be a pointer pointing to the virtual address (VA) where that target data is located.) If the variable pointer Addr1 of step 143*a* pointed to an incorrect memory location, then the fetched parameter is likely to be an error and subsequent processing steps (e.g., 144*a*: Call OS_Lib_Rt2) are likely to also be an error. Accordingly, when a control receiving memory area such as 144*aa* takes over control from a control relinquishing area such as 143*bb*, it may be useful to know whether the receiving area 144*aa* was authorized to (or expected to) receive a passing of control to it from an execution thread XT05 emanating from control relinquishing area 143*bb* and whether the control relinquishing area 143*bb* was authorized to pass control over to receiving area 144*aa* and/or whether the control relinquishing area 143*bb* was authorized to pass data-access pointers to the receiving area 144*aa* and if so; pointing to what other areas? If authorization was missing for any of these aspects (as well as possibly others), then it would be useful to flag the execution step XT05 has a faulty or suspect one. At this stage of the discussion, it will be left for further detailing below to explain how relinquishing memory area 143*bb* might be distinguished from control receiving area 144*aa* by assigning them to different protected regions (e.g., PR1 and PR3 of FIG. 2B) or even to different subsections (e.g., memory pages) of a same protected region where attributes change among the different subsections. (See for example, attributes changing code 183.5 of FIG. 2A, which figure will be later described.)

Subsequent to execution of steps 143*b* and 144*a* of application 141, yet further execution threads may be instantiated by the launched application program 141 of FIG. 1C. One such execution thread XT07 may transfer control to a hardware, firmware or software entity 150 that is outside of the allocated space 140 for application program 141 but nonetheless deemed to be inside the unitary virtual memory space 124 of the OS 122. The outside entity 150 may return result data to the calling thread XT07, or if it is malicious, may try to write data into virtual memory space 140 thereby potentially infecting the application program 141 (or another part of the unitary virtual memory space 124) with a virus. In this example however, because the development environment 100 is a trusted one, the called outside unit 150 (outside App1, a.k.a. 141) is taken to be a known, non-malicious outside component and thus whatever it does is taken to be a safe operation. As yet further shown in FIG. 10, the further instantiated execution threads and/or data reach-to operations, XT06, DATAr06, XT10 through XT999 may spread their snaking-to execution tentacles and data reach-for grabs anywhere within the allocated application memory space 140 or anywhere else within the unitary virtual memory space 124 of the OS, be it inside that of App1 (allocated space 140) or outside. The execution tentacles may include those relinquishing control to outside component (e.g., 150) such that areas of executable code inside App1 (e.g., black filled circle 145) may be modified and/or executed by the outside component (e.g., 150) and such that areas containing mission-critical informational data items (e.g., white filled circle 146) may be modified or read by the outside component (e.g., 150). In accordance with the present disclosure, there may be circumstances where it is desirable to constrain the reach of execution threads (e.g., XT05) and/or of data reach-for grabs (e.g., DATAr06) from any point of executional origin (e.g., 143*bb*) within the unitary application/OS space 124 to any readable and/or over-writable data containing area (e.g., 146) or to any executable code area (e.g., 145 or 144*aa*). Such desired constraint may involve temporal or conditional state constraints as well memory spatial constraints. In other words, not from what source location to which target location but also when and/or while what conditional system states need to be present?

Before explaining in more detail how such constraints and/or system state requirements can be made to be prerequisites for continued, flag-free execution, some additional observations about the development environment 100 of FIG. 1C are in order. During testing of the under development application 141, automated tracking software can be activated to keep track of the paths taken through virtual memory 124 by normally executing threads (well behaved execution threads or XT's) and the paths taken by threads that lead to erroneous outcomes (badly behaving threads). In other words, a traffic map may be developed showing points of origin (e.g., 143bb), destination (e.g., 144aa) and/or pass-through for normal and faulty execution threads and optionally showing the relative timings of such execution threads (when in the dynamic scheme of things they are supposed to take place or not take place) and/or the then present system states when good or bad outcomes occur. As will become apparent below, the respective constraints of different protected regions (PR's) may be statically instantiated at launch time and then dynamically changed by the executing application 141 that owns them so that expected timings (and/or extant system states) of various application-driven events can be assured to be present before a next instruction is allowed to execute. In other words, the number of, placements of and respective extents of the PR's may be dynamically changed by their owner (e.g., application 141) at time points determined by the application itself. (Additionally, the disposition of the application top-of-stack pointer may be varied to be well inside the boundary of a given PR or just at its border or in a nonprotected region (NPR) so as to thereby control who can or cannot access various on-stack informational data items—as will be understood later below.) At this stage of the explanation (FIG. 1C), where the App1 application is still under development however, the number and placements of protected regions (PR's) and their respective constraints and/or extant system state requirements have not yet been defined. Instead, the automated tracking software (not shown, see instead 185.5 of FIG. 2A) is used to automatically subdivide the unitary application/OS space 124 into 'potential' regions (not shown) of different kinds where some of these 'potential' regions might later be converted into protected regions (PR's) having respective privileges and constraints based on traffic mapping results produced by the automated tracking software (e.g., identifying well behaving thread paths and badly behaving thread paths or reaches).

With the help of such tracking tools, the human architects of the application can decide what are security-critical sections and what are not and thus assign different PR or non-PR attributes to the various sections of the under development application. By way of example, sections could be deemed critical (and thus deserving of more restrictive PR-based protection) because the sections deal with important secrets in plain text form such as customer passwords for an ecommerce application; or the sections interface with input from outside and thus are more susceptible to ingesting something malicious. Because of the way the Internet often defines sharable objects that can be shared and activated in web pages, such shareable objects are especially susceptible to being hacked or otherwise infected with problems. It is up to the human architects of the application to recognize these kinds of vulnerabilities and to decide what parts of an application are to be put into which kinds of PRs (e.g., more restrictive, less or hardly at all) and for what various reasons.

Figure 1D:
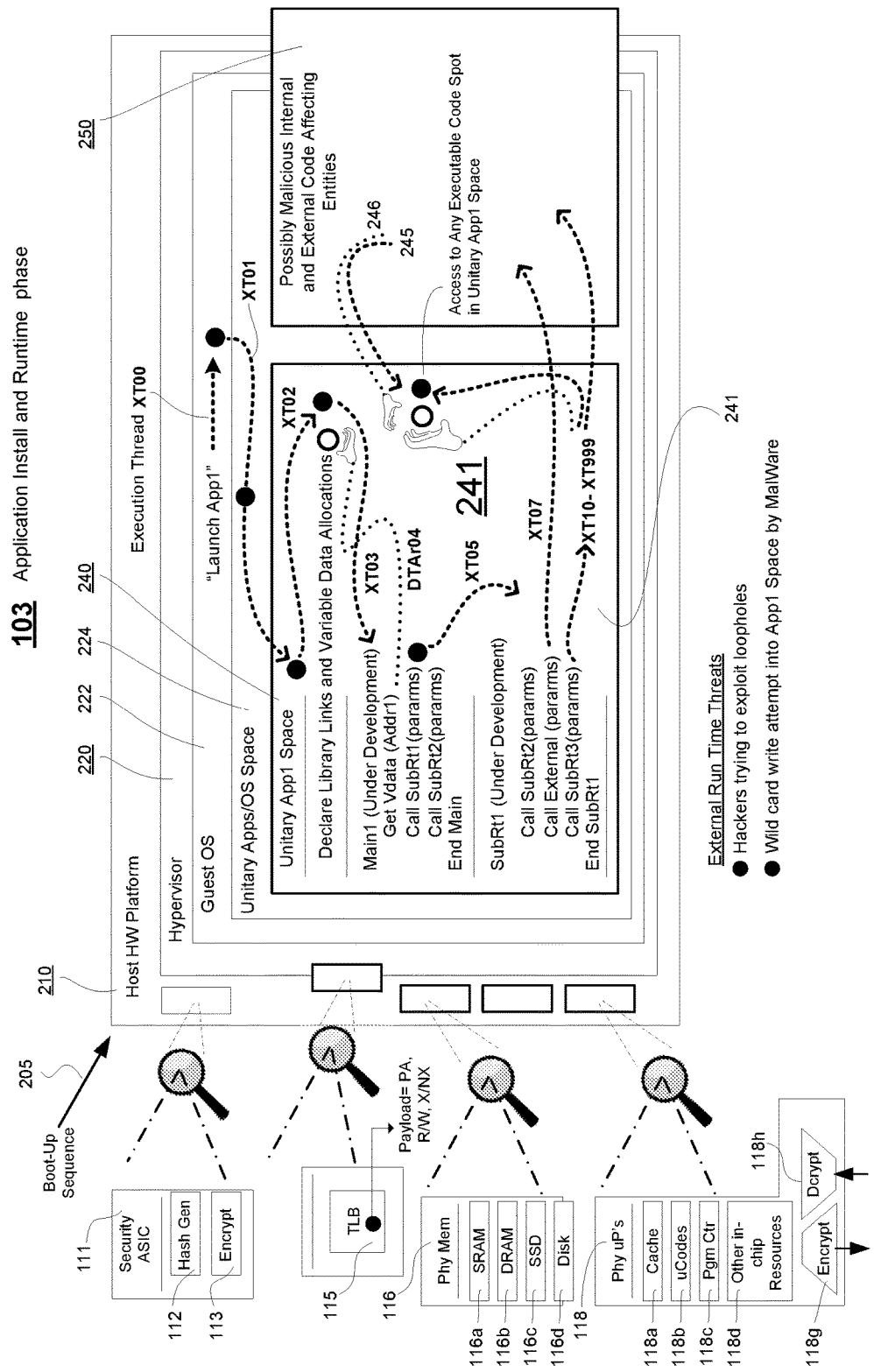
FIG. 1D is a schematic diagram depicting an install and runtime phase of executing the application program in an allocated virtual memory space of an untrusted computing environment.

Next referring to FIG. 1D, shown is an environment 103 where the developed application program, now referenced as 241, has been field installed into a second hardware platform 210 having a corresponding, but not necessarily trustworthy Hypervisor 220 under which there runs a not necessarily trustworthy guest OS 222. As part of executing thread XT00 the developed application program 241 is loaded from a compiled file (not shown), linked to resolvable link declarations and launched by the OS 222. Where applicable, reference numbers in the 200 century series are used in FIG. 1D for corresponding but not necessarily same elements of FIG. 1C that were referenced by numerals in the 100 century series. For the illustrated environment 103, block 250 represents one or more and possibly malicious, internal and/or external entities that can affect the executable and/or informational data items stored in the unitary application space 240 allocated to the application 241 and/or placed in the broader unitary Apps/OS space 224 usable by the guest OS 222 and all applications (e.g., 241) running in conjunction with it. The other code affecting entities 250 may include other applications, external devices and over-a-network communications which provide return data to the developed application program 241 and/or to other parts of the unitary Apps/OS space 224. These other code affecting entities 250 may induce undesired reads from and/or undesired overwrites into certain memory areas in the unitary OS/applications space 224 and/or undesirable executional threadings into code areas of the unitary OS/applications space 224. Examples of code-affecting actions can include the return of subroutine output signals that change the effective values of address pointers (e.g., Addr1) or indirect pointers, tags, offsets, indices, etc., used by the first application program 241 so as to thereby alter the behavior (operation) of the first application program 241. Even in the case where the first application program 241 has security software embedded therein for preventing return of undesired behavior-changing externalities, a malicious external attack might try to alter the executable code portion of the security software before further altering the code within the first application program 241. Thus, security protection based on software alone may not be enough to protect against sophisticated attacks. As will become apparent in the below, the present disclosure provides for buried security measures that cannot be reached into easily or at all by extant software including that of the operating system (OS) 222—even privileged parts thereof—, by the Hypervisor 220 or by any other software entity or external processor entity except that of the application (e.g., App1) that activates the buried security measures (e.g., by use of special activating and/or destroying opcodes that cause respective creation, activation and destruction of the so-called, protected regions (PR's) of the present disclosure).

Referring to FIG. 2A, an exemplary embodiment 180 in which protected regions (PR's) are invoked by an invoking application (App1 as named at 181.1) in accordance with one aspect of the present disclosure is schematically depicted. In broad terms, a source code file 181 is developed, compiled in step 186 and stored as an object code file 194 by further saving it onto a nonvolatile memory unit such as disc 192.

The source code depicted inside of file 181 is pseudocode rather than code in any formal language. Line 181.1 is a source code comment indicating the name of the application file as being App1.C. Line 181.2 is a pre-process declaration indicating that this application will be using at least one of the protected regions feature of the present disclosure. Line 181.3 is another pre-process declaration which pulls in an external file containing standard protected regions attributes of a header file called Std_Protected_Regions_Atts.h. Line 181.4 indicates the beginning of the main{ } program section. As indicated in the attached comment, this main section begins in a nonprotected region (NPR) because a specific protected region has not yet been named and begun at a respective logical location within the source code. Although named as nonprotected (NPR), even these regions can have constraints attached to them, one of them being that code inside an NPR region cannot generally read data out from or write data into a protected region (PR). A thread (XT) executing inside an NPR region can however, jump into or call as a subroutine, code of a protected region (where as an example, the code at 181.5 calls an in PR subroutine 182.3 of source code file 181) provided however, that the entered-into or called upon, in-PR code has PR attributes giving the entering/calling code permission to do so (to thread into that portion of the PR covered memory space).

Accordingly, line 181.5 is seen calling a subroutine named Attest_Forcer( ) where the latter resides at location 182.3 within a first protected region (PR1). Similarly, line 181.6 is seen calling a subroutine named Post-Attest_Continue( ) where the latter resides at location 183.3 inside a second protected region (PR2). The main code section 181.4 may include further instructions indicated by the ellipses 181.7 followed by a loop back either to the subroutine call of line 181.6 or to a different instruction below line 181.6.

At line 182, the beginning of a first protected region named App1_PR1( ) is declared and attributes of thereof are passed as parameters of the protected regions declaration. Note that this protected region PR1 is "owned" by its creating application App1 and hence it is named, App1_PR1( ). In one embodiment, only the application which creates a respective protected region (e.g., App1_PR1( )) can define and/or modify the so-called, attributes (e.g., Atts_PR1) of the created protected region or can cause that protected region to be destroyed (where creation, activation and destruction of the respective PR is carried out by the PR enforcer mechanism; e.g., 85e of FIG. 1B). Line 182 may be a preprocessor declaration alerting the compiler and link loader that the logical start of a protected region is being declared. Line 182.1 indicates that the current protected region (PR1) will have its contents included in a stream of data that is later challenged by a provoked attestation challenge. In accordance with one aspect of the present embodiment, some protected regions can opt out of being included in the attestation challenge stream. (See for example line 184.1.) Section 182.2 declares various informational data items as being part of the first protected region (PR1). It also provides them with their PR-originated read/write permissions (which can be different from the read/write permissions given at run time by the operating system (OS) or the Hypervisor).

Line 182.3 indicates that as an option, the attestation forcing routine, Attest_Forcer( ) can be inside the first protected region PR1. However, in other embodiments, the attestation invoking code can be in a non-protected region (NPR) especially in cases where the PR enforcer is configured to not allow entry into PRs unless they have been a-priori attested to (assuming they require attestation as part of their attributes). In one embodiment, PR-endowed apps are designed so that they will not be able to run without successfully decrypting and validating a signed certificate from the remote attestation entity. If all the code of a given application is disposed in one or more PRs, then the OS or Hypervisor is given the task of requesting the attestation. Additionally, if a whole VM is disposed in one or more PRs then the Hypervisor is given the task of requesting attestation for the code of the VM. On the other hand, invoking attestation from inside of a PR (as suggested at line 182.3) can be more complicated in that it essentially requires a setting aside of the corresponding subsection of the PR to not really be part of the fully protected PR and to allow execution before the rest of the PR is validated by attestation.

Figure 2B:
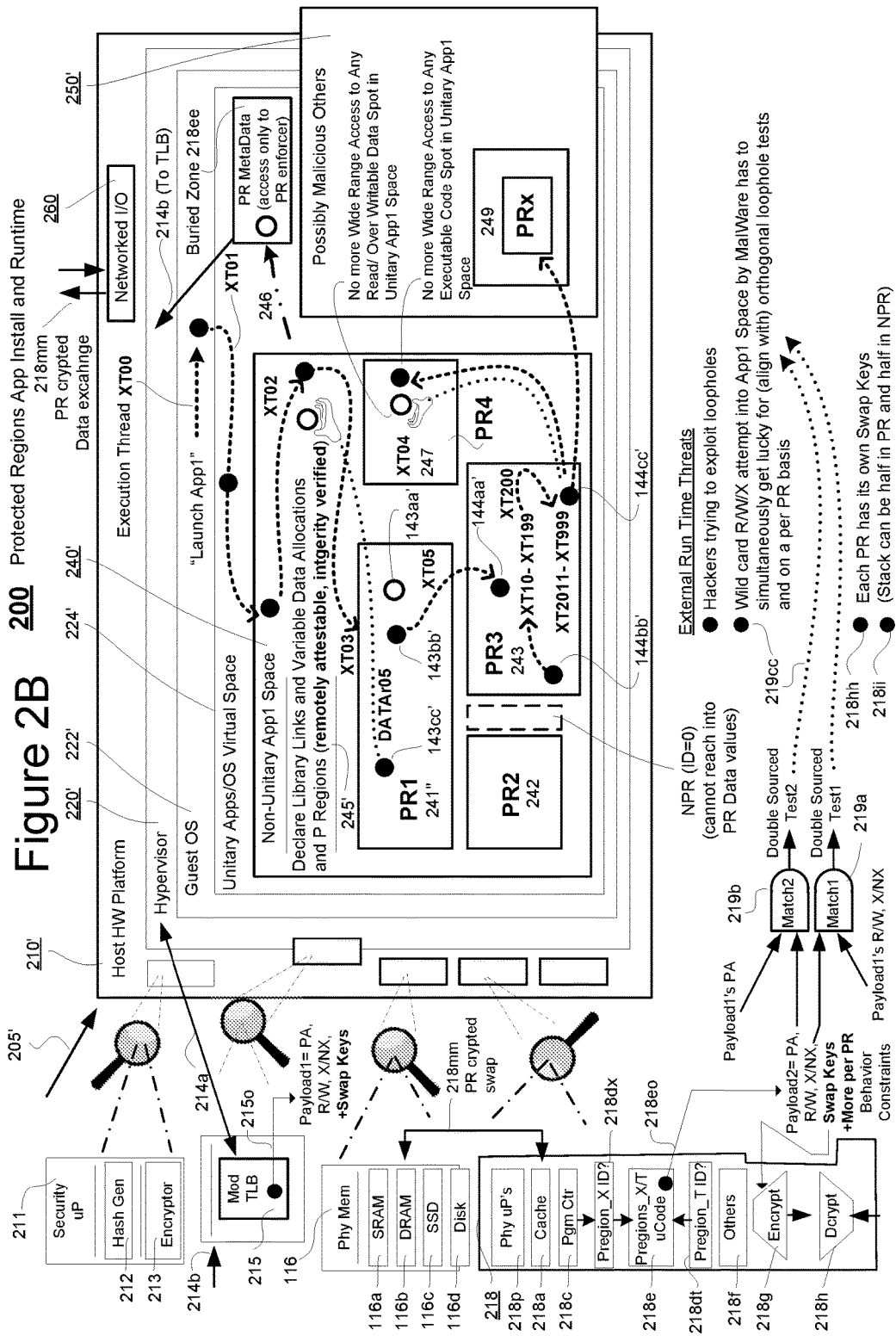
FIG. 2B is a schematic diagram depicting an install and runtime phase of an application program that establishes its own protected regions (PR's) and executes in an allocated virtual memory space of a computing environment having hardware and/or firmware modified (a PR enforcer) to enforce restrictions of, and verify the integrity of the application established, protected regions (PR's).

Parameters passed to the attestation forcing routine may include an identification of a remote website that will be provoked into issuing an attestation challenge at least against the protected regions of application APP1. As mentioned above, code inside nonprotected areas (NPR) cannot ask to read from or write into a protected region (PR). They are blocked from doing so at runtime by the PR enforcer mechanism. Accordingly, the identity of the attestation forcer routine at line 182.3 and the parameters passed to it (e.g., URL://remote_0115.com) are protected from spyware running in nonprotected areas during runtime. Additionally, as shall become clearer when FIG. 2B is described, the code and informational data items inside the first protected region can be hidden from prying spyware by use of per-PR encrypt and decrypt swap keys (see briefly 218h and 218g of FIG. 2B as well as 83 of FIG. 1B). Although line 182.4 indicates that this is the end of the first protected region PR1, it is within the contemplation of the disclosure to allow for inclusion of other executable code within the first protected region PR1. The code section 181.8 below 182.4 can include further instructions that are deemed to be within a nonprotected region (NPR).

As indicated by lines 181.5 and 181.6, first the attestation forcing routine is executed and then, if the attestation challenge is successfully met, additional code referred to as Post-attestation_continue (181.6) is performed. In one embodiment, the protected regions enforcing firmware (e.g., 75e/85e of FIG. 1B) of the platform gives a launching application such as App1 only a certain predetermined amount of time and/or a certain predetermined number of executable instructions before a buried flag indicating that attestation has been successfully carried out needs to be flipped to true. Otherwise the firmware (e.g., 85e) automatically shuts down the launched application before the application can carry out a significant amount or number of untrusted transactions.

Line 183 declares the beginning of a second protected region owned by the same application and named App1_PR2. This second protected region can be defined as having its own unique set of protected region attributes, Atts_PR2.1 for at least a beginning portion of that second protected region (PR2). Line 183.1 indicates that the second protected region will also be included as part of the attestation chain. Section 183.2 requests allocation for virtual memory for various informational data items that are to be included in the second protected region (PR2) and assigns those data items their respective, PR-originated read/write permissions. A first part of the post-attestation continuation software executes at line 183.4. Then at line 183.5, after the first code part of the post attestation code (183.4) has executed, the attributes of the current protected region (PR2) are dynamically changed. In one embodiment, the dynamic change pseudocode passes a set of parameters, Atts_PR2.2 to a special opcode among the microcodes of the system where this special opcode optionally tests the integrity of the new parameters and then stores them in a buried meta-data region (e.g., 75d of FIG. 1B) as additional and or substitutional PR attributes for the current protected region (PR2)— or in an alternate embodiment, for an identified subsection (e.g., memory page) of the current protected region (PR2). Although not shown in FIG. 2A, it is within the contemplation of the present disclosure that dynamic change of PR attributes (e.g., addition, modification, destruction) can be constrained to occur only at certain relative or absolute times and/or under certain relative or absolute system state conditions—for example that the absolute time is a business day and a certain other application is currently executing in the same local hardware system. In one embodiment, after the initial post-launch PR attestation has occurred (a system state condition) and before executing any special opcode that modifies, adds or destroys a protected region (PR) the PR enforcer is configured to verify that the instruction to execute that opcode came from the PR owning application (e.g., from within its allocated application space 240) and in one variation only from within a protected region of that application.

Comment section 183.6 of FIG. 2A indicates that the new protected region attributes (Atts_PR 2.2) have dynamically changed the constraints for code below line 183.5 such that only a limited number of identified code areas (e.g., in PR5 and PR7 of App1 or in another application named App5) can be the origin points of execution threads trying to call upon or snake into the code below line 183.5. Accordingly, if an execution thread XT85.6 originating from another application run within area 185.3 tries to access code section 183.7 but is not permitted to do so because of the dynamic attributes change at line 183.5, then the first application App1 will be automatically shut down (and/or an exception flag will be raised) by the PR enforcing firmware because an unauthorized attempt to snake into a protected region has been automatically detected. Line 183.8 declares a "pause" for the second protected region (PR2) where that pause indicates that a further fragment of the same second protected region (PR2) will be found later in the code, after the intervening code for a third protected region, App1_PR3 indicated to begin at line 184. As indicated before, further instructions and/or requests for allocation of virtual memory space can be provided above the declared end 183.8 of PR2 or below it in the nonprotected area indicated by 183.9. In one embodiment, when a PR is broken into fragments (e.g., by a Pause PR declaration such as at line 183.8 and a Continue PR declaration—not shown—where the next fragment picks and an End PR declaration where the PR finally ends), the placement of the PR fragments in virtual memory space and/or in physical memory space will typically be spaced apart. One example of a PR that is fragmented and has its fragments spaced apart in virtual memory space is shown in FIG. 2E, column 202 where the PR identified as A2D1 is a protected region owned by application A2 and grants permission to some of the other applications (e.g., A1) or supplemental processors (e.g., Ax) to have at least one of intelligible read or write access to an informational data section of application A2 covered by the fragmented PR identified as A2D1 where a second fragment of the same PR is denoted as the primed, A2D1'.

Line 184 in FIG. 2A indicates the declared beginning of a third protected region, App1_PR3. The given example shows at line 184.1 how application developers can choose to include or exclude various ones of their protected regions from the attestation challenge for various reasons. One reason might be that the given protected region (PR3) includes a large amount of nonvital data for which the trade-offs between launch speed and security lead to a conclusion that PR3 should be excluded from the attestation chain. Ellipses 184.2 indicate that yet further code may follow including that of the fragmented App1_PR2 protected region.

Various program development tools 185 may be included as part of the development environment 180 of FIG. 2A. Among these is an attestation simulator 185.1. After the source code 181 has been compiled 186 and the results stored in a post compilation file 190, the attestation simulator may be used to run an attestation challenge against the initially installed attributes (e.g., 181.3) of the respective protected regions and against the initially included contents of those of the protected regions that have declared themselves as being part of the attestation chain (e.g., PR1—yes, PR2—yes, PR3—no, PR4— ... ). The correct plaintext hash result without inclusion of a one time nonce code may be stored at 185.2. This result 185.2 may be used in combination with knowledge of what the one time nonce code is in order to later determine what result is expected of an in the field attestation challenge.

The program development tools 185 may further include simulators 185.3 for other applications that call on App1 and/or which App1 calls upon so that the inter-operative behaviors (operations) of the under-development App1 and the other applications (including OS library routines) may be studied. App1 may also call upon external specialty devices (herein generically referred to as device X) for carrying out various operations. In accordance with the present disclosure, protected region enforcement treats these external devices (e.g., Device X) as if they were other applications which are granted or denied permission under the protected regions regime for reaching for informational data items belonging to App1 (e.g., as represented by data R/W reach-for symbol DATAr85.4) and or to call upon or thread into code areas within App1 (e.g., as represented by executable thread XT85.6). Thus the inter-operative actions of external devices with respect to informational data items and/or executable codes within the virtual memory space of the PR utilizing application (e.g., App1) can be constrained just as may the inter-operative actions of external applications (or of the operating system (OS) which itself is basically an application).

Additionally the development tools 185 may include one or more traffic flow mapping modules such as 185.5 which are structured to keep track of where in virtual memory space, well-behaved executing threads (e.g., XT85.6) and/or data reaching attempts (e.g., DATAr85.4) extend and/or where badly behaved such counterparts extend and/or statistics on such behaviors. Additionally, the traffic flow mapping modules may keep track of temporal timings (in absolute or relative e.g., before and after terms) and system state conditions (e.g., what other applications are running in what states) that logically associate with acceptable and non-acceptable behaviors (operations) by various threads (XT's) of the under-development application (App1). The traffic flow mappings provided by development tools such as 185.5 may then be used to modify the ranges and respective attributes and conditional instantiations (e.g., relative to time and/or system states) of the various protected regions (PR's) and/or the ranges and respective attributes of the various subregions (e.g., lines 183.5-183.8) within the protected regions (PR's). For example, early in the development cycle, a given protected region (e.g., PR2) may initially be given attributes of relatively wide latitude that allow almost any other application and/or other PR to gain both read and write access to essentially all data within the given protected region (e.g., PR2) and to extend its executing threads into essentially all code sections of the given protected region. However, upon running traffic flow analysis with mapper 185.5, it may be discovered that only two other protected regions and one other application actually access the given protected region (e.g., PR2) during the normal course of expected transactions. In that case, the attributes of the given protected region (e.g., PR2) may be substantially narrowed to allow data access only to the identified two other protected regions and one other application. Thus, rogue code may be automatically blocked from accessing informational data items and or executable code within the given protected region (e.g., PR2) because all other access pathways into it have been blocked by the substantially narrowed attributes.

After fine tuning of the protected regions and their attributes for the under-development application App1, a final compilation 186 may be run to produce the illustrated post-compile application file 190. As shown in FIG. 2A, the compiled App1 file 190 can contain a first section 190.1 storing definitions of the declared protected regions and their respective initial attributes. Alternatively or additionally, the file 190 may link to another file (not shown) where the other file contains some or all of the definitions of the declared protected regions and their respective initial attributes. The file 190 may further include one or more executional code sections 190.2 for App1, one or more informational data item sections 190.3 for App1 and one or more link resolving sections 190.4 for linking App1 to other applications including to operating system library routines and services. The compiled App1 file 190 may be encrypted (191), stored in an appropriate non-volatile memory (e.g., disc 192), then when needed, fetched from the non-volatile memory (e.g., disc 192) by the operating system, decrypted (193) loaded into a main memory section of the system, allocated appropriate amounts of memory, linked to other applications or services and then launched as indicated at 195 where the launching includes automated recognition of the defined protected regions and their attributes (e.g., those stored in section 190.1 and/or elsewhere) and where the launching also includes automated transfer of the PR definitions and respective attributes into a buried metadata section of the system (e.g., 75d of FIG. 1B). After a forced attestation is successfully run (see 181.5), the PR enforcing firmware (e.g., 75e/85e of FIG. 1B) is activated to enforce the constraints and requirements of the attested to protected regions.

Referring to FIG. 2B, an exemplary embodiment 200 in which protected regions (PR's) have been activated in accordance with the present disclosure is schematically depicted. Various components shown in embodiment 200 have been described above and therefore will not be detailed again here. Some components however, are significantly changed. For example, the allocated application memory space 240' is no longer a unitary space but rather one that is partitioned to include the defined and activated protected regions, PR1 (241"), PR2 (242), PR3 (243) and so on belonging to that application 241" to whom the space was allocated. Areas of the allocated application memory space 240' that are not defined as being protected regions (PR's) are defined as being part of a nonprotected region (NPR— represented by a dashed rectangle inside area 241').

One or more special meta-data containing memory regions such as BURIED 218ee are provided, not as part of application code space 240', but in a specially privileged section of main memory (similar to that which holds microcode) and/or in a specially privileged section of on-chip memory 218e or in some other memory unit of the hardware platform 210' where these meta-data containing memory regions store controls (Protected Region Defining (PRD) codes) created based on PR declaration code 245' that was included in the object file (e.g., 190 of FIG. 2A) of the launched application 240' or obtained form a liked in other file specified by the launched application 240'. (Note that both the subject application and its allocated virtual memory space are referenced here as 240'.) Data from the BURIED memory 218ee may be cached on as needed basis into a securitized Others region 218f of a mechanically encapsulated component such as a hermetically sealed packaging of a modified SoC chip 218 as shall be explained below. (Modifications to chip 218 include provision of PR enforcing microcode and/or hardware 218e.) Metadata stored in this special memory region BURIED 218ee can only be accessed by a firmware and/or hardware portion of a to-be described security mechanism (218e). Parts of the non-unitary application code space 240' that are not specifically designated as protected regions (PR's) are designated as part of a remainderman nonprotected region (NPR). Various ones of the behavioral attributes (e.g., operational limits, permissions or requirements) of the protected regions (PR's) and the left over nonprotected region (NPR) will be further detailed below. As already indicated, the behavioral constraints (e.g., operational bounds) can include application-defined R/W data grab constraints and application-defined X/NX call or thread-into execution constraints. Although parts of the allocated virtual memory space 240' of the App1 application that are not inside a protected region (PR) are denoted as nonprotected (NPR), in one embodiment, when PR mode is active, the NPR regions are nonetheless constrained in that they cannot access data (for R/W purposes) inside any of the protected regions (PR's). They can however, pass execution control to (thread into or call on code inside) the PR's even though they cannot read what is inside or overwrite the data of the PR's. Thus the protected regions (e.g., PR1, PR2, PR3, etc.) appear as blacked out areas to code in the NPR regions (and to code of other applications that share virtual memory with the protected application 241" but are not authorized to access data inside the protected regions (PR's) of the protected regions utilizing application 241').

Referring to the innards of the encapsulated SoC 218 of the illustrated example 200, it is seen that it houses in a physical access denying manner, one or more physical data processors 218p where at least conceptually, the physical program counter 218c of each such processor 218p is operatively coupled to a first detecting unit 218dx that is also referred to here as a currently-executing-in protected region (cxiPR) detecting unit 218dx. CxiPR detecting unit 218dx not only detects whether or not the program counter 218c is currently pointing to a portion of physical memory (e.g., cache 218a) that corresponds to a protected region (PR) in which execution is currently taking place, it also determines the identification (PR ID) of that protected region if true. For the left over nonprotected regions (NPR), the cxiPR detecting unit 218dx returns a predetermined default value such as zero (PR ID=0). It is stated here that the cxiPR detecting unit 218dx, as illustrated, is more so conceptual than real. This is so because in practical implementations, the detection of where execution is currently taking place, namely, in a protected region (e.g., PR1, PR2, PR3, etc.) or in an NPR takes place by comparing the contents of a current virtual program counter (not shown) versus the allocated virtual address space allocated to each in-effect protected region (PR). If the answer is true, the current constraints (e.g., PRD1 constraints, also herein, first Protected Region Defining codes) attached to or logically associated with the identified, executing-in protected region (e.g., PR1) whose executable code (e.g., 143bb', 143cc') is currently being executed are fetched and enforced. Additionally, if the currently executing code (e.g., that represented by black filled dot 143cc') is trying to access (in R/W fashion) one or more informational data items in another portion of the non-unitary App1 space 240', or if the currently executing code (e.g., that represented by black filled dot 143bb') is trying to transfer executional control over to a target location 144aa' in another protected region (e.g., PR3) for example by making a call (e.g., Call SubRt) to that target location 144aa'; the current constraints attached to the identified targeted protected region (e.g., PR3) whose code is to next be executed and/or whose data is to be read or overwritten (R/W) are fetched as indicated conceptually in FIG. 2B by the targeted protected region (tPR) detecting unit 218dt. The identification of the targeted protected region (identified by tPR detecting unit 218dt as Pregion_T ID) can be the same as the identification of the cxiPR (currently executing-in protected region—identified by cxiPR detecting unit 218dx as Pregion_X ID). In some embodiments a given protected region (e.g., PR1) may not be allowed to call a subroutine inside that same protected region (e.g., 143bb' of PR1) and/or to access informational data items stored inside that same protected region (e.g., 143aa' of PR1). In some embodiments a given protected region (e.g., PR3) may not be allowed to receive a subroutine call from one or more other protected regions (e.g., PR2, PR4) and/or may not be allowed to grant data access (R/W) to the one or more other protected regions (e.g., PR2, PR4) or to other applications (inside 250'). It is within the contemplation of the present disclosure that the other applications (e.g., 249) may have their own respective, other protected regions (e.g., PRx). It is within the contemplation of the present disclosure that the other applications (e.g., 249) may execute in separate hardware platforms (like 210') having their own counterparts to Hypervisor 220', operating system (OS 222'), buried metadata storing zone 218ee and buried PR enforcer 218e where the separate hardware platforms (not explicitly shown) are operatively coupled to the illustrated platform 210' by way of appropriate interfaces including wired and/or wireless communication interfaces (e.g., 260).

When one or more protected regions (PR's) are defined at least in the virtual memory space 240' allocated at least to the first application (App1) and while the PR enforcer 218e is activated to enforce the constraints/requirements (PRD's) of those respective PR's, then during the runtime execution of essentially every outwardly reaching opcode in the non-unitary App1 space 240', a determination is automatically made by the PR enforcer 218e as to the currently in effect constraints of the currently executing-in protected region (e.g., cxiPR=PR1) and as to the currently in effect constraints (e.g., PRD3) of a targeted other protected region (e.g., tPR=PR3 for the case of thread XT05) if there is one being reached out to. (Some instructions do not target other addressed data regions; for example a registers ADD instruction.) Also as mentioned above, in one embodiment, the PR enforcer verifies that instructions making use of the special PR-related opcodes of the system (e.g., those that create, modify or destroy PR's) come from a virtual memory area allocated to the owning application of the affected PR (and in some cases come from inside an already created PR that is owned by the same application).

FIG. 2B shows the protected regions enforcing mechanism 218e to be located as an individualized unit inside the encapsulated SoC 218. However, in one embodiment, the protected regions enforcing mechanism (the PR enforcer 218e) is instantiated at least partly in the microcodes of essentially all user-software executable opcodes in that the PR ID of the currently executing opcode will generally be automatically determined by a cxiPR detecting unit such as 218dx (or a virtual counterpart thereof) and if the currently executing opcode is trying to reach out to grab one or more targeted informational data items (such as by operation DATAr05) or is trying to pass executional control over to another protected region (such as by operation XT05), the PR ID of the targeted informational data item(s) and/or targeted code will generally be automatically determined by a target detecting unit such as tPR detecting unit 218dt (or a virtual counterpart thereof). In one embodiment, predicting firmware may be used to load in from main memory (e.g., DRAM 116b) and on a predictive execution basis, the corresponding protected region attributes (constraints/requirements) of predicted but not yet committed operations where the predictive execution includes a determining of the likely PR ID's of the next to be executing protected regions (PR's) and a determining of the likely PR ID's of the next to be targeted PR's. A slight performance speed hit may be taken due to the repeated carrying out of the protected regions (PR's) detecting/identifying tests (218dx, 218dt) and the load and enforcement of the respective PR constraints (e.g., fetched from buried metadata region 218ee). However, several aspects of the present disclosure work to minimize the extent of the performance hit. First, in many instances the currently executing-in (cxi) memory area and the next targeted memory area tend to be one and the same for long stringed portions of executable threads (XT's). For example, the exemplary succession of instructions XT10 through XT199 may all take place inside PR3 (region 243) and not target out-of-region informational data items (e.g., 143aa'). Thus, once the corresponding constraints (of the currently executing PRegion_X) are fetched they generally do not need to be differently fetched again and swapped into a microcodes containing portion 218e of cache again and again. Second, it is common place in modern computer architectures to provisionally execute instructions on a predictive look ahead basis. In other words, instructions are executed with predicted input parameters even before it is known for sure that those specific instructions will need to be executed and with those predicted input parameters. The protected regions (PR's) detecting/identifying tests (218dx, 218dt) and the PR constraints enforcing firmware decision makings (218e) can be provisionally carried out as part of the predictive instruction execution process. In this way, the results of the detecting/identifying tests (218dx, 218dt) and of the PR constraints enforcing process (218e) will be available before or at the time of need for the predicted executions. The basic result of the PR constraints enforcing process (218e) is either that of the to-be-nonprovisionally executed instruction being allowed to occur under the currently in force PR constraints or not. If not, the application is automatically halted. Thus for a lookahead instruction to commit, all that is needed is a bit set indicating the instruction does not violate any of the currently in force PR constraints and/or requirements.

As mentioned, the protected regions (PR's) detecting/identifying tests (218dx, 218dt) are preferably implemented in software at a privileged level similar to that of the privileged level of the Hypervisor 220' or at an even more stringent level and using virtual program counters and virtual target identifying registers for testing the respective virtual addresses (VA's) in those registers against the respective virtual addresses (VA's) of the currently in force protected regions (e.g., PR1 and PR2). The PR ID's of those tests (218dx, 218dt) are stored into respective registers that form inputs of the PR constraints enforcing mechanism (218e). In one embodiment, the PR constraints enforcing mechanism (218e) is implemented by way of hardware and/or firmware portions of the system 210' that are inaccessible to software executing under the auspices of the guest OS 222' or under the auspices of further software-executed entities (e.g., the installed application 240'). Thus, the PR constraints enforcing mechanism 218e is immune to external attacks. In one embodiment, the protected regions enforcing mechanism 218e is at least partly implemented as part of the microcode used to define the assembly code level behaviors (operations) of the master one or more of the physical data processing units 218p. Special opcodes are provided for operating the micro-code implemented enforcing mechanism 218e (including for causing it to perform certain operations that only it is allowed to perform).

One of these special opcodes creates the meta-data protecting memory space region (PRM) 218ee and stores therein various protected region attributes (as well as VA/PA direct translation tables—see for example 72c of FIG. 1B) where the latter can only be intelligibly accessed by the PR enforcing mechanism 218e. The protected region attributes may include a read/write (R/W) permission bit, an executable/non-executable (N/NX) control bit for each respective protected region (or for each subsection of the PR, for example for each 4 Kbyte memory page of the PR) as well as additional other operational constraining controls or requirements for each respective protected region or subsection thereof.

Examples of additional other operational constraints or requirements may include that of limiting the types, formats, lengths and/or sequences of data/code that may be read, overwritten or executed. More specifically, the attributes of one PR may require that its stored data include data typing tag codes that identify the data types of adjacent code (e.g., short integer, long integer, floating point, character string, Boolean, short instruction, long instruction, etc.) where this tagging may be used for assisting in debugging of the tagged code as well as providing additional security. The attributes of the same or a different PR may require that its stored data be presented as a specific sequence of data types, for example in the case where the stored data represents a database record. The attributes of the same or a different PR may require that chunks of predetermined lengths of its stored data be time stamped with differences between stored time stamps of successive chunks being in a range having a predetermined minimum and/or maximum. As another example, the attributes of the same or another PR may only allow data to be read from it (and optionally by only select number of readers) in chunks of 4 Kbytes at a time and optionally in a predetermined addressing order. These are merely examples.

Still referring to FIG. 2B, during execution; as a next-to-be executed instruction is about to be executed, the enforcing mechanism 218e outputs a Payload2 output signal 218eo that includes the R/W permission bit and X/NX control bit of the protected region (e.g., PR1) associated with an identified and next-to-be executed instruction (e.g., 143cc'). It also may include the R/W, X/NX permission bits of the identified target (tPR) of the action of the next-to-be executed instruction if such a target is present (e.g., when informational data items are being reached for by a R/W operations such as DATAr05). The Payload2 output signal 218eo further includes a physical address signal (PA) for the currently, about-to-be executing location (e.g., 143bb') and if there is one, for the target address (e.g., 144aa'). In one embodiment, the Payload2 output addresses are physical page addresses (PpgA's) pointing to whole memory pages (e.g., 4 Kbyte pages) rather than ones pointing exactly to the next executing and next-targeted locations. In one embodiment, protected regions (PR's) are defined to a resolution of physical pages (e.g., 4 Kbyte pages or a predefined number of such pages) and no finer. In other words, the attributes of a currently executing protected region (e.g., PR1) and of a targeted protected region (e.g., PR3 or PR1) do not change at a finer resolution than that of a physical memory page (e.g., a 4 Kbyte page). The contents of the Payload2 output signal 218eo are obtained from the meta-data protecting memory space region (mPRM) 218ee. Thus they are known to have not been recently compromised by any activity of the Hypervisor 220' or operating system (OS) 222' because the latter cannot directly access the contents of the mPRM 218ee. The obtained physical address signals (PA's) inside the 218eo Payload2 signal are tested against counterpart second physical address (PA) signals obtained from the TLB hardware 215 and also indicating the physical address signal (PA) for the currently, about-to-be executing location (e.g., 143bb') and optionally the target (e.g., 144aa') of that next action. More specifically, the second physical address (PA) signals are obtained from a Payload1 output signal 215o output by a modified translation lookaside buffer (TLB) 215. The physical addresses (PA's) matching test is denoted as Match2 (219b) in FIG. 2B and corresponds to Match2 test 92 of FIG. 1B. It is referred to as a 'Double Sourced Test2' in FIG. 2B because its compared input signals come from two separate data sourcing pathways; one of them being by way of the Hypervisor feeding frequently used data to the TLB and the other pathway being the mPRM (218ee) contents feeding through the cxiPR region identifying (218dx) mechanism.

Performance of the Match2 confirmation test 219b does several things at the same time. First, it verifies that the Hypervisor 220' appears to be now operating correctly by receiving expected virtual addresses (VA's) from the OS and translating them into appropriate physical addresses (PA's) where the latter are typically cached in the TLB 215. Second it verifies that the protected regions enforcing mechanism 218e appears to be now operating correctly by receiving expected virtual addresses (VA's) for the currently executing-in protected regions (cxiPR's) and for the targeted PR's (by mechanisms analogous to 218dx and 218dt), converting those input virtual addresses (VA's) into corresponding physical addresses (PA's) based on the current contents of the meta-data protecting memory space region (mPRM) 218ee (namely, the direct VA/PA translation tables inside the mPRM 218ee) and outputting those physical addresses (PA's) in its corresponding Payload2 output signal 218eo. A successful match by the Match2 confirmation test 219b indicates a high likelihood that the Hypervisor 220' has not recently been interfered with because the Hypervisor 220' has been recently storing correct VA/PA translations into the TLB 215. A successful match by the Match2 confirmation test 219b also indicates a high likelihood that the operating system (OS) 222' has not recently been interfered with because the OS has been recently supplying correct virtual addresses (VA's) as inputs to the Hypervisor 220' for translation into physical addresses (PA's). A successful match by the Match2 confirmation test 219b yet further indicates a high likelihood that the meta-data protecting memory space region (mPRM) 218ee has not recently and simultaneously been interfered with because the mPRM 218ee has been recently supplying correct VA/PA translations matching up with those provided by the TLB 215. In other words, the automatically repeated Match2 confirmation test 219b constitutes a double sourced test having inputs supplied from two relatively independent data sourcing pathways (e.g., current instance of the OS to current Hypervisor to the TLB pathway for production of the Payload1 signal 215o and older instance of the pathway in which the OS is supplying attested-to PR definitions to the meta-data protecting memory space region (mPRM) 218ee for production of the Payload2 signal 218eo). To defeat this double sourced matching test, an attacker would have to find a way to simultaneously change the Hypervisor 220' and TLB 215 and the internal contents of the mPRM 218ee so that their Payload1 and Payload2 outputs match. This would be hard to do.

In other words, a noteworthy aspect of the double sourced confirmation test such as the automatically repeated Match2 confirmation test 219b of FIG. 2B is that, in order to defeat that test, a hacker must properly and simultaneously spoof both of the data sourcing pathways (the one producing the Payload1 signal 215o and the one producing the Payload2 signal 218eo). In one embodiment, modification of the TLB 215 makes spoofing of that data sourcing pathway harder because the modified TLB is required to output a swap key identifying tag (PRKT) for target PR. If the wrong swap key identifying tag (PRKT) is output, the contents of the corresponding protected region (e.g., PR3) cannot be properly swapped into cache 218a in plaintext form for execution and the application (e.g., App1) crashes. More specifically, and referring to FIG. 2C, the TLB 215' is modified such that when a next-executing instruction is targeting an information data item (e.g., 143aa' of FIG. 2B) and the PR attributes of the targeted region are not immediately available to the PR enforcing mechanism, then they are first sought from the TLB 215' by submitting the illustrated, set-associative inputs of FIG. 2C. In one embodiment these inputs are constituted by an ASID (Address Space ID signal), a virtual page address (VpgA signal) and a target PR identifying tag (PRCAT signal). In response, if the associative information is present in the TLB, the Payload1 output signal 215o' will provide the physical page address (PpgA) of the targeted region, the PR attributes of the targeted region and a decryption tag (PRKT) identifying the decryption swap key needed by the system hardware for bringing a plaintext version of the targeted PR contents into cache memory 218a. As mentioned above, each PR (or group of PR's) may have its own unique set of swap keys. Thus, to gain useful access to the plaintext data of each PR, a hacker would also need to obtain the respective and unique set of swap keys (e.g., 83 of FIG. 1B). Without these, the corresponding data in main memory (e.g., 80 of FIG. 1B) or on disk (e.g., 84a of FIG. 1b) is likely to present itself only as unintelligible gibberish. Incidentally, because of this, destruction of tag (PRKT) identifying the decryption swap key and/or destruction of the swap key itself is tantamount to destruction of the contents of the corresponding protected region (PR). Thus in accordance with one embodiment, a destruction opcode is made available to each application for destroying its owned protected regions (PR's, but not any owned by other entities) simply by destroying one or both of the corresponding tag (PRKT) information and the swap key information. Such owner-ordered destruction of any PR may take place any time during application execution and preferably owner-ordered destruction of all remaining ones of its PR's takes place as the application goes through its end-of-run termination procedures. Accordingly, information is not left behind to give an opportunity to a snooping Trojan horse program to decrypt PR-protected informational data items after the owner application terminates.

Still referring to FIG. 2C, it should be noted that the operation of the modified TLB 215' is also based on double-sourced data. The virtual page address (VpgA) of the set-associative inputs is obtained from the hypervisor while the target ID tag (PRCAT) is obtained from the mPRM 218ee where the latter is ultimately sourced by execution of the application (App1) because each time the application defines a static or dynamic protected region, a corresponding set of swap keys and tag pointing thereto (PRCAT) are issued to the application (App1) and automatically stored in the mPRM 218ee. Similarly the contents 215o' of the Payload1 output signal are double sourced in that the physical page address (PpgA) originates from the hypervisor while the PR attributes and the swap keys identifying tag (PRKT) are sourced from the application (App1) by way of creation time storage into the mPRM 218ee. Thus, to spoof the Match2 test, a hacker would have to find a way to fool the TLB hardware 215' into storing and outputting data satisfying the requirements of the Match2 test.

FIG. 2D shows the case where the targeted location is executable code (e.g., code 144a' in PR3). The TLB set-associative inputs 214i are typically the same as those discussed above for the case where the targeted location contains informational data items. In most cases the PRCAT of the targeted code location (e.g., 144cc' in FIG. 2B) will be the same as the PRCAT for the next to be executed and control-passing over instruction (e.g., 144bb' in PR3 of FIG. 2B) because many execution threads (e.g., XT10-XT199 in PR3 of FIG. 2B) keep their executional control within a same protected region (e.g., PR3). Thus the normal payload output depicted at 215o1 of FIG. 2D has substantially the same contents as those described for 215o' of FIG. 2C. However there is at least one additional field in the normal output payload 215o1 of FIG. 2D, namely a change of region flag which is set to false if the target code is not outside the protected region of the next to be performed executable code.

On the other hand, if the PR enforcing firmware detects that the targeted and control-receiving code (e.g., code 144aa' in PR3) is not in the same protected region as that of the currently to be executed code (e.g., code 143aa' in PR1) then the change of region flag is automatically set to true by the PR enforcer mechanism and in addition to the normal Payload1 output 215o1, the modified TLB 215" outputs a further payload signal 215o2 which contains the PRCAT of the targeted protected region and the offset from the top of the physical page address (PpgA) to the exact spot where the next to be executed as a target code resides. This allows of the PR enforcing firmware (85e) to verify with greater precision that the target is exactly where expected. As shown in FIG. 2D, the additional payload 215o2 includes the true change of region flag and furthermore it includes a call versus return flag which is set to zero if the control-giving up code (e.g., code 143aa' in PR1) is a call instruction. In the case of such a call instruction, the PR enforcing firmware may responsively take additional steps to secure the data on the stack of the call making execution thread (e.g., XT05 of FIG. 2B). On the other hand, if the call versus return flag is set to one because the control giving up code section is a Return instruction that is returning control back to a previous calling area, then a slightly different additional payload is provided as shown at 215o3. When the return from call flag is set to true as in 215o3, the PR enforcing firmware may responsively take additional steps to secure the data on the stack of the called thread and to secure the data on the stack of the previous call making execution thread (e.g., XT05 of FIG. 2B).

Referring back to FIG. 2B, a further and automatically repeated match confirming test 219a (Match1) is also shown. Here, the to be matched inputs include the read/write (R/W) and execute/don't execute (X/NX) permissions for the currently being executed PR subregion and optionally for the targeted PR subregion. As with the case for the matching of physical addresses, this a dual sourced match test 219*a* verifies that the hypervisor and operating system have not been recently compromised. As indicated at 219*cc*, during application run time hackers may try to find and exploit various loopholes. One of those find and exploit strategies is to simply use randomly guessed at, addresses in the virtual address space of App1 for performing read or write and/or execute instructions originated within installed malware (e.g., 250'). However, in the case where the automatically repeated first and second match tests, 219*a* and 219*b*, are present; an attacker has to simultaneously meet all the requirements of the double sourced input pathways as well as also, in some embodiments, gaining access to the per-PR encrypt/decrypt swap keys (as indicated at 218*hh* of FIG. 2B). This can be extremely difficult to do.

Moreover, and as indicated at bullet point 218*ii* of FIG. 2B, each executing thread (e.g., XT200) of a protection-utilizing application (e.g., App1) can position its virtual top of stack pointer to point to memory areas that include one or more changes of PR attributes. For example, the executing thread can point its virtual top of stack pointer to a memory area where an NPR region bounds against a PR region such that a first part of the stack is subject to NPR rules and another part of the stack is subject to the attribute constraints of the PR region into which the stack extends. These PR attribute constraints may prevent various other applications from accessing the part of the stack that extends into the PR region. Thus proprietary informational data items on the stack may be protected from unauthorized prying eyes while those that the application wishes to share reside in the NPR portion.

Referring to FIG. 2E, shown under column 201 is a hierarchical map of hardware, firmware and software sections 210"-224" where parts of the unitary apps/OS virtual space 224" are respectively occupied by a first application named A1, a second application named A2, a set of operating system library routines named Lib, an area containing privileged operating system code and privileged data as well as more-privileged hypervisor code and data. Even greater privilege is understood to be assigned to the underlying hardware, where encapsulated hardware and firmware is denoted at 218".

Column 202 schematically illustrates from the view points of the respective applications (e.g., A1, A2, . . . ), installed library routines (Lib), privileged code area (Priv) and supplemental processors (e.g., Ax) what the shared memory space looks like to each of them. Under column 202 and in left to right order are rectangles schematically representing the views of permission attributes versus location in the hierarchy space as seen by first application A1, by second application A2, by ordinary library routines Lib, by privileged OS code and by an external device X (e.g., supplemental processor) which is treated as if it were a third application named Ax. Briefly, for the case of the external device X, and as seen in the elongated rectangle above its Ax designation, device X is blocked (No) from accessing what is inside a protected region called A1D3 where the latter PR is owned by application A1 and contains informational data of A1 labeled as D3. On the other hand, from the Priv code's view point, the Priv code is allowed (OK) to intelligibly read from and/or write into the same protected region called A1D3. Moreover, device X is permitted to intelligibly read from and/or write into the fragmented sections of the A2-owned protected region called A1D1/A2D1'. As additionally shown in column 202, device X is blocked (No) from accessing what is inside a protected region called A2D2 where the latter PR is owned by application A2 and contains informational data of A2 labeled as D2.

Referring to column 201 of FIG. 2E, the virtual memory space allocated to first application A1 in this example is subdivided into four protected regions denoted as PRa1.0, PRa1.1, PRa1.2 and PRa1.3. The first of these protected regions, PRa1.0, contains the executable code (X1) of the first application A1 and is governed by a first set of PR attributes which allow the code therein (in PRa1.0) to be called upon only by an identified section of privileged OS code, PrivA1 and by code from within itself (from within region PRa1.0). One of these governing PR attributes is represented under the right column 202 by an open door OK symbol referenced as AttT1, the latter indicating that permission is given by the attributes of region PRa1.0 to be a target of a call made from privileged OS code region, PrivA1. Another of these governing PR attributes is represented as the allowed action by execution thread XT03 of emerging from a first execution point (black filled circle) inside region PRa1.0 and calling upon a second execution point also inside region PRa1.0.

The second protected region PRa1.1 also owned by application A1 contains only informational data items designated as D1 of A1. Protected region PRa1.1 is governed by a second set of PR attributes which allow the data therein (in PRa1.0) to be intelligibly accessed (R/W) only by executable code in an identified section of the second application A2. This data accessibility constraint is represented by the OK'ed data grab symbol AttXT2 extending from block A1D1 in the view point rectangle of A2 to grab at data inside PRa1.1.

The third protected region PRa1.2 of application A1 also contains only informational data items identified as A1D2 where the access governing attributes for this third protected region limit the A1D2 items to being accessed only by certain OS library routines. More specifically, the "NO" entries of column 202 for the respective memory space viewpoints of Priv and Ax indicate that the protection attributes of protected region PRa1.2 block code in each of the Priv and Ax regions from reaching intelligibly into the area (A1D2) covered by PRa1.2 for purposes of reading, writing or continuing an executing thread (XT). One reason for this might be that the authors of application program A1 intended that only certain Lib routines will be referencing memory area A1D2 and thus, if any other routine tries to reference memory area A1D2 that action should be blocked by the attributes of third protected region PRa1.2. (Incidentally, the "NO" entries of column 202 to the right of the here discussed example of memory area A1D2 may be implemented by placing the reference-attempting codes in so-called, NPR regions. As explained elsewhere here, in one embodiment, executable code in an NPR region is not allowed to make data accessing reference to informational data items inside protected regions.)

Similarly the fourth protected region PRa1.3 of application A1 is illustrated by way of example as containing only informational data items identified as A1D3 and permitted to be accessed only by certain OS privileged code. The allowed interaction between the certain OS privileged code and the A1D3 data of the first application A1 is also schematically indicated by the OK/OK R/W arrow symbol that is also referenced as AttT3/AttX3, where the latter indicates that the targeted PR region is granting permission to be intelligibly accessed by the data-reaching-for code in Priv and also that the reaching out code (inside Priv) has permission to reach out to overwrite data in the targeted PR region (PRa1.3). More generally the OK/OK arrow symbol shows how the blocks of the right-hand column 202 are organized to indicate allowed interactions between only certain memory areas of the various applications, routines, and external devices that in this example are denoted as A1, A2, Lib, Priv and Ax.

The virtual memory space allocated to second application A2 is similarly subdivided into four protected regions denoted as PRa2.0, PRa2.1, PRa2.2 and PRa2.3. The first of these protected regions, PRa2.0, contains the executable code (denoted as A2X2) of the second application A2 and is governed by a respective set of PR attributes which allow the code therein (in PRa2.0) to be called upon only by an identified one or more sections of one or more of A1, A2, Lib, Priv and Ax but not by other sections. (Note that in one embodiment, executable code in NPR sections can thread by default into protected regions (PR's) unless otherwise specifically blocked by the respective attributes of the respective PR's.) In the example, the second of the protected regions, PRa2.1 and a fourth one PRa2.1' are spaced apart from one another (fragmented) and respectively contain informational data items denoted as A2D1 and A2D1' which cannot be intelligibly accessed by Lib routines but can be accessed by the external device X (also identified as if it were another application named Ax). The A2D1/A2D1' contents may also be accessed by code within an identified subsection of first application A1.

Various ones of operating system (OS) library routines and services may by covered by a corresponding one or more protection regions declared by the OS for its allocated Lib area of main memory. Although FIG. 2E shows just one such protected region PRos.0, it is within the contemplation of the present disclosure to have the OS declare for itself more than one PR, each having its own respective set of metadata-defined constraints and/or requirements that are automatically enforced by the PR enforcer 218" (see also 218e of FIG. 2B). Block 219" under column 202 shows an executable code portion of the first application (A1) being permitted by the corresponding PR attributes of both that area of A1 and by those of the targeted L1 area to make a subroutine call to executable code denoted as L1. Column 201 of FIG. 2E depicts yet another protected region (e.g., PRos.0) belonging to the OS where in one embodiment the PR attributes of that latter OS-owned PR may allow calls to be made to it only by calling code situated inside the first application (A1) or a specified subsection of that first application.

In one embodiment, the Hypervisor is not permitted to have protected regions (PR's). On the other hand, external hardware devices, represented schematically by Device X in the figure can have their own portions of system memory space that are subdivided to include protected regions (e.g., PRax.1) defined by the respective external hardware devices (e.g., Device X) and automatically enforced by the local PR enforcer 218" if the external hardware devices (e.g., Device X) are part of the local platform 210' (FIG. 2B). It is additionally within the contemplation of the disclosure to have external hardware devices implemented in other platforms (e.g., Second Platform in FIG. 2E) external of the local platform 210' where the other platforms have their own respective PR enforcers and buried metadata storing zones and the other platforms are operatively coupled to the local platform 210' (FIG. 2B) by way of appropriate interface circuits (e.g., IF1 and IF2) including wired and wireless communication interfaces for use with corresponding networks or other communication media. In one embodiment, protocols are established for communicating allowed and denied accesses as between protected regions (PR's) in respective memory spaces of separate but communication wise interoperative platforms (e.g., first and second platforms of FIG. 2E).

Using as an example, the upper fragment identified as A2D1 in the vertical viewpoint rectangle of A2 within FIG. 2E, it is to be observed that each protected region (e.g., PRa2.2) may be divided into finer subsections which all share one or more attributes of that protected region (e.g., PRa2.2) but also may have additional attributes assigned to various subsets of those finer subsections. For example, subsection AttA2D1.5 may allow itself to be accessed only by the Ax device and not by code in the A1 application. On the other hand, a subsection to the left of AttA2D1.5 may allow itself to be accessed by both the Ax device and code in the A1 application. And a further subsection to the left of that one may allow itself to be accessed only by code in the A1 application. The divisibility of each PR region into finer resolution subsections is also indicated by the vertical subdividing of PRa1.0 under column 201. In one embodiment, the subdivisions may be as small as single physical page areas (e.g., PpgAa1.02). In alternate embodiments, the finest resolution may be limited to coarser values such as four, eight and so on physical page areas apiece. In one embodiment, each such subdivision identifies directly or by way of an index table a respective point in a corresponding hierarchical attributes defining tree. A root node of such a tree (or branch thereof) may define one or more attributes common to (inherited by) all child nodes of the root node of the tree (or branch thereof). Corresponding child nodes may add further constraints (or optionally override some parent constraints that are allowed to be overridden by child nodes). Thus by identifying a respective point in a corresponding hierarchical attributes defining tree, each subdivision identifies the protected region attributes assigned to its data contents. In one embodiment, a zero index defaults to the subdivision being a nonprotected region (NPR). Governing attributes for respective memory subsections may be mapped in other ways as well for example by defining address start/stop tables that assign to respective ranges of virtual memory space their respective protected region attributes.

The magnified example between columns 201 and 202 (referenced as AttA1X1.2) provides an example of how the buried metadata of column 202 may be organized. A given entry may be associated with a PR identifying tag (e.g., with an index to a PR specifying table), where the starts, pauses, continuations and ends of the respective protected region (PR's) may be defined explicitly or implicitly. The PR identifying tag may indirectly point to or serve as a pointer to where on an identified PR attributes tree the subsection is to inherit its attributes from. In additional to defining the corresponding PR constraints, the metadata for each protected region (PR) may include a virtual page address (VpgA) to physical page address (PpgA) direct translation table that identifies the allocated subsections of that protected region so that the PR enforcing firmware can automatically repeatedly test this buried data to verify its integrity by comparing it with independent access permissions given by the OS or Hypervisor.

Referring back to FIG. 2B yet again, it is to be understood that that the illustrated continuity of each protected region (e.g., PR1, PR2, PR3, etc.) in the illustrated exemplary memory space of FIG. 2B is for sake of not making more complicated, a set of here enabled concepts that are relatively complicated in of themselves. However, it is well within the contemplation of the present disclosure that protected regions (PR's) do not each have to be a contiguous area in virtual address space. Each unitary protected region (e.g., PR3) could instead have been drawn as being scattered (fragmented) and occupying many spaced apart parts of available memory (memory space that is available for the OS and/or its supervised applications to use). In the latter case, the concept of the currently in effect constraints/requirements (also briefly introduced above as Protected Region Defining codes such as PRD1 and PRD3) and the locations of where those specific constraints/requirements apply can be separated from one another. In other words, the metadata of meta-data protecting memory space region (mPRM) 218ee can be subdivided into mapping metadata identifying one or more other parts of the data processing system's memory space covered by access constraints and into constraints defining metadata defining for those identified one or more other parts of the system memory space the one or more constraints and/or requirements that protectively cover them.

More specifically, and by way of a nonlimiting example, assume that there was no PR2 in FIG. 2B and instead the corresponding contiguous memory area 242 was labeled as PR3 just like memory area 243 is labeled as PR3 despite the presence of the intervening dashed NPR space between them. In the latter case and in accordance with one aspect of the present disclosure, there would be a constraints-to-memory map similar to those of FIG. 2E but mapping a predefined first set of Protected Region Defining codes (PRD's) to each of spaced apart memory areas 242 and 243. This exemplary first set of predefined Protected Region Defining codes (not explicitly shown—also referred to herein as constraints defining metadata) might be named PRD3. At the same time, yet another set of predefined Protected Region Defining codes (not explicitly shown) might be named PRD4 will be provided and mapped as applying to memory area 247 (and optionally other spaced apart memory areas—not shown); and a further set of different predefined Protected Region Defining codes (not explicitly shown) might be named PRD1 will be provided and mapped as applying to memory area 241" (and optionally other spaced apart memory areas—not shown) where the mapping of the respective PRD sets to their associated memory areas is provided by the so-called, mapping metadata mentioned above. In other words, the definition (PRD) of the applicable protected region attributes is provided as a separate logical object (e.g., the constraints defining metadata) from the object(s) (e.g., mapping metadata) that map(s) that PRD (set of Protected Region Defining codes or attributes) to a specific area (e.g., 242) within available memory space. The above introductory and first description of each protected region (e.g., PR3) having its own private set of Protected Region Defining codes or attributes is merely a subset of the broader concept of respective sets of Protected Region Defining codes or attributes (PRD's) being mapped to one or more different memory areas (e.g., by the mapping metadata).

Additionally, and yet further in accordance with the present disclosure, the mapping of respective PRD's (Protected Region Defining code sets) to various areas of available memory space does not have to be on a one to many (or one to one) basis. It is within the contemplation of the present disclosure to form logical unions of respective PRD's (Protected Region Defining code sets). More specifically, the totality of protected region attributes governing (covering) memory area 243 of FIG. 2B (the one shown as PR3) might be formed as a logical union of two or more Protected Region Defining code sets, say PRD3a and PRD3b (not explicitly shown, but where PRD3=PRD3a⊕PRD3b and where ⊕ represents the logical union operation). However, embodiments which allow for such logical unions of two or more Protected Region Defining code sets are more complicated because designers might inadvertently try to logically unite a first PRD having a relatively lax attribute (say with regard to which other applications might grab for informational data items in the given memory area (e.g., 243) and a second PRD having a more constrained same attribute (e.g., allowing only two named other applications to try and grab the informational data items). In such a case the PR enforcer is designed to detect the conflict between the to-be-united attributes and to always enforce the stricter one. This avoids the possibility of laxer (more permissive) attributes being inadvertently united with stricter (less permissive) attributes where the laxer (more permissive) attributes control and thereby expose proprietary informational data items and/or proprietary executable code to other entities (e.g., other applications) that the designers did not intend to expose. In other words, it is better to be too safe and shut down execution than to be too lax and allow proprietary information to become exposed.

Moreover, although for sake of simplicity FIG. 2B presents the protected regions (PR's) as if they were fixedly located in virtual memory space, it is within the contemplation of the present disclosure that the protective attributes assigned to informational data items and/or executable codes of respective applications are tied to the data items/codes themselves and not to the locations of where the data items/codes happen to reside. In other words, if the operating system (OS) and/or Hypervisor decides to rearrange the locations in virtual memory space of where the informational data items and/or executable codes of respective applications are to be placed then the PR attribute identifiers for those relocated data items/codes move with them. That is why in general, PR coverage areas will tend to fragment as the operating system (OS) and/or Hypervisor over time rearrange the locations in virtual memory space of where the informational data items and/or executable codes of respective applications are placed. In accordance with the present disclosure, the decisions of the OS and/or Hypervisor to relocate informational data items and/or executable codes of respective applications are communicated to the PR enforcer before being finally executed so that the PR enforcer will permit the corresponding PR constraints (attribute specifications) to travel with their respective relocated informational data items and/or executable codes.

As indicated above, there are numerous design tradeoffs that can be made, one of them being that of enabling logical unions of two or more Protected Region Defining code sets (PRD's) but at the same time complicating the design of (and slowing down the performance of the PR enforcer) because it now has to deal with potential conflicts between logically combined PRD's. Another of the numerous design tradeoffs involves the granularity of the mapping metadata. It could provide mapping down to the resolution of 4 Kb memory pages or it could be made more coarse and not allowing mapping of PRD's to respective memory areas of resolutions smaller than say units of 64 Kb each. Yet another of the design tradeoffs involves the number of different kinds of behavioral constraints/requirements (operational limits and/or requirements) that can be defined by each of the Protected Region Defining code sets. Again, greater numbers of different kinds of behavioral constraints/requirements can complicate the design of (and slow down the performance speed of the PR enforcer) because it then has to test for compliance with each of the greater number of different kinds of behavioral constraints and/or requirements.

Stated more simply, the attributes and enforcements thereof on a per PR basis or per PR subsection basis can vary from embodiment to embodiment. Below Tables 1 and 2 describe one such embodiment where It is to be understood that variations and tradeoffs are possible.

TABLE 1

| Per PpgA Attribute | Description and Comments |
|---|---|
| Read/Write (R/W) | If "0", this attribute causes the memory page to be read only. If "1", it allows read and write on a per page basis. However the PR enforcing firmware/hardware will still block respective reads and writes on a per instruction basis depending on further attribute permissions or denies as to where the reading or writing instruction is hailing from (e.g., an authorized other application). - Implementations can incorporate Protected Region write into existing TLB write attributes. |
| Execute/No Execute (X/NX) | If "0", this attribute causes the hardware to prevent any execution of code in the physical page. Even if "1" and therefore initially permitting the hardware to execute code in the page, the PR enforcing firmware/hardware will still block respective execution attempts on a per instruction basis depending on further attribute permissions or denies as to where the calling or in-threading instruction is hailing from (e.g., an authorized other application) and/or what specific offset the calling or in-threading instruction is trying to start at. - Implementations incorporate Protected Region no-execute into existing TLB mechanisms. |
| Privileged Access As Data From Outside The Protected Region | If "0" (and if next below attribute also "0"), this attribute causes the memory page to be inaccessible for any data R/W operations attempted by an instruction located outside the current PR. If "1", this attribute allows the application to share all the informational data items of this physical page with privileged OS functions. - Implementations do not need additional TLB attributes. |
| User software Access As Data From Other Protected Regions | If "0" (and if immediately above attribute also "0"), this attribute causes the memory page to be inaccessible for any data R/W operations attempted by an instruction located outside the current PR. If "1", this attribute allows the application to share all the informational data items of this physical page with R/W grabs from identified other Protected Regions and special processors. - Implementations do not need additional TLB attributes. |

TABLE 2

| Per PR Subsection Attribute | Description and Comments |
|---|---|
| ID Tags of Protected Regions/Subsections allowed to access data of this subsection as R/W informational data items | Identifies the Protected Regions and/or VpgA ranges (pages) whose instructions are given permission to access data of this PR or identified subsections thereof as informational data items (R/W access). - A PR may exclude even itself from reading/writing from/to its own data. The identifications of allowed self and others may point to a location on a linked list or tree structure where understanding that permissions are only downward to end/lower levels of the list/tree. |
| Access to Unprotected areas as grab-able informational data items | Identifies the unprotected areas (NPR subsections, e.g., VpgA ranges (pages)) into which this PR or subsection thereof may reach out to grab informational data items of the NPR. However, code in unprotected areas cannot access informational data items within Protected Regions. |

TABLE 2-continued

| Per PR Subsection Attribute | Description and Comments |
|---|---|
| Per page read/write (R/W) | "0" = Read only for PR subsection; "1" = read and write |
| Per page execute (X/NX) | "1" = Code of PR subsection is Executable; "0" = not executable |
| Sub-page read, write mask | Optional per PR region read blocking mask for read-only pages, and write blocking mask for writeable pages |
| Protected Region allowed to call into here or to be called from here | Identifies Protected Regions that can be called upon from instructions in this PR subsection and/or protected regions (PR's) allowed to call into executable code inside this PR subsection |
| Allow Calls to code in unprotected areas | "1" = Code in this PR subsection can call upon subroutines in unprotected (NPR) areas; "0" = Cannot |
| Allow Calls from unprotected areas | "1" = Code in unprotected areas (NPR) can call into executable code in this the Protected Region subsection; "0" = Cannot |
| Entry points | Identifies Single, multiple, or multiple with max number of calls into or threads into points in this the Protected Region subsection (e.g., PpgA) - optional |
| Recoverable fault & trap entry | Optional entry point for user recoverable faults and traps |
| Return addresses | Saved and checked separately from existing ISA security for calls, system calls, interrupts, faults, and traps |
| User mode only execution | "1" = Cannot execute at higher levels of privilege |
| Separate Encryption groups | "1" = Uses Unique encryption per group in main memory and uses separate unique encryption in other non-cache storage |
| Attribute change OK | 1 = Region owner (app) can change these per PR subsection attributes if allowed (not "0") and not globally locked |

The below Table 3 provides a review of some of the features covered thus far.

TABLE 3

| | Protected Regions Summary |
|---|---|
| Covered Content | One or more Protected Regions (PR's) can be defined for and owned by each virtual machine or application and can provide corresponding protection to the whole complete VM or applications or to portions thereof where the application/VM or subsection thereof is implemented within a virtual space and defined as containing executable code, code and informational data items, or informational data items only. Regions having executable code can operate in user and/or privileged mode with escalation of privilege protection for regions designated as user only. |
| R/W access to informational data items | Protected Region owners (e.g., apps) may specify which memory pages in each PR constitute unprotected and merely OS privileged informational data items. External devices, and the HV can access these informational data items on a read-only read and write or write only basis. The PR attribute can identify which memory pages (e.g., 4 Kbyte pages) are writeable to. Hardware automatically repeatedly validates access rights in addition to preexisting architecture security. In other words, double sourced testing is performed. |
| Access to executable code | Protected Region owners may specify which regions, unprotected privileged code, HV, and unprotected areas as a group, can call each of their Protected Regions or subsection thereof). The owners can specify specific, allowed entry points and/or allowed as executable pages. Hardware validates entries into Protected Regions, return addresses from calls outside a region, execution allowed, and escalation of hardware privilege in addition to existing architecture. Protected Regions may include provisions for interrupts, recoverable and unrecoverable faults, traps, and debugging. |

TABLE 3-continued

Protected Regions Summary

| | |
|---|---|
| Static and Dynamic Creation of PR's | The HV and OS can create Protected Regions before launching an application or VM and after launch, the applications can request dynamic creation and termination/destruction of protected regions. Protected Region hardware and firmware maintain metadata in buried memory locations for defining the regions and their attributes such that no other firmware or software can access the PR definitions and the attribute definitions. |
| Attestation | Hardware supports Protected Region and system attestation, and region termination and content destruction (post mortem for complete applications and VMs) that no software or firmware can falsely represent as correct. |
| Attribute locking | Protected Region owners can lock many region attributes to prevent subsequent modification by any further software |
| Size, location change | Protected Regions can change in size and location in their virtual address space if the OS and HV permit |
| Encryption | Hardware can encrypt individual and groups of Protected Regions uniquely in main memory and external storage. No software or firmware can access the utilized keys. The PR enforcing hardware/firmware is given key tags that reference the buried swap keys. |
| Integrity protection | Cryptographically strong protection of Protected Regions in external storage, metadata in main memory and external storage, implementation dependent options for regions in main memory |
| Existing architecture | Protected Regions do not modify existing page tables and access management. They are a compatible but separate mechanism. |
| Performance | Minor impact because hardware caches validation with extensions to existing TLBs and performs most validation in parallel with existing multi-stage page table walkings, PR content decryption and re-encryption typically reduces CPU performance by about 1% to 3% |

With reference to the bottom most entry in Table 3 and to FIGS. 2C-2D, in general the modified TLB hardware 215'-215" will be providing the PR attributes information and swap key identifying information for targeted other protected regions (e.g., PR3) when the current instruction resides in a first protected region (e.g., PR1). However, every so often there will be a TLB miss. In that case, the PR enforcing firmware/hardware performs a walk and search through the metadata containing tables of the buried memory region 218ee. This consumes more time than that of obtaining the needed information directly from the modified TLB 215'-215". In accordance with one aspect of the disclosure, the walk and search through of the metadata containing tables in the buried memory regions 218ee can be performed in parallel with the hypervisor walking and searching through its multistage translation tables looking for corresponding physical guest page to physical page translations for filling into the TLB. When the two walk and search through operations occur in parallel, the one servicing the PR enforcing hardware/firmware typically takes less time than the one performed by the hypervisor for filling in other missing data due to a TLB miss. Thus, in that case, the inclusion of the PR servicing walk and search through operation does not at all affect the performance speed of the system. Even when it does, the performance hit is relatively small as compared to that of a multi-page walk and search through operation normally carried by the hypervisor in response to a TLB miss.

In addition to creating protected regions (PR's) whose contents and attributes can not to be modified without such an attempted modification being caught by an attestation check, one embodiment provides for post-use assured destruction of protected regions and their attributes so that the post-use (post free) PR contents and attributes cannot be hijacked for use by a later arriving, malicious application. In accordance with one such embodiment, each PR's-owning application is responsible for destroying its own protected regions before it terminates for example by asking the OS to send a global, destroy my PR's opcode to the PR enforcer 218e which then eradicates the corresponding metadata (including key tags) from the buried metadata zone 218ee and asks the hardware to destroy the actual swap keys provided they are not needed by any remaining PR's in a pre-specified group of PR's. The terminating application is also responsible for provoking a remote attestation challenge that will show there are no remaining protected regions (PR's) for that application in the buried metadata zone 218ee. Alternatively or additionally, a memory space deallocation routine of the operating system (OS) automatically sends a global, destroy PR's-of-application-N opcode to the PR enforcer 218e which then eradicates the corresponding metadata from the buried metadata zone 218ee.

It is within the contemplation of the present disclosure to provide opcodes that eradicate only a specified subset of the protected regions (PR's) owned by the eradication requesting application. In other words, in accordance with specific embodiments, not only can respective applications attest to respective remote parties (and/or other applications on the same system) as to initial contents loaded into their Protected Regions and the attributes loaded into the 'buried' metadata region 218ee, they can also attest to post-use destruction of individual Protected Regions or all of their Protected Regions to remote parties (and/or to other applications on the same system). When an application consisting entirely of Protected Regions wishes to terminate, it can request a post mortem attestation following termination and destruction of its Protected Regions. The post-mortem attestation does not reduce application performance since the application is no longer running. It can however, assure that the application is in a state where it is about to eradicate all its PR contents and request the same from the PR enforcing hardware/firmware for its attributes PR ID's and swap keys. Destruction of the keys used to encrypt and decrypt Protected Regions renders their contents meaningless. Thus, and after arriving application or virtual machine cannot attempt to exploit the left behind contents of no longer in use protected regions.

In accordance with specific embodiments, applications can also attest to remote parties that they are running on a system platform that has successfully attested to a hardware, firmware or software provider (e.g., Microsoft™) the sequence and contents of firmware, HV, and loaded OS software. This includes the system configuration and/or specific system if desired. Attestation hardware can ensure that no firmware or software is capable of responding to an attestation challenge in a way that erroneously convinces the challenger that the system and application are correct.

Referring to the flow chart of FIG. 3, a process 300 will now be described in which an application program is created and developed to use protected regions. At step 310 a new application is created and developed (e.g., source code is written, compiled, run on its own and debugged) without any protected regions being yet declared within the application and without interaction with other applications. At step 312, the initially developed application is inserted into a simulated environment (e.g., 185 of FIG. 2A) that simulates its expected in-the-field environment including simulation or actual use of other applications with which the first application is designed to interact. During this simulation, a traffic flow mapper (e.g., 185.5 of FIG. 2A) is used to automatically map traffic flow behaviors (e.g., pathways taken through virtual memory by respective execution threads) and timings of respective execution threads (e.g., relative order of execution as between respective execution threads) and relevant system state conditions. As mentioned above, ultimately it is the human application developers who decide which parts of an application should be in one or the other of PR and NPR regions and what the attributes of specific PR's should be. The here-described developments tools may be considered as supplementing aids or assisting tools for helping the human application developer make their decisions.

At step 314, software development assisting tools for identifying well behaving and badly behaving execution threads (e.g., those raising and not raising exception flags) are used in conjunction with the traffic flow mappings provided by the traffic flow mapper to identify the general locations in virtual memory of the well behaving flows and of the badly behaving flows. The traffic flow mappings are further used in conjunction with the automatic identification of well behaving and badly behaving threads to identify the locations reached for by the respective threads when either reaching for informational data items they should or should not be reaching for and reaching to transfer executional control to other threads to whom they should or should not be transferring control to. Moreover, the mappings may provide information about the absolute or relative timings of good or bad behaviors and/or about extant system states and developers of the application may use that information to conditionally create, destroy or modify various protected regions (PR's) based on timing and/or system states.

Using the location identifications determined at step 314, in step to 316 locations of respective protection regions (PR's) and the attributes assigned to each are determined automatically and/or manually so as to thereby allow the identified well-behaving threads to perform as desired while blocking the identified badly behaving threads from performing undesired transactions.

At step 318, the source or other application defining code of the application under test is modified to declare the locations of the respective protected regions and their respective attributes. For example, in portion 181 of FIG. 2A, where PR-related declarations such as 181.2, 181.3, 182, 182.1, 182.4, etc. has not been yet present; these PR-related declarations are now added and the source code is recompiled. At this stage, the attestation related declarations such as 181.5 and 182.3 are not yet activated. Successive ones of the protected regions may be activated one after the next and the application retested with these in step 318 to verify that the application continues to perform in the simulated environment as desired even as the successive protected regions (PR's) are brought into effect. It is of course understood that attributes of already-in-affect PR's that relate to other, not-yet effectuated PR's are disabled until the other PR's are brought into effect.

After the operability of the application with all of its PR's activated is assured, the attestation-related portions of the source code are activated and a simulated attestation is run with or without a one time nonce code to determine the corresponding result with or without the nonce code. (The example given at 185.2 of FIG. 2A shows the case of testing without the nonce code.).

Next, in step 320 a beta-version of the application is installed in the field for testing by identified beta testers where the beta version has its protected regions activated, it's attestation features activated and the beta version is enabled to interact with other in-the-field applications and/or external devices.

At step 322, the application developers wait for and receive various bug reports from the in-field beta testers, including bug reports related to the extent definitions of the various protected regions (PR's) and their respective attributes.

At step 324 it is determined whether there are any significant bugs remaining to be resolved. The desired resolutions are ordered on the basis of priority and worked on in that order. Some of the desired resolutions may involve configurations of the various protected regions (PR's). Therefore, in step 325 (assuming the answer to test 324 had been yes) attempts are made to resolve the PR-related bugs by modifying the number of protected regions, by modifying their respective extents in memory and/or their respective attributes so as to enable otherwise-blocked but legitimate applications to interact as desired with the beta stage application. The modifications of step 325 may additionally or alternatively change the protected region configurations so as to block newly discovered illegitimate applications (e.g., discovered by the beta testers or by remote monitoring of application performance) from interacting maliciously or otherwise with the beta stage application.

At step 327 the updated version of the beta application, including optional modifications to its PR configurations and/or to other aspects of the beta application is released into the field for further beta testing and the process loops back to step 322.

Eventually, the determination at test step 324 is that there are no significant bugs remaining related to either the PR configurations of the beta version of the application or two other aspects of the beta version and then the latest version is released as an alpha version at step 334 use and testing by a general population of users.

At step 332, the developers of the application wait for and receive bug reports from trusted in-the field alpha testers of the application. Step 334 constitutes a determination of whether any of these bugs are significant and thus require immediate resolution. If no, the process loops back to step 332. If yes, the process proceeds to an alpha version of step 325 (the alpha version being identified as step 335) where bugs related to the PR configurations and or other aspects of the alpha version are resolved and then the process loops up to step 334 continued use of the latest version of the application including use of its most recent PR configurations.

Figure 4:
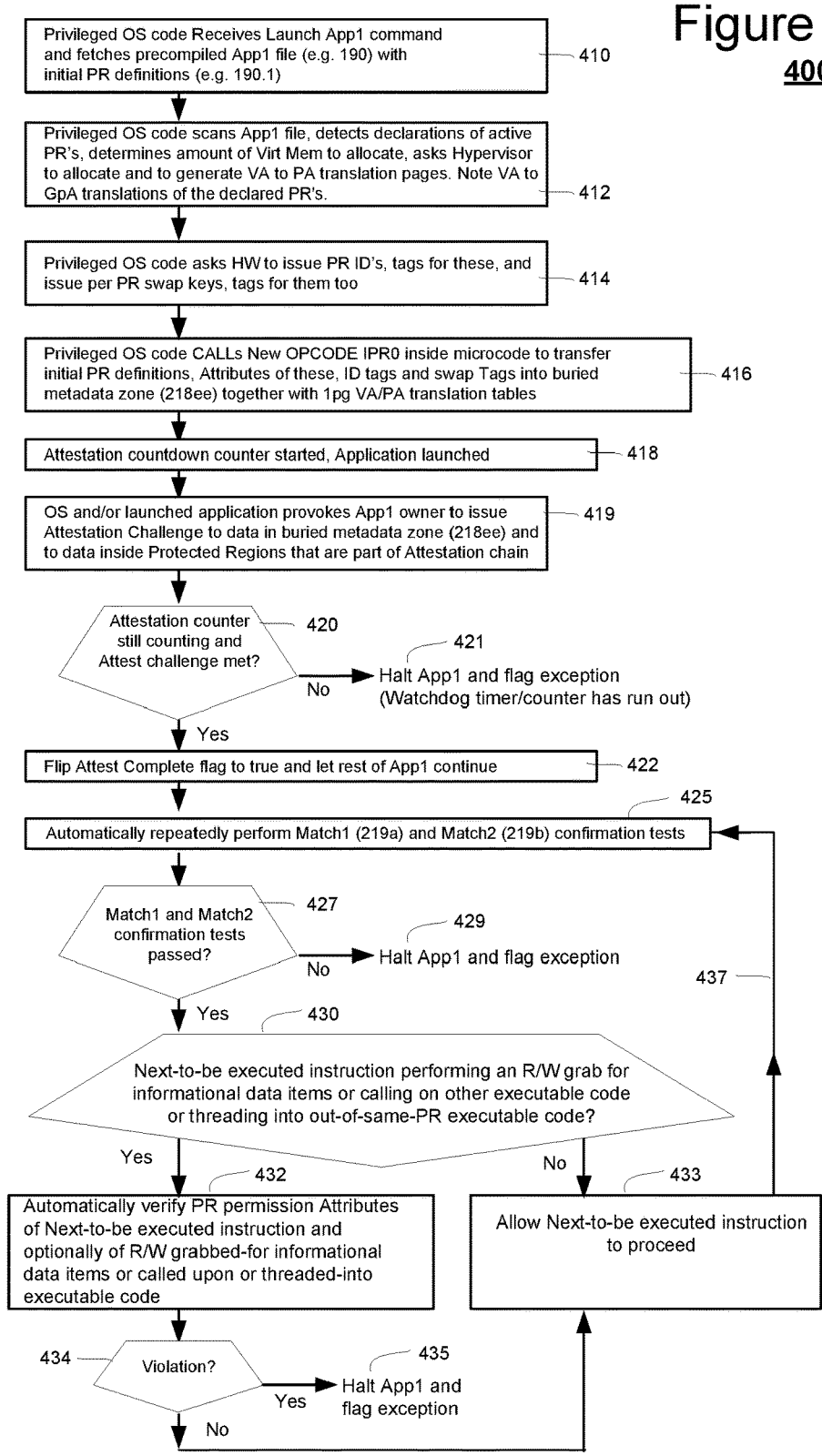
FIG. 4 is a flow chart depicting an install and integrity verifying phase of a protected regions (PR's) endowed application.

FIG. 4 is a flow chart depicting an install and integrity verifying phase 400 of a protected regions (PR's) endowed application. At step 410 a privileged portion of the operating system code receives a launch command for a given application (e.g., App1) and fetches a precompiled application file such as 190 of FIG. 2A which includes initial protected regions (PR's) configuration definitions such as indicated for section 190.1 of the compiled application file.

At step 412, further privileged OS code scans the fetched file for declarations of active protected regions. More specifically in the example of FIG. 2A, the OS may scan for a declaration such as 181.2 indicating that this application will be using the protected regions function. Additionally or alternatively, the OS may scan for a declaration such as 182 indicating that the to-be-launched application (App1) is requesting a creation of one or more of its application-owned protection regions (e.g., Named "App1_PR1") and a defining or reconfiguration of corresponding attributes (e.g., Atts_PR1) for the respective protection region. The automated OS scan may further identify the extent of the declared PR by locating a PR terminating declaration such as 182.4 of FIG. 2A.

Additionally in step 412, the OS automatically determines the amount of virtual memory that will be needed for launching the application (e.g., App1) and asks the hypervisor to allocate the corresponding amount of virtual memory and to generate respective multi-level hierarchical translation tables for converting virtual memory addresses (VA's) in to guest physical addresses (GpA's) and then into actual physical addresses (PpgA's). During this phase, the OS keeps track of the virtual address to guest physical address translations at least for the starts and ends of respective protected regions (and optionally for declared subsections of the PR's) because data derived from these will be stored in the buried metadata zone soon after.

At step 414 the privileged OS code asks the hardware to issue long length identifications for the declared PR's, to issue shorter identifying tags for these PR ID's, to issue respective long length and secure swap keys for the respective PR's and to issue shorter identifying tags for these swap keys. The issued long length identifications should be unique ID's each tied securely to the contents of the respective PR (e.g. where the ID includes a cryptographically strong hash of the contents of its respective PR), Referring to step 416, until this point the OS has had access to the PR definitions, to the respective definitions of their attributes and to the tags for the PR ID's and their respective swap keys. However, at step 416 the privileged OS calls on a newly created opcode (e.g., IPR0) to move or copy this information into the buried meta-zone 218ee of the hardware together with one page direct VA to PA translation pages for the respective PR's and/or defined subsections thereof. As indicated above, the OS cannot intelligibly read what is inside the buried meta-zone 218ee. Only the PR enforcer hardware/firmware 218e can do so.

At step 418 and in accordance with a non-limiting example embodiment, one or more countdown counters are started to countdown respective temporal or other counts for when attestation needs to be provoked or completed. The other counts may be those of specific executional events by the launching application (e.g., App1) and or of the number of instructions executed by the launching application. Then the application is launched to begin performing its initial instructions. For example, these may include 181.5 of FIG. 2A. In an alternate embodiment, no countdown counters are used. Instead, attestation is invoked by one of the Hypervisor, the OS or from within an NPR portion of the application.

At step 419, at least one of the operating system and the launched application (e.g., App1) provokes an attestation challenge to be issued from a remote server of the owner of the launched application or from an appropriate other device designated by the owner or by a delegate appointed by the owner. The provoked attestation challenge causes the OS to use a new second opcode (e.g., IPR1) that causes the PR enforcer to stream the metadata within its buried metadata zone 218ee to the hardware hasher (e.g., 212 of FIG. 2B) and hardware encryptor (213) for subsequent transfer back to the attestation challenger. In addition to the streaming of the buried meta-data zone information through the hasher and encryptor, the OS may optionally stream through them the contents of respective protected regions (PR's) which had declared themselves to be part of the attestation chain. Moreover, the OS will have received a one time nonce code from the challenger which the OS also streams through the hasher and the encryptor (e.g., 212/213). At the other end, the challenger determines whether the hashed and encrypted stream is one that is expected for the case where the buried metadata have not been compromised with and the contents of the in-attestation chain protected regions (PR's) have also not been compromised with. If yes, the challenger sends back an appropriate, digitally signed certificate attesting to the integrity of the challenged information. In one embodiment, the OS has to present the digitally signed certificate to the PR enforcer 218e. Once the PR enforcer receives an appropriate assurance of the attestation challenge having been successfully met, the PR enforcer flipped to true, and attestation complete flag thereof and stops the attestation countdown counters. Step 420 indicates that the application is automatically halted if one or more of the counters has counted down to zero and the attestation challenge has not yet been successfully met. As indicated above, the countdowns may be time related, event-related and/or instructions-executed related. It is up to the application owner to determine which and how many of these constraints for completion of the attestation challenge need to be met for allowing the application to continue execution.

At step 422, the attestation complete flag has been flipped to true and the PR enforcer 218e allows the rest of the instructions in the launched application (e.g., App1) to start executing. In an alternate embodiment, no part of a PR can be accessed until after the whole of the PR has been validated for example by a Hypervisor or OS provoked attestation challenge.

Referring to step 425, as the rest of the instructions start executing, the PR enforcer 218e automatically begins performing the Match1 and Match2 confirmation tests as indicated at step 427. If either of these fail, the application is automatically halted at step 429 and an exception flag is raised.

In one embodiment, the enhanced TLB hardware performs match tests as previously discussed on all data and code fetches. In an alternate embodiment, the PR enforcer 218e additionally determines with each next-to-be-executed instruction (or speculatively-to-be-executed but-not-yet-committed instruction) of the application and at step 430 whether it will be making either a read or write (R/W) grab for informational data items within the PR of the currently executing code, within another PR, within a nonprotected region (NPR) of main memory or within another PR two which executional control is being simultaneously passed (e.g., by way of a CALL instruction). Additionally or alternatively, the PR enforcer 218e determines at step 430 whether the next-to-be-executed instruction will be passing executional control to executable code within another PR, or within a nonprotected region (NPR) of main memory and if so, whether that passing of executional control is by way of a CALL instruction or by way of a direct threading to that other executable code (e.g., equivalent to a JUMP TO instruction).

If the answer is no, meaning that the next-to-be executed instruction is not passing executional control to another region and is not grabbing for informational data items that may be subject to protection, then the process proceeds to step 433 which allows the next-to-be-executed instruction to execute. Then the PR enforcer loops back to state 425 for repeated performance of the match confirmation tests at step 427 and the protection and enforcement test of step 430. Although shown in sequence, it is within the contemplation of the present disclosure that tests 427 and 430 are performed in parallel.

If the answer to test 430 is yes, meaning that the next-to-be-executed instruction is either passing executional control to another region and/or it is grabbing for informational data items that may be subject to protection, then the process proceeds to step 432. In step 430 to the PR enforcer automatically verifies the presence of PR permission attributes allowing the next-to-be-executed instruction to be executed and to optionally make a read or write grab for informational data items that are subject to protection and to optionally pass executional control to next executable code outside the current protected region. If there is a violation, next step 434 automatically causes the application to halt as indicated at 435 and an exception flag is raised. If no, step 433 is carried out allowing the next-to-be executed instruction to proceed with its operations which can include a read or write grab for informational data items subject to protection and/or a passing of executional control to next executable code outside the current protected region.

Figure 5:
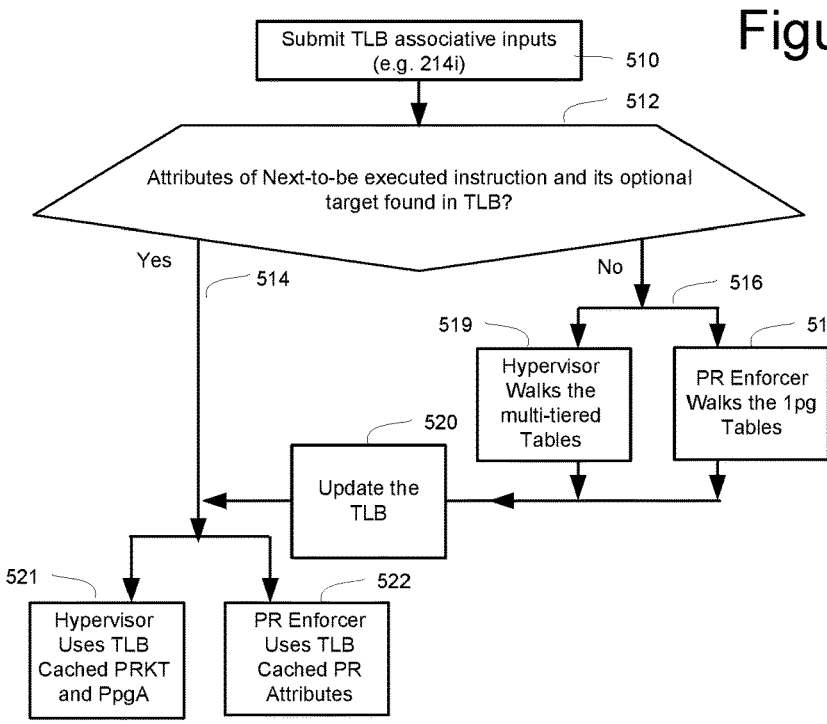
FIG. 5 is a flow chart depicting what happens if there is a TLB lookup miss.

FIG. 5 is a flow chart depicting a process 500 that may be employed when there is a TLB lookup miss. At step 510 set-associative inputs are applied to the translation lookaside buffer (TLB). Examples are shown in FIGS. 2C and 2D, for example at 214i. The virtual page address (VpgA) may be sourced from the operating system or the hypervisor. The identifications of the PR's of the next to be executed instruction and optionally next to be targeted further code or informational data originate from the executing application and are represented by short length PR ID tags.

At step 512 the TLB hardware attempts to find the matching payload data. Examples of respective output payloads are shown in FIGS. 2C and 2D, for example at 215o'. If the desired information is found (yes path 514), control passes two steps 521 and 522. In step 521 the hypervisor uses the TLB cached swap tag (PRKT) and the physical page address (PpgA) as needed for finding the physical location of targeted data and optionally decrypting it and swapping it into system cache. In step 522, the PR enforcer uses the TLB cached PR attributes for enforcing corresponding constraints and/or requirements of a next to be executed instruction and/or of and optionally targeted informational data item and or called upon executable code.

If the result of attempt step 512 indicates that the payload is not present in the TLB (no pathway 516) then control passes to parallel wise executed steps 518 and 519. In step 518 the PR enforcer walks the one page translation tables stored in the buried metadata zone 218ee to find the missing PR attributes, R/W/X permissions, and physical addresses for its use in the Match1, Match2 confirmation tests (e.g., which can be tests using unions of the more restrictive permissions) and attribute enforcing operations. At the same time in step 519, the hypervisor walks the multi-tiered VA/GpA/PA translation tables for use in providing its input to the Match2 double sourced confirmation test (e.g., 219b of FIG. 2B). In step 520, the data which had been missing from the TLB is updated into the TLB. Control is then passed to steps 521 and 522. It is worthy to note that because the table walking steps of steps 518 and 519 are performed in parallel, the presence of the PR enforcer table walk (step 518) does not impose a substantial performance slowdown on the overall system. The PR enforcer walked one-page tables tend to be substantially smaller than the multi-tiered VA/GpA/PA translation tables used by the hypervisor. So even if the hypervisor does not need to take a walk, but the PR enforcer does, the impact on performance speed is relatively small.

Figure 6:
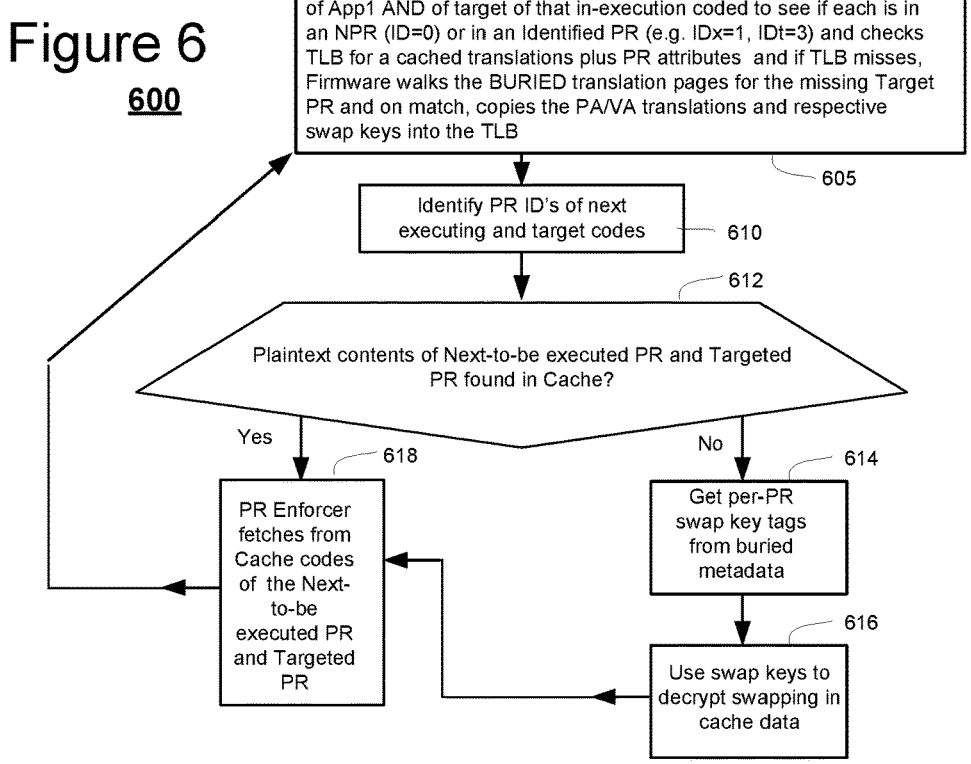
FIG. 6 is a flow chart depicting what happens when data of a protected region has to be swapped in from general memory into an encapsulated cache memory.

FIG. 6 is a flow chart depicting a process 600 that may be used when data of a protected region has to be swapped in from general memory into an encapsulated cache memory (e.g., 218a of FIG. 2B). Step 605 provides an example of normal operations of the PR enforcer, which include identifying the respective protection regions (PR's) of the next to be executed instruction and optionally of its next targeted informational data item and/or the executable code to which it will be transferring control. The operations in step 605 sometimes require the PR enforcer to determine the nature of the next to be executed instruction and or of its optionally next targeted informational data item and/or transferring-to executable code. To do so, the PR enforcer needs the plaintext version of those codes. If the needed plaintext versions are not already in the encapsulated system cache (e.g., 218a of FIG. 2B), they need to be decrypted and swapped in from the less secure memory spaces (e.g., 116 of FIG. 2B).

As mentioned above, each protected region (PR) can have its own unique swap encryption and decryption keys. In some embodiments different sets of swap encryption and decryption keys are used by respective subsets of plural protected regions (PR's). At step 610 the identifications of the protected regions (PR's) of the next executing and targeted codes are determined. At step 612 it is determined whether the respective plaintext contents for the respective protected regions (PR's) or for the respective subsections of those PR's that contain the next to be executed instructions and the corresponding targeted data are already present in the system cache. If yes, control is passed to step 618 where the PR enforcer fetches the needed plaintext contents for use in its attribute enforcing operations.

If the result of determining step 612 is no, control passes to step 614 where the tags for the to-be swapped in PR contents are obtained, the corresponding swap keys are obtained (by the underlying hardware) and then in step 616 the obtained swap keys are used (by the underlying hardware) to decrypt the swapping-in new cache data. In one embodiment, although the swap key tags are kept in the TLB, the actual swap keys are kept secreted by the hardware (not in the buried metadata zone 218ee) and are thus intelligibly accessible only to the underlying hardware and not to any user software, operating system software or hypervisor software or event the PR enforcer. Thus, the plaintext contents of the protected regions are kept secured and are converted into plaintext only within the encapsulated system cache and only under supervision of the PR enforcer and the underlying hardware.

In accordance with certain embodiments, the buried Protected Region metadata zone also stores a map of the main memory which indicates where the protected regions (PR's) are currently located. Column 210 of FIG. 2E may be representative of such a map. The protected main memory map may be as simple as one bit per page ("1" if protected and "0" if unprotected) for resolutions as small as 4-Kbyte page boundaries. Alternatively or additionally, tree structured maps may be used.

In certain embodiments the short-length PRCAT tags can be, e.g., 8 to 12 bits while the longer length protected-region identifications are substantially larger, e.g., 32 bits. In one embodiment, Two PRCAT codes are reserved to represent privileged and user virtual spaces that are not within respective Protected Regions.

In accordance with certain embodiments, Protected Regions are subdivided into subsections each of which can have it own Sub-page Attributes. The Sub-page Attributes may be used to control read and/or write access to, for example, each 64 to 256-byte portion of a 4-Kbyte physical memory page.

In some embodiments, hardware limitations and/or performance considerations may call for limiting the number of Protected Regions that will be supported and/or the sizes of these that will be immediately swappable into cache. Practical limits may be constituted as hundreds to a few thousand PR's. In one embodiment, the software development tools flag out conditions where the source code tries to exceed the maximum number of Protected Regions that an application can have.

The number of Protected Data Regions does not directly affect hardware cost and performance. Implementations can support an arbitrarily large number. The primary considerations are main memory space for and integrity checking of attributes. Implementations can support integrity checking as a performance vs. size of checked memory tradeoff rather than a fixed hardware limit.

In accordance with certain embodiments, Protected Region access to unprotected areas may be enforced similar to access to specific other Protected Regions. Protected Region hardware and firmware can allow or disallow access to unprotected areas (NPR's) as an attribute of each Protected Region (PR). The Protected Region architecture does not restrict unprotected area access to unprotected areas. Existing HV and OS restrictions continue to apply.

The Protected Region architecture does not change existing guest virtual to guest-physical to physical (or host) page tables or HV and OS management of them.

In accordance with certain embodiments, Protected Regions are linear areas in an application's virtual address space. Protected Regions can include pages of any supported sizes, e.g., 4 Kbytes, 64 Kbytes, 2 Mbytes, and 1-Gbyte. An application can have multiple Protected Regions, and consist entirely of one PR or a mix of plural Protected Regions and NPR's.

Protected Regions can assist the application in protecting its overall integrity from other portions of the same application (e.g., coded by a different coding group) or protecting certain portions from the rest of the application by structuring itself as a number of protected code (and code and data) regions and typically a larger number of Protected Data Regions, specifying which code regions can access each data region, specifying which code regions can read and/or write sub-page portions of some data regions, and specifying which code regions can enter each code region.

Protected Regions can also assist the application in protecting itself from the OS, IO components, special processors, and other applications by only allowing certain ones or parts of them to access data in specific Protected Data Regions and/or selected pages of specific Protected Data Regions, specifying where privileged non-Protected Region code can enter the application, and specifying if and where non-privileged non-Protected Region code can enter the application In certain situations an application can leave its interfacing to the OS relatively unchanged by not using separate Protected Regions to share data with the OS. It could still restrict privileged-mode code and, separately, shared libraries and other user-mode code to accessing specific pages as data.

In accordance with certain embodiments, applications create (declare) their respective Protected Regions and/or dynamically modify them via the OS because the OS must be aware of their existence. Alternatively or additionally, applications can interact directly with Protected Region firmware (the PR enforcer) to dynamically change some attributes of their Protected Regions. The OS can also create Protected Regions that an application will own and prepare partial attestation information before launching the application.

In accordance with certain embodiments, hardware applies execution and data access control to each Protected Region in addition to existing architecture. In accordance with certain embodiments, hardware encrypts Protected Regions with session keys that are unique to a region or group of regions. Hardware generates and handles the keys. No CPU or security processor software knows the key values. Hardware destroys keys when no longer needed, and thus the encrypted versions of the Protected Region contents become meaningless even if not properly destroyed when the owning application terminates.

In accordance with certain embodiments, hardware encrypts each Protected Region's main memory resident pages with the appropriate resident session key. The encryption algorithm is preferably low latency for small blocks including CPU cache lines, and can incorporate whitening values modified by the physical address.

In accordance with certain embodiments, hardware decrypts and re-encrypts each Protected Region's pages with the appropriate non-resident session key and an address-independent algorithm when swapping out to other storage, and the reverse when swapping in. Protected Region hardware and firmware can maintain SHA2 256-bit hashes of swapped out pages. The hashes include ID and version information. Protected Region hardware and firmware maintain the hashes in encrypted and integrity protected main memory or encrypted and signed when swapped out to other storage.

In accordance with certain embodiments, Protected Regions have attributes that group regions for encryption, enable main memory encryption, and separately, non-resident encryption. These and other attributes can be part of Protected Region attestation. A Protected Region owner can change some attributes after attestation, but not encryption. The architecture does not allow attribute changes except as noted to minimize complexity (details to be determined for the most part). Owners can lock many changeable attributes to prevent further change.

Protected Region owners (e.g., applications) specify which Protected Regions containing code and system components can access each of their Protected Regions as data. They also specify which of their Protected Regions containing code can access unprotected areas. The architecture does not allow unprotected areas to access Protected Regions except for privileged access to specific Protected Regions if privileged code is an unprotected area.

The architecture may implement data access from the perspective of executing Protected Regions, unprotected privileged code, and system components. This indicates which Protected Regions (or unprotected area) can a Protected Region access data in, and in which Protected Regions can a special processor, IO component, or unprotected privileged code access data.

Protected Region hardware and firmware use and maintain implementation-dependent metadata, outlined above with reference to validate access to Protected Regions. The architecture does not change existing guest virtual to guest-physical to physical (or host) page tables or HV and OS management of them. Existing page-based access attributes continue to apply.

The architecture can include page-based access attributes for Protected Regions in the page tables that Protected Regions hardware and firmware use and maintain.

The architecture can provide sub-page access control as an option for Protected Data Regions. As an example, these could apply to each 64 to 256-byte portion of a 4-Kbyte page. They could allow or prevent access for read-only pages, and allow or prevent writing for pages with read and write access. Protected Region owners can change and lock sub-page attributes (locking on a sub-page, page, or region basis). Sub-page attributes are optional because they increase attribute space and time to check Protected Region attributes during TLB misses.

In accordance with certain embodiments, Protected Regions cannot move within application virtual spaces after creation where this limitation reduces complexity. Main memory pages can move. Protected Region hardware and firmware moves main memory pages that are part of Protected Regions for the HV and OS. The PR enforcer architecture does not care about guest-physical addresses since it works with VA's and PA's only. Protected Region hardware and firmware manages main memory access, encryption, and integrity protection of Protected Region pages that the OS moves between main memory and other storage.

In accordance with certain embodiments, Protected Region owners specify entry points for their Protected Regions containing code. They specify which Protected Regions can enter, whether privileged code can enter if it is an unprotected area, and whether non-privileged unprotected areas can enter. Depending upon implementation, there may be possible limits on the number of entry points, number per page, and whether restrictions apply per region or entry to be determined. In accordance with certain embodiments, Protected Region entry restrictions do not apply to system calls.

In accordance with certain embodiments, when a Protected Region calls another Protected Region, each must access data in permitted regions to avoid violations. In accordance with certain embodiments, the caller's stack must be in a shared region when making the call to save the return address in an accessible location for the return. This minimizes changes to existing architecture, but hardware saves the return address for validation on return in addition to existing architecture. The caller can switch its stack (its top of stack pointer) from its own or other private Protected Region to a Protected Data Region shared with the called region before making the call. The caller can pass parameters in the shared region and registers. The caller should remove secrets that it does not wish to share from registers before moving its stack to the shared region.

In accordance with certain embodiments, Protected Region owners specify whether each of their Protected Regions containing code can call unprotected areas. In accordance with certain embodiments, the caller's stack must be in an unprotected area (NPR) when making the call to save the return address in an accessible location for the return. The caller should remove secrets that it does not wish to share from registers before moving its stack to an unprotected area. Hardware saves the return address for validation as it does for calls to Protected Regions.

In accordance with certain embodiments, Protected Region owners specify whether each of their Protected Regions containing code can make system calls. Hardware saves the return address for validation on return in addition to existing architecture. Similar to calling another protected application region, privileged Protected Regions or privileged unprotected areas can only access data in protected application regions that the application permits. In the likely event that privileged code is an unprotected area and the caller is executing in a Protected Region that unprotected privileged code cannot access, it switches its stack to a Protected Data Region shared with unprotected privileged code before making the call. The caller can pass parameters in the shared region and registers. The caller should remove secrets that it does not wish to share from registers before moving its stack to the shared region.

Interrupts, faults, and traps transfer execution to privileged OS code. Hardware saves the application state and replaces it with Protected Region architecture-defined state in order to maintain application privacy before following existing architecture. An OS supporting Protected Regions does not attempt to access protected application region data to handle interrupts, faults, and traps. Hardware restores the true application state on return and validates the return address.

In accordance with certain embodiments, when there are multiple calls to a Protected Region entry point, hardware optionally blocks an entry point after entry until the Protected Region unblocks it. This option may be per region rather than per entry point. Using this option will generally have some performance effect to block and unblock. It may not be useful for shared libraries and between application-created Protected Regions.

A protected application region containing code can optionally specify an entry point for resolving potentially recoverable faults and traps that the OS does not resolve. These include faults such as divide by zero, and software interrupts and breakpoints. This entry point could always block additional entries until the Protected Region unblocked it. Application fault and trap handling code can determine that a fault occurred and the fault or trap type and application state from information saved in the Protected Region.

In accordance with certain embodiments, the architecture validates calls and system calls from the perspective of the executing Protected Region or unprotected area. This is which Protected Regions can a Protected Region or unprotected areas enter. The architecture may restrict transfers into or out of Protected Regions to selected types of calls and returns (and system calls, interrupts, faults, and traps) for simplicity. An attribute for Protected Regions containing code can disable Protected Region entry point checking and blocking. A separate attribute can disable saving and validating return addresses.

In accordance with certain embodiments, Protected Region SoCs contain a security complex including a security processor and related hardware. The security complex boots the system and generates an attestation measurement of the firmware and software loaded for the security processor, HV, OS, and Protected Regions.

In accordance with certain embodiments, the security complex generates attestation measurements of protected-regions on request of the OS and Protected Region owners. Protected Region hardware and firmware can finalize an application Protected Region attestation before the OS launches the application. The application can have the OS create additional Protected Regions. It can have the OS request finalization of the attestation of these. It can also supply code and data directly to Protected Region hardware and firmware for these regions that the HV, OS, and other applications cannot see, and then request finalization of their attestation. The application could receive this code and data encrypted from external sources.

In accordance with certain embodiments, Attestation hardware in the security complex uses a system-specific ECC or RSA private key to sign system attestation and a separate private key to sign application attestations. The attestation hardware will not sign application Protected Region attestations unless Microsoft has securely communicated to it that the system passed an attestation challenge. Security processor and CPU firmware and software cannot access private keys used for attestation, erroneously certify system attestation, or erroneously deliver correct attestation results.

In accordance with certain embodiments, the HV can have hardware lock selected main memory pages as the only ones that can execute in HV mode, prevent modification of the HV code, lock selected main memory pages as only accessible by the HV, and integrity protect HV code and data. This is separate from Protected Regions.

In accordance with certain embodiments, add HV-controlled escalation of privilege protection can be added if not already part of the ISA. This is separate from Protected Region escalation of privilege protection of application protected-regions, but improves overall system security.

Protected Region firmware in the CPU may actually be specially protected CPU software. Its protection is as strong as any CPU firmware can be. Hardware locks, integrity protects, and controls entry. ISA software can use software development tools, and eliminate many implementation dependencies. Business issues may also favor ISA software.

Protected Regions can be active or inactive. Active Protected Regions have pages in main memory and/or have pages that the OS can immediately swap into main memory. An implementation has a limited number, for example, 256 to 4096 active Protected Regions containing code. TLB hardware limits the number. An implementation can have a much larger number of active Protected Data Regions. Protected Region firmware and memory space for attributes determines the number. An implementation can have an arbitrarily large number of inactive Protected Regions. An implementation can make all of the Protected Regions owned by an application active when the application executes to simplify deadlock prevention. Pages of active and inactive regions can be in main memory or swapped out.

In accordance with certain embodiments, Protected Regions use separate session keys for main memory resident and non-resident pages of a Protected Region because non-resident pages could exist for a long time. Separate keys typically have little cost because IO and each memory controller will generally have their own key storage.

The implementation can maintain a VA to PA view of Protected Region pages. It does not care about guest-physical addresses. In accordance with certain embodiments, Protected Regions do not interfere with existing memory management, but the HV, OS, and/or applications must communicate VPA and PPA information to Protected Region firmware. Protected Region firmware and hardware is involved in swapping pages in and out of main memory to validate virtual and physical addresses, manage encryption, and generate and check hashes.

CPU and other system component TLBs contain PRCAT, PRKT, and code transition additions discussed in the Introduction chapter Snapshot section.

Tags for caches and buffers that cast out modified data to main memory contain PRKTs so that memory controllers can correctly encrypt cast out data. This generally does not affect lower level caches when a higher-level cache is inclusive of their contents.

In certain embodiments and as part of launching an application, the OS requests Protected Region firmware and hardware to create session keys for the application's protected-regions. No software or firmware, including Protected Region firmware can see the keys, and Protected Region hardware and firmware encrypts and signs the keys when it stores them outside the SoC.

SoC main memory controllers use the appropriate key to encrypt and decrypt memory requests. Proposal is to use the physical address and a common value for all Protected Regions established at boot for whitening.

SoC IO components use the appropriate key, different from main memory keys, to encrypt and decrypt pages swapped to other storage. They calculate SHA2 256 hashes that Protected Region firmware and hardware saves in integrity protected main memory, or encrypted, signed, and swapped out. The IO component for swapping Protected Region pages in and out of main memory is a critical security component like the CPU in terms of access to Protected Regions. File IO should use a separate cryptography engine for performance, resource management, and security isolation.

In accordance with certain embodiments, integrity protection for HV code and data, including physical page tables, and Protected Region metadata in main memory, is provided. It does not necessarily include integrity protection for application code and data in main memory. Swapped out application code and data is integrity-protected. The whitening part of the main memory encryption algorithm protects against move attacks. Protected Regions protect against disallowed access. Server main memory generally includes ECC to detect double bit errors per 64 or 128 bits. Modifying encrypted memory requires physical access to circuit boards, and modifying contents usefully is problematic. Integrity protection with no performance effect is expensive because hashes of contents are on-chip. Much of the data that is integrity protected uses a tree structure with leaves of integrity-check values in main memory but also cached in CPU cache. This trades performance for cost, but much of the potential performance effect is hidden by existing table walk time. Similar techniques can be applied to application main memory contents, but performance effects are not hidden because they apply to data and code CPU cache misses rather than TLB misses.

In accordance with certain embodiments, there are at least two options for debugging and performance monitoring. One option is that existing architecture breakpoints and software-generated interrupts can enter the interrupted Protected Region at its optional fault and trap resolution entry point. Code instantiated inside the region can respond and return to the interrupted code stream. A second option is that an application can create a protected debug code and data region with access to other Protected Regions as desired Performance Below is a summary of how system performance can be effected by Protected Regions.

Generally, there is no material effect for unprotected areas accessing memory: TLB miss hardware can determine that an access is to unprotected areas in parallel with existing TLB miss resolution. The latter requires as many as 24 CPU-cacheable memory accesses. Determining that an access is to an unprotected area should usually be less.

Generally, no material effect for Protected Regions accessing memory, and violations can be precise in most implementations though often not able to restart. Restart should not matter because violations are fatal to the application. TLB miss hardware can determine if an access is to unprotected areas, and access protected area information in parallel with existing TLB miss resolution. All of the information is CPU cacheable. The number of accesses to resolve depends on implementation details, but can usually be less than the accesses to resolve existing guest-virtual to guest-physical mapping.

Calls between Protected Regions incur performance cost to save return information separate from existing architecture saving. Returns incur performance cost to check the saved return information. Expect small overall effect, but analysis of typical usage needed.

Main memory encryption typically costs 1-3% CPU performance. Encrypting any region adds the cost to every region to adhere to ordering requirements easily. See integrity protection discussion above.

In one embodiment, reassigning PRCATs and PRKTs because an application terminated requires flushing entries with the tags from TLBs. This happens anyway for terminated applications to reassign their main memory space. It also requires flushing modified data with the PRKTs from caches and write-buffers. This has some performance cost, but the memory transactions would happen eventually. A side benefit is that destruction of the encryption key makes the region contents unreadable in main memory—clearing is not necessary.

Reassigning PRCATs and PRKTs because of a shortage of tags requires the same steps as a terminated region, keys for reactivation should be saved. Implementations should support enough PRCATs and PRKTs so that this does not happen frequently.

Protected Regions, which were describe above, can coexist with Intel™ Software Guard Extensions (SGX) and Intel™ Memory Protection Extensions (MPX) in an x86 implementation (a combined architecture may disallow use of SGX enclaves and Protected Regions within the same virtual space). Protected Regions provide many advantages over SGX, including efficient protection of entire VMs and applications, private and secure sharing between Protected Regions, protected code and data, code-only, and data-only regions with access and entry rights flexibility, page and sub-page access rights, and incorporation of special processors, IO, and the OS into the protection scheme.

Caching Metadata

In accordance with certain embodiments, a fully associative L1 TLB-like structure supports full performance when it hits. A hit indicates that the Allocation ID is valid. Payload data for the entry provides the information necessary for other checks.

In accordance with certain embodiments, a Protected Pointer TLB can be larger than a typical 64-entry address TLB because it does not have to complete in a single cycle for full performance. Execution is speculative until a check is complete, but execution is not waiting for the results of a check as it generally soon is for data reads.

In accordance with certain embodiments, the pointer TLB associates on 53 bits including ASID (or 45 bits if cleared when switching ASIDs). Address TLBs typically associate on 44 bits (36 VPA+8 ASID).

In accordance with certain embodiments, a related structure with the same number of entries associates on the 60 to 6-bit Allocation ID. This structure indicates pointer TLB entries to invalidate if they match a freed Allocation ID. It does not have payload data. Multiple entries can match.

Example Operating Environment

Figure 7:
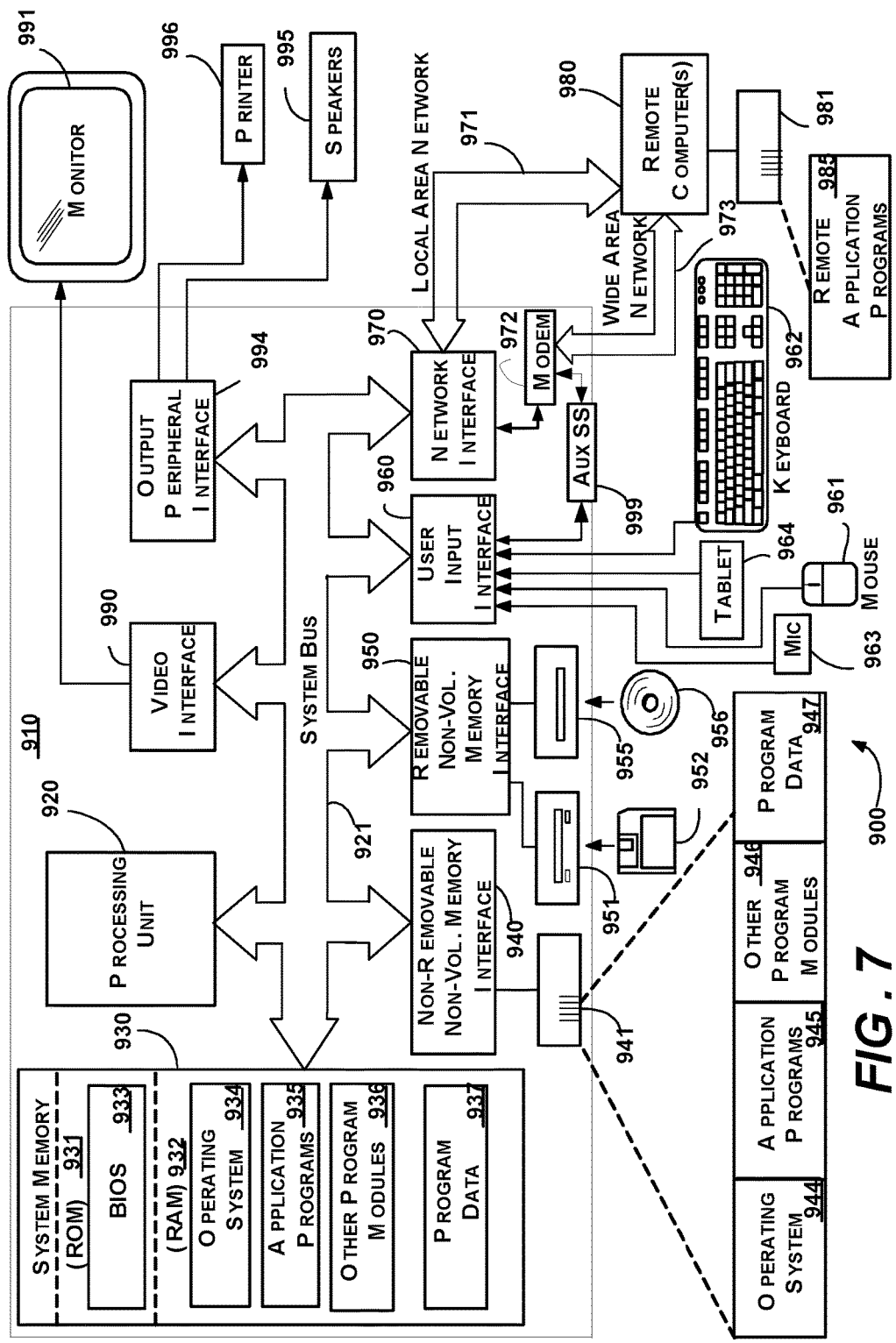
FIG. 7 illustrates an example of a suitable computing and networking environment into which the examples and implementations of any of FIGS. 1-6 as well as any alternatives may be implemented.

FIG. 7 illustrates an example of a suitable computing and networking environment 900 into which the examples and implementations of any of FIGS. 1-6 as well as any alternatives may be implemented. The computing system environment 900 is only one example of a suitable computing environment and is not intended to suggest any limitation as to the scope of use or functionality of the embodiments of the present technology. Neither should the computing environment 900 be interpreted as having any dependency or requirement relating to any one or combination of components illustrated in the example operating environment 900.

Embodiments of the present technology are operational with numerous other general purpose or special purpose computing system environments or configurations. Examples of well known computing systems, environments, and/or configurations that may be suitable for use with the embodiments of the present technology include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

Certain embodiments of the present technology may be described in the general context of computer-executable instructions, such as program modules, being executed by a computer. Generally, program modules include routines, programs, objects, components, data structures, and so forth, which perform particular tasks or implement particular abstract data types. Certain embodiments of the present technology may also be practiced in distributed computing environments where tasks are performed by remote processing devices that are linked through a communications network. In a distributed computing environment, program modules may be located in local and/or remote computer storage media including memory storage devices.

With reference to FIG. 7, an example system for implementing various aspects of certain embodiments of the present technology may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Although not shown, the system bus 921 may additionally have other resources operatively coupled to it such specialty graphic processing units, specialty parallel math (e.g., vector) processing units and so on.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 6 illustrates operating system 934, application programs 935, other program modules 936 (e.g., a hypervisor) and program data 937.

The computer 910 may also include other removable/non-removable, volatile/nonvolatile computer storage media. By way of example only, FIG. 6 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 7, provide storage of computer-readable instructions, data structures, program modules and other data for the computer 910. In FIG. 7, for example, hard disk drive 941 is illustrated as storing operating system 944, application programs 945, other program modules 946 (e.g., hypervisor code) and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 7 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 7. The logical connections depicted in FIG. 6 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 7 illustrates remote application programs 985 as residing on memory device 981. It may be appreciated that the network connections shown are examples and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

Acronyms and Special Terminology Used Herein

| | |
|---|---|
| AES | Advanced Encryption Standards |
| ASID | Address Space ID |
| CPU | Central Processing Unit |
| ECC | Error Correcting Code, Elliptic Curve Cryptography |
| GP or GpA | Guest Physical address |
| GPU | Graphics Processing Unit |
| GV or GvA | Guest Virtual address |
| HV | Hypervisor |
| IAPM | Integrity Aware Parallelizable Mode for block ciphers |
| ID | Identification |
| IO | Input and Output off chip |

-continued

| | |
|---|---|
| IP | Intellectual Property |
| ISA | Instruction Set Architecture |
| MMU | Memory Management Unit |
| MPX | Intel Memory Protection Extensions |
| OS | Operating System |
| PA | Physical Address |
| PPA or PpgA | Physical Page Address |
| PR | Protected Region |
| PRCAT | Protected Region Code Access Tag identifying a PR containing code with pages in or immediately swappable into main memory |
| PRKT | Protected Region Key Tag indicating the encryption-decryption keys used for a PR with pages in or immediately swappable into main memory |
| RSA | Rivest, Shamir, and Adleman public key encryption algorithms |
| RTF | Region Transition Flag |
| SGX | Intel Software Guard Extensions |
| SHA, SHA2 | Secure Hash Algorithms |
| SoC | System on Chip |
| TLB | Translation Look aside Buffer, a cache of address translations |
| VA | Virtual Address |
| VM | Virtual Machine |
| VPA or VpgA | Virtual Page Address |

As a nonlimiting overview of the present disclosure it is seen that what has been disclosed includes a machine-implemented method for securing a data processing system, where the method comprises: (a) storing in a memory zone that is not intelligibly accessible to user software and to operating system software, metadata defining an extent of at least a first protection region (PR) constituted by a corresponding first area of a main memory of the data processing system where the first area, if not otherwise protected, is usable by user software and by operating system software, the stored metadata further defining access constraining attributes of the first PR including at least one of first access constraints for informational data items that can be present in the first PR and second access constraints for executable code that can be present in the first PR; and (b) during execution of at least one of user software and operating system software in the data processing system, enforcing the access constraining attributes of at least the first PR.

The above method can be one where: the data processing system includes a hypervisor; the metadata storing memory zone is not directly accessible to the hypervisor; the user software and the operating system software execute while using a virtual memory space managed by the hypervisor; and the metadata definition of the extent of at least the first PR includes its extent in the virtual memory space. Moreover, the method can be one where: the hypervisor produces physical addresses (hyper-PA's) corresponding to virtual addresses (VA's) of informational data items and executable code stored in the main memory; and the metadata storing memory zone stores virtual address to physical address translations of at least one of informational data items and executable code stored in the first PR.

Moreover, the method can be one where: the enforcing of the access constraining attributes of at least the first PR is automatically repeatedly carried out by a protected regions enforcer (PR enforcer) implemented in at least one of system hardware and firmware where operations of the PR enforcer are not directly alterable by any of user software, operating system software and the hypervisor; and the method further comprises: automatically repeatedly testing with use of the PR enforcer for a match between a hypervisor produced physical address (hyper-PA) and a physical address (meta-PA) obtained from the stored virtual address to physical address translations of the metadata storing memory zone when access is attempted for at least one of an informational data item and executable code stored in the first PR.

The method can be one where: the enforcing of the access constraining attributes of at least the first PR is automatically repeatedly carried out by a protected regions enforcer (PR enforcer) implemented in at least one of system hardware and firmware where operations of the PR enforcer are not directly alterable by any of user software, operating system software and the hypervisor; and the method further comprises: automatically repeatedly testing with use of the PR enforcer for a match between a set of hypervisor controlled read, write and/or execute permissions (hyper-R/W/X permissions) and corresponding read, write and/or execute permissions (meta-R/W/X permissions) obtained from the metadata storing memory zone when access is attempted for at least one of an informational data item and executable code stored in the first PR. In an alternate embodiment, the match tests can be as between more restrictive unions of respective permission attributes.

The method can be one further comprising: automatically repeatedly testing with use of the PR enforcer for a match between a hypervisor produced physical address (hyper-PA) and a physical address (meta-PA) obtained from the stored virtual address to physical address translations of the metadata storing memory zone when access is attempted for at least one of an informational data item and executable code stored in the first PR.

The method can be one further comprising: automatically verifying integrity of at least part of the metadata stored in the metadata storing memory zone.

The method can be one where: the automatic verifying of integrity includes automatically provoking an attestation challenge at least against part of the metadata stored in the metadata storing memory zone.

The method can be one where: the automatic provoking of the attestation challenge occurs before an application from which the challenged metadata has arisen is allowed to execute beyond a predetermined extent.

The method can be one where: the automatically provoked attestation challenge comes by way of a network and from a remote server or other such challenger or alternatively from a local challenger.

The method can be one further comprising: obtaining from an application defining file for a first application, corresponding first metadata defining the extent of the at least first protection region (first PR) which is to be constituted by a corresponding first allocated virtual area of the main memory, the first allocated virtual area being one allocated to the first application for containing at least one of first informational data items and first executable code belonging to the first application.

The method can be one further comprising: automatically verifying integrity of the obtained first metadata.

The method can be one further comprising: obtaining from an application defining file for the first application, corresponding second metadata defining the extent of a second protection region (second PR) which is to be constituted by a corresponding second allocated virtual area of the main memory different from the first allocated virtual area, the second allocated virtual area also being one allocated to the first application for containing at least one of second informational data items and second executable code belonging to the first application; wherein the second metadata defines access constraining attributes of the second PR and at least one of the access constraining attributes of the second PR is different from the access constraining attributes defined by the first metadata for its corresponding first PR.

The method can be one further comprising: obtaining from an application defining file for a second application, corresponding other metadata defining the extent of at least another protection region which is to be constituted by a corresponding other allocated virtual area of the main memory, the other allocated virtual area being one allocated to the second application for containing at least one of other informational data items and other executable code belonging to the second application; wherein the other metadata defines access constraining attributes of the other protection region, the other metadata defining access constraining attributes of the other PR including at least one of other access constraints for informational data items that can be present in the other PR and further other access constraints for executable code that can be present in the other PR.

The method can be one further comprising: automatically and substantially at a same time enforcing the access constraints of both the first and second applications.

The method can be one where: the access constraints of the first application include those defining whether executable code of the second application can access at least one of the informational data items and executable code within a protected region of the first application.

The method can be one where: the access constraints of the second application include those defining whether executable code of the first application can access at least one of the informational data items and executable code within a protected region of the second application, and if so, to what extent.

Additionally, it is seen that what has been disclosed includes a data processing machine comprising: (a) a memory zone that is not directly accessible to user software and to operating system software within the data processing machine; and (b) at least one of hardware and firmware configured to access the memory zone for storing therein, metadata defining an extent of at least a first protection region (first PR) constituted by a corresponding first area of a main memory of the data processing machine where the first area, if not otherwise protected, is usable by at least one of user software and operating system software within the data processing machine, the stored metadata further defining access constraining attributes of the first PR including at least one of first access constraints for informational data items that can be present in the first PR and second access constraints for executable code that can be present in the first PR; wherein the at least one of the memory zone accessing hardware and firmware is further configured as a PR enforcer configured to automatically enforce the access constraining attributes of at least the first PR during execution of at least one of user software and operating system software in the data processing machine.

Additionally, it is seen that what has been disclosed includes a data processing system comprising: (a) one or more memory zones within a respective one or more data processing devices, each memory zone being configured to not be directly accessible to user software and to operating system software within its respective data processing device; and (b) within each data processing device, at least a respective one of hardware and firmware configured to access the respective one or more memory zones of the device for storing therein, metadata defining an extent of at least a first protection region (first PR) constituted by a corresponding first area of a main memory of the respective data processing device where the first area, if not otherwise protected, is usable by at least one of user software and operating system software within the data processing device, the stored metadata further defining access constraining attributes of the first PR including at least one of first access constraints for informational data items that can be present in the first PR and second access constraints for executable code that can be present in the first PR; wherein the at least one of the memory zone accessing hardware and firmware of each respective device is further configured as a PR enforcer configured to automatically enforce the access constraining attributes of at least the first PR of the respective device during execution of at least one of user software and operating system software in the respective device.

The data processing system may be one wherein: at least a first of the devices includes a respective hypervisor; the one or more metadata storing memory zones of the at least first device is not directly accessible to the respective hypervisor of the device; user software and operating system software are configured to execute within the at least first device while using a virtual memory space managed by the respective hypervisor of the respective device; and the metadata definition of the extent of at least the first PR includes its extent in the virtual memory space of the respective device.

Additionally, it is seen that what has been disclosed includes a method of producing executable code operable under a protected regions (PR's) regime, where the method comprises: (a) defining within at least one of source and object code, a start location and an extent of at least a first protected region; and (b) defining within at least one of source and object code, access constraint attributes of the at least first protected region.

The method can be one further comprising: defining within at least one of source and object code, a dynamic change to at least one of the start location, the extent and the attributes of the at least first protected region.

The method can be one further comprising: defining within at least one of source and object code, a dynamic destruction of at least one of executable code and informational data items within the at least first protected region and a dynamic destruction of the attributes of the at least first protected region.

The method can be one further comprising: defining within at least one of source and object code, a dynamic creation of at least a second protected region having a respective second start location and extent and same or different attributes relative to the attributes of the first protected region.

The method can be one further comprising: defining within at least one of source and object code, a forced test of integrity of the at least first protected region and of its attributes.

The method can be one wherein the integrity test on the attributes of the at least first protected region includes an integrity test on the attributes as stored in a memory zone that is configured to not be directly accessible to user software and to operating system software of a respective data processing device that is to enforce the attributes. The method can be one wherein the integrity test includes a remote attestation. The method can be one wherein the defining of at least one of the start location, extent and attributes of the at least first protected region is based on a mapping of traffic flows of executing code threads and/or a mapping of reaches for informational data items of an in-production version of the executable code before the at least first protected region is activated.

The method can be one further comprising: running a beta version of the produced executable code with at least one of its protected regions activated; and modifying at least one of the start, extent and attributes of at least one of protected regions of the beta version based on said running.

The method can be one further comprising: running an alpha version of the produced executable code with a plurality of its protected regions activated; and modifying at least one of the start, extent and attributes of at least one of protected regions of the alpha version based on said running of the alpha version.

Additionally, it is seen that what has been disclosed includes a method of enforcing access constraints and/or requirements of a defined protected region comprising: caching the attributes in a translation lookaside buffer (TLB). The method can be one further comprising: in response to a TLB miss, walking virtual address direct to physical address translation tables stored in a memory zone that is configured to not be directly accessible to user software and to operating system software of a respective data processing device that is enforcing the attributes.

Additionally, it is seen that what has been disclosed includes a method of enforcing access constraints and/or requirements of a defined protected region, the method comprising: decrypting an encrypted copy of the access constraints and/or requirements using a swap key assigned on a per-protected region basis or per-group of protected regions basis to the defined protected region.

CONCLUSION

While the embodiments of in accordance with the present disclosure are susceptible to various modifications and alternative constructions, certain illustrated embodiments thereof are shown in the drawings and have been described above in detail. It should be understood, however, that there is no intention to limit embodiments of the present disclosure to the specific forms disclosed, but on the contrary, the intention is to cover all modifications, alternative constructions, and equivalents falling within the spirit and scope of the present teachings.

What is claimed is:

1. A machine-implemented method for securing a data processing system, the method comprising:
   storing in one or more memory zones that are not intelligibly accessible to user software, to operating system software or to supplemental processors, metadata identifying one or more first other parts of a system memory of the data processing system where the identified one or more first other parts are thereby mapped as being protected regions and where the stored metadata defines at least one of access constraints for those identified one or more first other parts, corresponding operational constraints and/or operational requirements that respectively constrain the operations performed by or on the data of the identified first other parts; and
   during execution of at least one of user software and operating system software in the data processing system, enforcing the operational constraints and/or operational requirements as mapped by the metadata to their corresponding first other parts of the system memory.

2. The method of claim 1 wherein:
   the data processing system includes a hypervisor;
   the one or more metadata storing memory zones are not intelligibly accessible to the hypervisor; and
   the user software and the operating system software execute while using a virtual memory space managed by the hypervisor.

3. The method of claim 2 wherein:
   the hypervisor produces physical addresses (hyper-PA's) corresponding to virtual addresses (VA's) of informational data items and executable code stored in a main memory portion of the system memory; and
   the one or more metadata storing memory zones store virtual address to physical address translations of at least one of informational data items and executable code stored in at least one of the one or more first other parts of the system memory of the data processing system.

4. The method of claim 3 wherein:
   said enforcing of the operational constraints and/or operational requirements is automatically repeatedly carried out by a protected regions enforcer (PR enforcer) implemented in at least one of system hardware and firmware where internal operations of the PR enforcer are not directly alterable by any of user software, operating system software and the hypervisor; and
   the method further comprises: automatically repeatedly testing with use of the PR enforcer for a match between a hypervisor produced physical address (hyper-PA) and a physical address (meta-PA) obtained from the stored virtual address to physical address translations of the one or more metadata storing memory zones when access is attempted for at least one of an informational data item and executable code stored in a corresponding one of the first other parts.

5. The method of claim 3 wherein:
   said enforcing of the operational constraints and/or operational requirements is automatically repeatedly carried out by a protected regions enforcer (PR enforcer) implemented in at least one of system hardware and firmware where internal operations of the PR enforcer are not directly alterable by any of user software, operating system software and the hypervisor; and
   the method further comprises: automatically repeatedly testing with use of the PR enforcer for a context-appropriate restrictive match between a set of hypervisor controlled read, write and/or execute permissions (hyper-R/W/X permissions) and corresponding read, write and/or execute permissions (meta-R/W/X permissions) obtained from at least one of the metadata storing memory zones when access is attempted for at least one of an informational data item and executable code stored in a corresponding one of the first other parts.

6. The method of claim 5 and further comprising:
   automatically repeatedly testing with use of the PR enforcer for a match between a hypervisor produced physical address (hyper-PA) and a physical address (meta-PA) obtained from the stored virtual address to physical address translations of at least one of the metadata storing memory zones when access is attempted for at least one of an informational data item and executable code stored in a corresponding one of the first other parts.

7. The method of claim 1 and further comprising:
   automatically verifying integrity of at least part of the metadata stored in at least one of the metadata storing memory zones.

8. The method of claim 7 wherein:
   the automatic verifying of integrity includes automatically provoking an attestation challenge at least against metadata defining information that is used for creating corresponding metadata stored in the at least one of the metadata storing memory zones.

9. The method of claim 7 wherein:

said enforcing of the operational constraints and/or operational requirements is automatically repeatedly carried out by a protected regions enforcer (PR enforcer) implemented in at least one of system hardware and firmware where internal operations of the PR enforcer are not directly alterable by any of user software and operating system software; and the automatic verifying of integrity occurs before the at least part of the stored metadata is used by the PR enforcer.

10. The method of claim 9 wherein:

the automatic verifying of integrity is carried out with use of a network connected external system that checks results of the automatic verifying.

11. The method of claim 1 and further comprising:

obtaining from an application defining file for a first application, corresponding first metadata defining extents of one or more first protection regions (PR's) whether provided as fragments or as wholes where the PR's are to be constituted by corresponding first allocated virtual areas of the system memory, the first allocated virtual areas being ones allocated to the first application for containing at least one of first informational data items and first executable code belonging to the first application.

12. The method of claim 11 and further comprising:

automatically verifying integrity of the obtained first metadata.

13. The method of claim 11 and further comprising:

obtaining from an application defining file for the first application, corresponding second metadata defining extents of one or more second PR's which are to be constituted by corresponding second allocated virtual areas of system memory different from the first allocated virtual areas, the second allocated virtual areas also being ones allocated to the first application for containing at least one of second informational data items and second executable code belonging to the first application; and obtaining from an application defining file for the first application, corresponding third and fourth metadata defining respective operational constraints and/or operational requirements for the first and second allocated virtual areas respectively, wherein the obtained third metadata is different from the obtained fourth metadata.

14. The method of claim 11 and further comprising:

obtaining from an application defining file for a second application, corresponding other metadata defining extents of a corresponding one or more other protection regions which are to be constituted by corresponding other allocated virtual area of the system memory, the other allocated virtual areas being ones allocated to the second application for containing at least one of other informational data items and other executable code belonging to the second application; and obtaining from an application defining file for the second application, corresponding further metadata defining respective operational constraints and/or operational requirements for the other allocated virtual areas.

15. The method of claim 14 and further comprising:

automatically and substantially at a same time enforcing the operational constraints and/or operational requirements of both the first and second applications.

16. The method of claim 15 wherein:

the operational constraints and/or operational requirements of the first application include those defining whether executable code of the second application can access at least one of the informational data items and executable code within a protected region of the first application.

17. The method of claim 16 wherein:

the operational constraints and/or operational requirements of the second application include those defining whether executable code of the first application can access at least one of the informational data items and executable code within a protected region of the second application, and if so, to what extent.

18. A data processing machine comprising:

one or more memory zones that are not intelligibly accessible to user software and to operating system software or to master or supplemental processors within the data processing machine; and at least one of hardware and firmware configured to intelligibly access the one or more memory zones for storing therein, metadata defining one or more extents of at least a first protected region (first PR) constituted by a corresponding one or more first areas of system memory of the data processing machine where the one or more first areas, if not otherwise protected, are usable by at least one of user software and operating system software within the data processing machine, the at least one of the hardware and firmware being configured to cause the one or more memory zones to store constraints defining metadata defining for protected regions (PR's), corresponding operational constraints and/or operational requirements that respectively control machine operations referencing the PR's;

wherein the at least one of the memory zones accessing hardware and firmware is further configured as a PR enforcer configured to automatically enforce the corresponding operational constraints and/or operational requirements of the PR's during execution of at least one of user software and operating system software in the data processing machine.

19. A data processing system comprising:

one or more buried memory zones within a respective one or more data processing devices, each buried memory zone being configured to not be intelligibly accessible to user software and to operating system software or to master or supplemental processors within its respective data processing device; and within each data processing device, at least a respective one of hardware and firmware configured to intelligibly access the respective one or more buried memory zones of the device for storing therein, metadata defining an extent of at least a first protection region (first PR) constituted by a corresponding first area of a system memory of the respective data processing device where the first area, if not otherwise protected, is usable by at least one of user software and operating system software within the data processing device, the stored metadata defining access constraining attributes of the first PR including at least one of first access constraints for informational data items that can be present in the first PR and second access constraints for executable code that can be present in the first PR;

wherein the at least one of the buried memory zone accessing hardware and firmware of each respective device is further configured as a PR enforcer configured to automatically enforce the access constraining attributes of at least the first PR of the respective device during execution of at least one of user software and operating system software in the respective device.

20. The data processing system of claim 19 wherein:

at least a first of the devices includes a respective hypervisor;

the one or more metadata storing memory zones of the at least first device is not directly accessible to the respective hypervisor of the device;

user software and operating system software are configured to execute within the at least first device while using a virtual memory space managed by the respective hypervisor of the respective device; and the metadata definition of the extent of at least the first PR includes its extent in the virtual memory space of the respective device.

\* \* \* \* \*